US012279320B2

(12) United States Patent
Liu et al.

(10) Patent No.: US 12,279,320 B2
(45) Date of Patent: Apr. 15, 2025

(54) COMB AND PARTIAL INTERLACE-BASED SIDELINK FEEDBACK CHANNEL TRANSMISSION

(71) Applicant: Qualcomm Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/545,920

(22) Filed: Dec. 19, 2023

(65) Prior Publication Data

US 2024/0129972 A1    Apr. 18, 2024

Related U.S. Application Data

(63) Continuation of application No. 17/663,544, filed on May 16, 2022.

(51) Int. Cl.
*H04W 76/14* (2018.01)
*H04L 1/06* (2006.01)
*H04W 72/0446* (2023.01)
*H04W 72/121* (2023.01)

(52) U.S. Cl.
CPC ........... *H04W 76/14* (2018.02); *H04L 1/0693* (2013.01); *H04W 72/0446* (2013.01); *H04W 72/121* (2013.01)

(58) Field of Classification Search
CPC ............ H04W 76/14; H04W 72/0446; H04W 72/121; H04W 72/25; H04L 1/1854; H04L 1/1861
See application file for complete search history.

(56) References Cited

U.S. PATENT DOCUMENTS

| | | | |
|---|---|---|---|
| 2012/0113861 A1 | 5/2012 | Chun et al. | |
| 2018/0337739 A1* | 11/2018 | Petersson | H04B 17/27 |
| 2021/0250772 A1* | 8/2021 | Farag | H04W 16/02 |
| 2021/0377931 A1* | 12/2021 | Zhang | H04W 72/20 |
| 2022/0166586 A1* | 5/2022 | Kundu | H04W 16/14 |
| 2023/0371089 A1 | 11/2023 | Liu et al. | |

* cited by examiner

*Primary Examiner* — Jamal Javaid
(74) *Attorney, Agent, or Firm* — Dinsmore & Shohl LLP

(57) ABSTRACT

Certain aspects of the present disclosure provide techniques for techniques for providing sidelink feedback. Certain aspects provide a method for wireless communication by a first user equipment (UE). The method generally includes receiving, from a second UE, one or more sidelink data messages and transmitting, to the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks.

20 Claims, 20 Drawing Sheets

COMB AND PARTIAL INTERLACE-BASED SIDELINK FEEDBACK CHANNEL TRANSMISSION

CROSS-REFERENCE TO RELATED APPLICATION

This application is a continuation of and claims priority to U.S. patent application Ser. No. 17/663,544 filed May 16, 2022, which is incorporated herein by reference in its entirety.

BACKGROUND

Field of the Disclosure

Aspects of the present disclosure relate to wireless communications, and more particularly, to techniques for providing sidelink feedback.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a first user equipment (UE). The method includes receiving, from a second UE, one or more sidelink data messages; and transmitting, to the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks.

Another aspect provides a method of wireless communications by a first UE. The method includes transmitting, to a second UE, one or more sidelink data messages; and receiving, from the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks.

Another aspect provides a method of wireless communications by a first UE. The method includes receiving, from a second UE, one or more sidelink data messages during a time period having a duration of a first number of slots that is greater than one; selecting a first sidelink feedback channel resource from a first plurality of sidelink feedback channel resources in a first resource pool based on at least one of a first identifier associated with the second UE or a groupcast identifier associated with the one or more sidelink data messages, wherein: the first plurality of sidelink feedback channel resources in the first resource pool belong to a first partial interlace group of a first interlace group, and the first partial interlace group comprises a number of first resource blocks greater than or equal to two; and transmitting, to the second UE, via the first sidelink feedback channel resource, a first feedback message comprising one or more feedback bits associated with the one or more sidelink data messages.

Another aspect provides a method of wireless communications by a first UE. he method includes transmitting, to a second UE, one or more sidelink data messages during a time period having a duration of a first number of slots that is greater than one; and receiving, from the second UE, via a first sidelink feedback channel resource from a first plurality of sidelink feedback channel resources in a first resource pool, a first feedback message comprising one or more feedback bits associated with the one or more sidelink data messages, wherein: the first sidelink feedback channel resource is associated with at least one of a first identifier associated with the first UE or a groupcast identifier associated with the one or more sidelink data messages, the first plurality of sidelink feedback channel resources in the first resource pool belong to a first partial interlace group of a first interlace group, and the first partial interlace group comprises a number of first resource blocks greater than or equal to two.

Another aspect provides a method of wireless communications by a first UE. The method includes receiving, from a second UE, one or more sidelink data messages during a time period having a duration of a first number of slots that is greater than one; and transmitting, to the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain.

Another aspect provides a method of wireless communications by a first UE. The method includes transmitting, to a second UE, one or more sidelink data messages during a time period having a duration of a first number of slots that is greater than one; and receiving, from the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
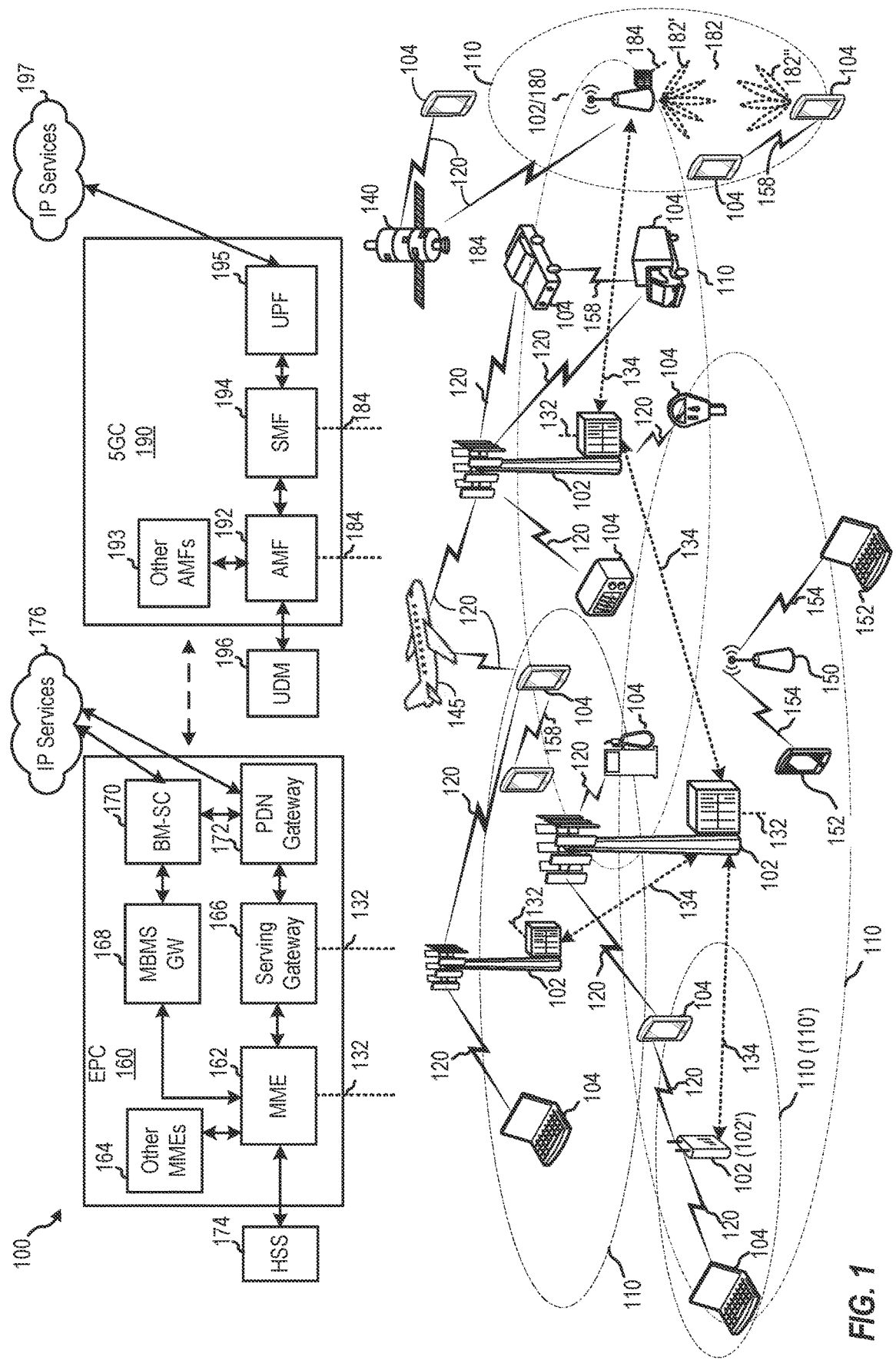
FIG. 1 depicts an example wireless communications network.

Aspects of the present disclosure provide apparatuses, methods, processing systems, and computer-readable mediums for providing feedback for one or more sidelink data occasions in a single physical sidelink feedback channel (PSFCH) resource having a partial interlace based structure and/or a comb based structure. For example, certain aspects provide techniques for providing sidelink feedback for one or more physical sidelink shared channel (PSSCH) occasions occurring over multiple slots in a PSFCH resource occupying a partial interlace group including at least two resource blocks (RBs). Further, certain aspects provide techniques for providing sidelink feedback for one or more PSFCH occasions occurring over multiple slots in a PSFCH resource occupying resource elements (REs) from one or more RBs transmitted in a comb pattern in the frequency domain. Though certain aspects are described herein with respect to PSFCH resources, the techniques herein may be applied to other suitable sidelink feedback channel resources.

In certain aspects, wireless communications devices in a wireless communications system are configured to provide feedback (e.g., hybrid automatic repeat request (HARQ) acknowledgement/negative acknowledgment (ACK/NACK) feedback) regarding whether a sidelink data message was successfully received and decoded or not. For example, a receiving user equipment (UE) may be scheduled (e.g., by a transmitting UE) to receive a sidelink data message from the transmitting UE on a PSSCH occasion occurring in a slot. In certain aspects, the receiving UE is scheduled by receiving, such as from the transmitting UE, control information (e.g., sidelink control information (SCI)) in a control channel (e.g., a physical sidelink control channel (PSCCH)) scheduling the sidelink data message.

The receiving UE may be configured to transmit, to the transmitting UE, feedback regarding whether the scheduled sidelink data message was successfully received and decoded or not. For example, the receiving UE may be configured to transmit an ACK when the scheduled sidelink data message is successfully received and decoded, and to not transmit any feedback when the scheduled sidelink data message is not successfully received and decoded. As another example, the receiving UE may be configured to transmit a NACK when the scheduled sidelink data message is not successfully received and decoded, and to not transmit any feedback when the scheduled sidelink data message is successfully received and decoded. As yet another example, the receiving UE may be configured to transmit an ACK when the scheduled sidelink data message is successfully received and decoded, and to transmit a NACK when the scheduled sidelink data message is not successfully received and decoded. Though certain aspects are discussed with respect to HARQ feedback, the techniques herein may be applied to other suitable feedback types.

In certain aspects, a receiving UE needing to transmit feedback for one or more PSSCH occasions may transmit such feedback on a PSFCH resource. Traditionally, one PSFCH resource occupies one RB. In certain aspects, transmitting ACK/NACK feedback in one RB PSFCH resource may not satisfy regulatory minimums imposed on physical channels/signals operating in unlicensed spectrum. For example, regulatory restrictions imposed on physical channels/signals operating in unlicensed spectrum may be related to the bandwidth occupied by these channels/signals, referred to as Occupied Channel Bandwidth (OCB). The OCB is defined as the bandwidth within which 99% of signal power is located. According to the European Telecommunications Standards Institute (ETSI), OCB should be at least 80% of a nominal channel bandwidth (NCB). This is needed to achieve harmonious coexistence with other systems, such as Wi-Fi. Accordingly, a one RB PSFCH resource may not satisfy OCB requirements. In particular, one RB may have a bandwidth less than the temporary 2 MHz OCB requirement in the sidelink unlicensed band.

One approach to satisfy the OCB requirements is to spread the frequency occupancy of a transmission signal over a wider bandwidth. In other words, a PSFCH resource used to transmit ACK/NACK feedback may communicate in a frequency spectrum using frequency interlace-based resources. In particular, the PSFCH resource may have a block-interlaced waveform, such that the PSFCH resource occupies an amount of non-consecutive RBs (e.g., ten RBs) in the frequency domain.

In certain aspects, satisfying the OCB requirements by communicating in the frequency spectrum using frequency interlaced-based resources, may be at the cost of UE multiplexing capacity. Thus, certain aspects of the present disclosure support the transmission of feedback for one or more PSSCH occasions in a single PSFCH resource having a partial interlace based structure and/or a comb based structure to satisfy the 2 MHz OCB constraint, while also accommodating UE multiplexing capability.

In certain aspects, there may be a plurality of such PSFCH resources arranged in one or more resource pools. Further, in certain aspects, each PSFCH resource may include a plurality of frequency resources (e.g., a plurality of RBs, which in certain aspects are grouped into a plurality of frequency interlace groups or have REs transmitted in a comb pattern in the frequency domain). Accordingly, certain aspects herein provide techniques for mapping (e.g., hashing) PSFCH feedback/PSSCH occasions to a particular PSFCH resource and/or particular frequency resources in a PSFCH resource. Such mapping techniques help avoid collisions in feedback reporting, for example, such as avoiding different receiving UEs transmitting different feedback in the same resources.

As a result of using the partial interlace and/or comb based PSFCH design described herein, the at least 2 MHz OCB constraint may be satisfied while maintaining multiplexing capability (e.g., UE multiplexing capability, ACK/NACK multiplexing capability). Maintaining multiplexing capability may allow a receiving UE and/or the system to experience lower signaling overhead, and the receiving UE to experience reduced power consumption. Further, allowing for multi-bit feedback from a receiving UE in a single PSFCH resource having the partial interlace and/or comb design (e.g., as described in some cases herein) allows for a receiving UE to provide more complete feedback or provide feedback with lower latency without hindering a multiplexing capability of the system. For these reasons, the receiving UE and the system may experience higher data rates, greater spectral efficiency, and greater system capacity, among other benefits.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
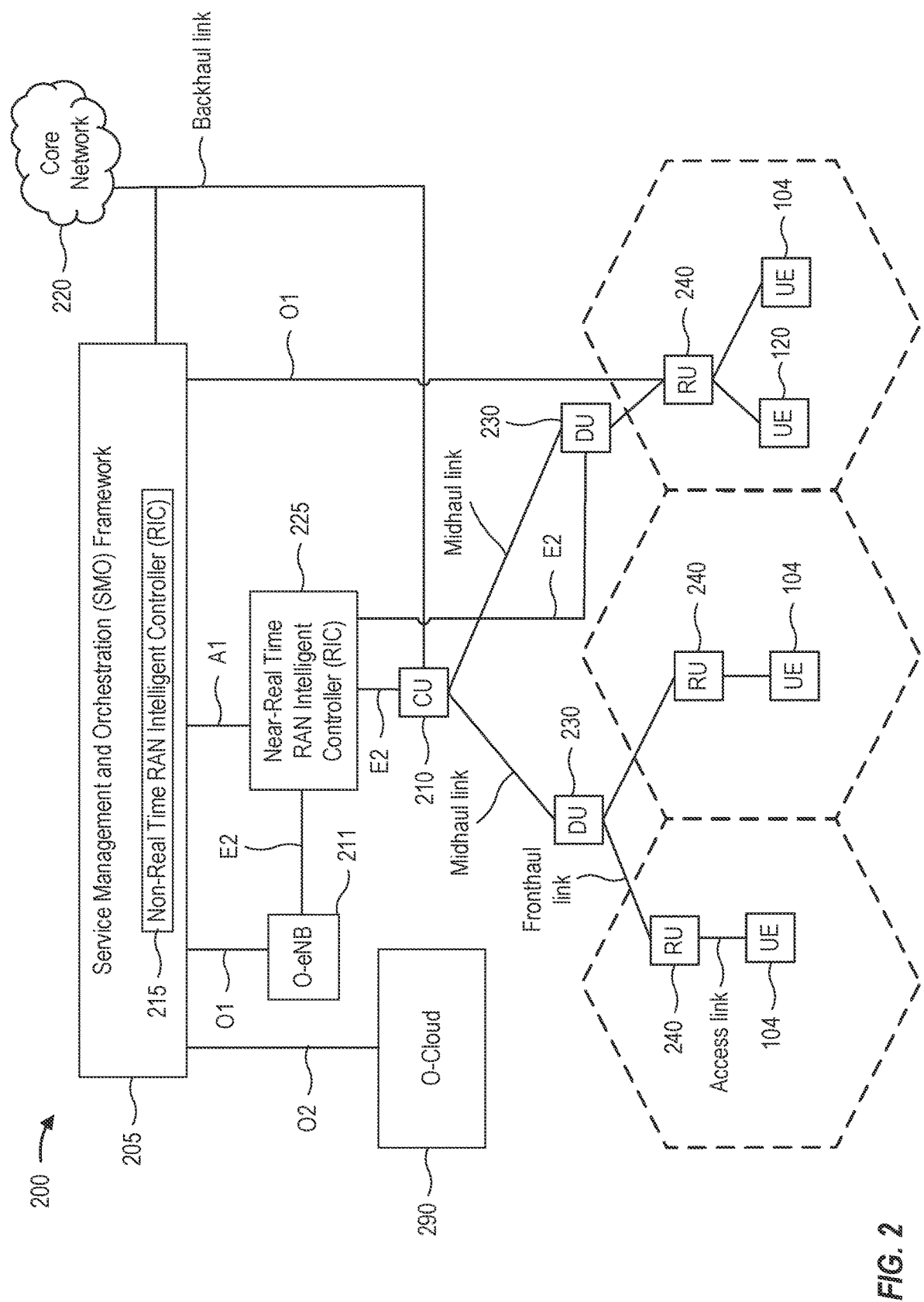
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (P SFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
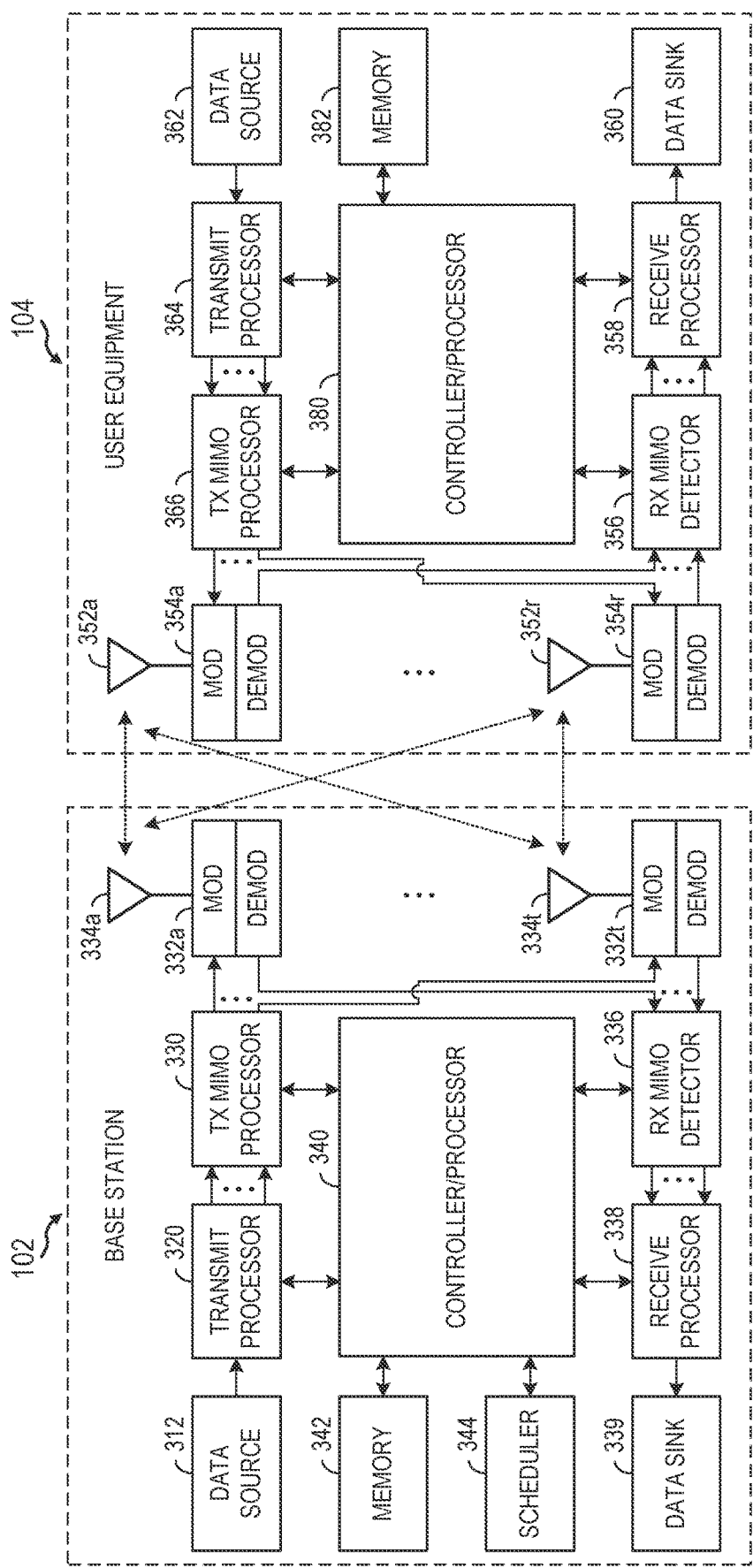
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. DL signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
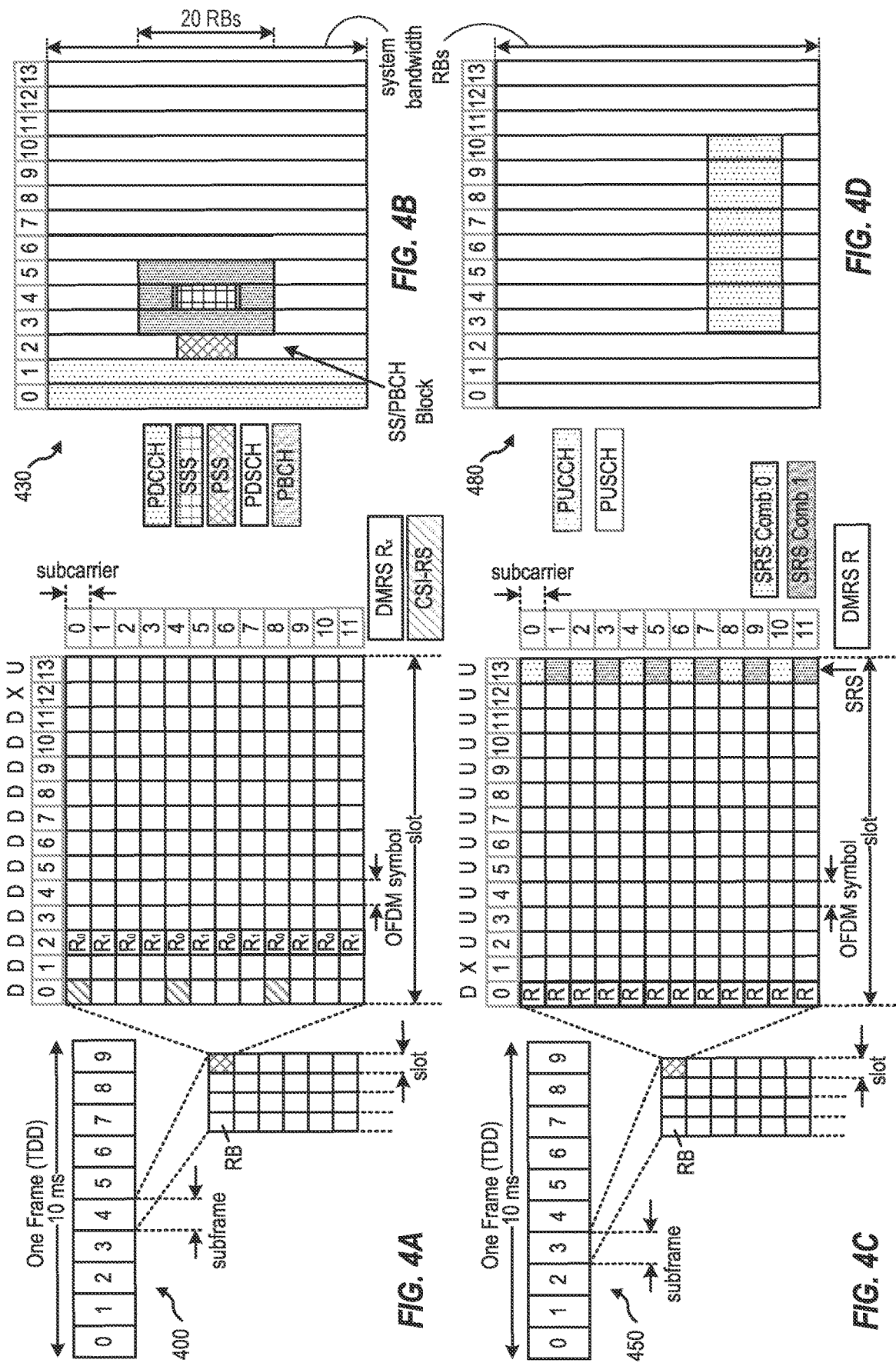
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Sidelink Feedback

While communication between user equipments (UEs) (e.g., UE 104 of FIG. 1) and network entities (e.g., base stations (BSs) (e.g., BS 102 of FIG. 1)) may be referred to as the access link, communication between devices may be referred to as the sidelink.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a sidelink signal may refer to a signal communicated from one subordinate entity (e.g., UE 104 illustrated in FIG. 1) to another subordinate entity (e.g., another UE 104 illustrated in FIG. 1) without relaying that communication through the scheduling entity (e.g., UE or network entity), even though the scheduling entity may be utilized for scheduling and/or control purposes.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback regarding a scheduled sidelink transmission.

For PSSCH or PSCCH transmissions, a transmitting UE 104 may request feedback (e.g., hybrid automatic repeat request (HARQ) feedback such as an acknowledgement (ACK) or a negative ACK (HACK) feedback) to be transmitted in a PSFCH. In particular, HARQ feedback is one technique for increasing the likelihood that data is received correctly over a communication link, including a sidelink. HARQ may include a combination of error detection (such as using a cyclic redundancy check (CRC)), forward error correction (FEC), and retransmission (such as automatic repeat request (ARQ)). HARQ may improve throughput at the medium access control (MAC) layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

Accordingly, where a transmitting UE requests feedback from a receiving UE, the receiving UE may monitor for PSSCH or PSCCH transmissions and provide feedback to the transmitting UE over the PSFCH in accordance with the request. The receiving UE may select a PSFCH resource from a resource pool (e.g., corresponding to a plurality of PSFCH resources), which may not be a dedicated resource pool. For example, the resource pool may be shared with one or more other UEs.

The receiving UE may select the PSFCH resource in accordance with a set of parameters associated with sidelink feedback. For example, a periodPSFCHresource parameter may indicate or define a period in slots for a PSFCH transmission in a resource pool. The supported periods may be 0, 1, 2, or 4 (where 0 means that there is no PSFCH available), among other examples. Further, a PSFCH transmission timing may be during a first slot including a PSFCH resource after a scheduled PSSCH and after a time period after the scheduled PSSCH. The time period may be defined or indicated by a MinTimeGapPSFCH parameter. Further, an sl-PSFCH-RB-Set parameter may define an $M_{PRB,set}^{PSFCH}$ variable, which may indicate a quantity of a set of physical resource blocks (PRBs) in a resource pool for PSFCH in a slot. In some aspects, this quantity may be split between $N_{PSSCH}^{PSFCH}$ (a quantity of PSSCH slots corresponding to a PSFCH slot) and $N_{subch}$ (a quantity of subchannels for a resource pool). In other words, each subchannel and slot includes $M_{subch,slot}^{PSFCH}$ PRBs, wherein $M_{subch,slot}^{PSFCH}$ may be defined in accordance with Equation 1, below. Further, there may be a time first mapping from PSSCH resources to PSFCH PRBs and a PSFCH resource pool size $R_{PRB,CS}^{PSFCH}$ may be defined in accordance with Equation 2.

$$M_{subch,slot}^{PSFCH} = \frac{M_{PRB,Set}^{PSFCH}}{N_{PSSCH}^{PSFCH} \times N_{subch}} \quad (1)$$

$$R_{PRB,CS}^{PSFCH} = N_{type}^{PSFCH} \times N_{CS}^{PSFCH} \times M_{subch,slot}^{PSFCH} \quad (2)$$

As shown in Equation 2, $N_{CS}^{PSFCH}$ may be a quantity of cyclic shift pairs, configured per resource pool (where a pair is for indicating either ACK or NACK, such that one pair is capable of conveying 1 bit of information). $N_{type}^{PSFCH}$ may be set to 1 or equal to a quantity of subchannels for a corresponding PSSCH $N_{subch}^{PSSCH}$. In other words, a value of $N_{type}^{PSFCH}$ may indicate whether, for the subchannels in a PSSCH slot, a PSFCH resource pool is shared or not. Within a PSFCH resource pool, a PSFCH resource may be indexed by PRB index first and by cyclic shift pair index second.

Using such parameters, the receiving UE may select or otherwise determine a PSFCH resource in accordance with a value of $(P_{ID}+M_{ID}) \mod R_{PRB,CS}^{PSFCH}$, where $P_{ID}$ may be a physical source ID from sidelink control information (SCI), such as second stage SCI (SCI-2), including SCI 2-A or SCI 2-B, for PSSCH and $M_{ID}$ may be set to 0 or an identity of the receiving UE. As such, for unicast or NACK-based transmission, $M_{ID}=0$ and the receiving UE may send an ACK or a NACK, or exclusively a NACK, at a source ID-dependent resource in the PSFCH resource pool. For groupcast, the receiving UE may select one PSFCH resource from the PSFCH resource pool and transmit an ACK or a NACK over the selected PSFCH resource.

In some scenarios, UEs may support a sequence-based PSFCH format with one symbol (excluding an automatic gain control (AGC) training period). For example, the UEs may support a sequence-based PSFCH format for unicast and groupcast signaling, including for groupcast options 1 and 2 (where groupcast option 1 may refer to exclusively NACK transmissions for sidelink groupcast feedback and groupcast option 2 may refer to ACK or NACK transmissions for sidelink groupcast feedback). For sequence-based PSFCH formats with one symbol (excluding the AGC training period), a UE may use one PRB and may indicate one bit. To indicate one bit of feedback information (such as HARQ-ACK) in PSFCH, the UEs may differentiate between ACK and NACK by using different cyclic shifts (CSs) of a same base sequence in a same PRB (where a CS corresponding to an ACK may not be defined or used for groupcast option 1).

For such a sequence-based PSFCH, a UE may transmit the one bit of HARQ-ACK information via a length-Z (e.g., length-12) sequence with different cyclic shifts. For multi-bit HARQ-ACK information on a PSFCH, a length-Z sequence in one PRB may be insufficient. For example, to convey multiple feedback bits (such as multiple ACKs or NACKs, or a combination of ACKs and NACKs) in one PRB, a UE may use additional CSs, which may take away CSs that other UEs may have otherwise used to multiplex sidelink feedback in the same PRB, thus reducing a multiplexing capability of the system. In other words, the more bits of HARQ-ACK information conveyed by one user over a PSFCH resource, the fewer users can be multiplexed in the same PSFCH resource.

Aspects Related to Multi-Bit Sidelink Feedback

In certain aspects, communicating UEs 104 may support a PSFCH design capable of conveying multi-bit feedback across multiple resource blocks (RBs) without or minimally impacting a multiplexing capability of the system. For example, a receiving UE may monitor for one or more sidelink data messages from a transmitting UE and may transmit, to the transmitting UE over multiple resource blocks of a PSFCH, a feedback message indicating multiple feedback bits associated with the sidelink data messages. The receiving UE may indicate or otherwise convey the multiple feedback bits via various sequence types. In such implementations, each of the multiple length-Z sequence repetitions may be associated with a same base sequence and the receiving UE may indicate an ACK or NACK via a specific CS of each of the multiple length-Z sequences.

In other aspects, the receiving UE 104 may support one length-N sequence spanning multiple RBs. The length-N sequence may be associated with N orthogonal base sequences and the receiving UE may support a quantity of CSs for each base sequence. In such implementations, the receiving UE may indicate a specific bit stream (such as a series of two or more bit values) that maps to a sequence of ACKs or NACKs, or both, via a combination of a specific base sequence and a specific CS. Additionally, or alternatively, the receiving UE may support one or more coding schemes and PSFCH resource selection procedures associated with conveying multi-bit feedback.

Figure 5:
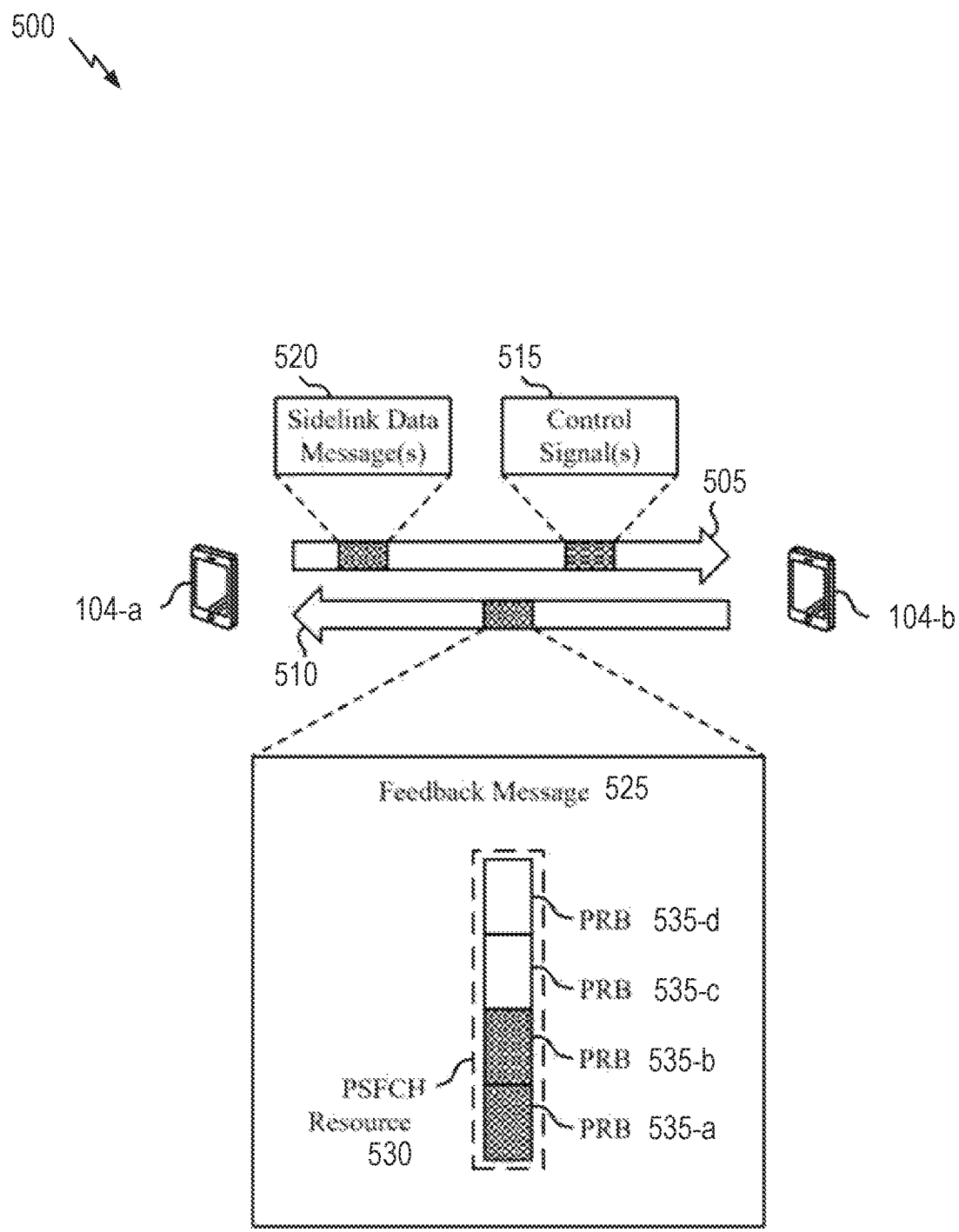
FIG. 5 depicts an example signaling diagram that supports multi-bit feedback via a sidelink feedback channel.

FIG. 5 depicts an example signaling diagram 500 that supports multi-bit feedback via a sidelink feedback channel. Signaling diagram 500 may implement or be implemented to realize aspects of wireless communications network 100. For example, signaling diagram 500 may illustrate communication between a UE 104-a (e.g., a transmitting UE) and another UE 104-b (e.g., a receiving UE), which each may be an example of a UE 104 as illustrated by and described with reference to FIG. 1. In certain aspects, UE 104-a and UE 104-b may support a PSFCH design capable of conveying multi-bit feedback across multiple resource blocks.

UE 104-a may transmit to UE 104-b via a sidelink 505 (which may be an example of a forward link) and the UE 104-b may transmit to UE 104-a via a sidelink 510 (which may be an example of a reverse link). UE 104-a may transmit one or more control signals 515 to UE 104-b scheduling one or more sidelink data messages 520. For example, the one or more control signals 515 may indicate a time and frequency resource allocation, such as a PSSCH resource allocation, for the one or more sidelink data messages 520. The one or more control signals 515 may be an example of an SCI transmission (such as one or both of a first stage SCI (SCI-1) transmission and an SCI-2 transmission) or may be an example of a PCS-radio resource control (RRC) transmission, or both. The one or more sidelink data messages 520 may be examples of one or more PSSCH transmissions. In accordance with receiving the one or more control signals 515, UE 104-b may monitor the indicated time and frequency resource allocation for the one or more sidelink data messages 520.

UE 104-a may, in certain aspects, request feedback associated with the one or more sidelink data messages 520. UE 104-a may request the feedback associated with the one or more sidelink data messages 520 via the one or more control signals 515 or via other signaling. As such, UE 104-b may attempt to receive the one or more sidelink data messages 520 in accordance with the one or more control signals 515 and may provide feedback to UE 104-a in accordance with whether UE 104-b successfully receives the one or more sidelink data messages 520 or fails to receive the one or more sidelink data messages 520. The feedback may indicate multiple feedback bits (such as multiple HARQ-ACK information bits) associated with the one or more sidelink data messages 520, and UE 104-b may transmit the feedback via a feedback message 525 on a PSFCH resource 530.

In certain aspects, UE 104-b may transmit the feedback message 525 over multiple PRBs 535 on PSFCH resource 530 to convey the multiple feedback bits. For example, PSFCH resource 530 may include a PRB 535-a, a PRB 535-b, a PRB 535-c, and a PRB 535-d (which may collectively or generally be referred to as PRBs 535) and, as shown in the example of signaling diagram 500, UE 104-b may transmit the feedback message 525 over PRB 535-a and PRB 535-b. Generally, UE 104-b may use X PRBs 535 for the feedback message 525, where X may be configured (such as via RRC signaling) per resource pool or may be preconfigured (such as hardcoded or defined in a specification) at UE 104-b. X may be 2, 4, or other values.

UE 104-b may transmit the feedback message 525 via a sequence-based format and may generate or select one or more sequences for the feedback message 525 in various manners. In certain aspects, UE 104-b may use multiple length-12 sequence repetitions on the PRB 535-a and the PRB 535-b. In certain aspects, UE 104-a and UE 104-b may support a relatively longer sequence spanning multiple PRBs 535 of the PSFCH resource 530 to convey multiple feedback bits via the feedback message 525. Additionally, or alternatively, in certain aspects, UE 104-a and UE 104-b may apply one or more coding schemes to support a relatively larger payload (such as to support multiple feedback bits) and to support using more than one PRB 535 (such as PRB 535-a and PRB 535-b) in PSFCH resource 530.

Additional details relating to the use of multiple length-12 sequence repetitions, one relatively longer sequence, or a coding scheme to convey multiple feedback bits, are illustrated by and described with reference to FIG. 6.

In certain aspects, UE 104-a and UE 104-b may support a PSFCH resource selection procedure that is related to one or more parameters associated with indicating multiple feedback bits via feedback message 525 over multiple PRBs 535. For example, UE 104-b may select PSFCH resource 530 from a resource pool (such as a PSFCH resource pool) that is related to one or more of a quantity of PRBs 535 per PSFCH resource 530 (which may be denoted by X), a maximum or upper limit quantity of feedback bits (such as HARQ-ACK information bits) that can be carried per PSFCH resource 530 (which may be denoted by Y), and a quantity of cyclic shifts per resource pool (which may be denoted by $M_{CS}$). UE 104-b may select the PSFCH resource 530, or may select the resource pool including the PSFCH resource 530, in accordance with one or more parameters and formulas associated with a quantity of available PRBs 535 and a quantity of dimensions in which PSFCH resources 530 can be multiplexed.

A quantity of PSFCH resources 530 available for multiplexing HARQ-ACK information in a PSFCH (which may be denoted by $R_{PRB,CS}^{PSFCH}$) may be defined in accordance with Equation 3:

$$R_{PRB,CS}^{PSFCH} = N_{type}^{PSFCH} \times N_{PSFCH} \times M_{subch,slot}^{PSFCH} \quad (3)$$

where $M_{subch,slot}^{PSFCH}$ is defined in accordance with Equation 4:

$$M_{subch,slot}^{PSFCH} = \frac{M_{PRB,set}^{PSFCH}}{X \times N_{PSSCH}^{PSFCH} \times N_{subch}} \quad (4)$$

where $M_{PRB,set}^{PSFCH}$ represents the number of the set of PRBs 535 that are allocated for a PSFCH in a slot. The quantity of the set of PRBs 535 that are allocated for a PSFCH in a slot ($M_{PRB,set}^{PSFCH}$) may be split between a quantity of PSSCH slots corresponding to a PSFCH slot (which may be denoted by $N_{PSSCH}^{PSFCH}$) and a quantity of PSSCH resources in a slot (which may be equivalently referred to as a quantity of subchannels and denoted by $N_{subch}$). As such, a quantity of resource block groups (RBGs) for each subchannel and slot pair may be defined in accordance with Equation 4.

Further, as shown in Equation 3, $N_{type}^{PSFCH}$ may be set to 1 or may be equal to a quantity of subchannels for a corresponding PSSCH (which may be denoted by $N_{subch}^{PSSCH}$) and may indicate whether a PSFCH resource pool is shared. As such, $N_{type}^{PSFCH}$ may be referred to herein as a first value associated with indicating whether the resource pool is shared.

Additionally, UE 104-b may select a value for $N_{PSFCH}$, which may be referred to herein as a second value associated with a quantity of dimensions in which PSFCH resources can be multiplexed, in accordance with one of various options. The option according to which the UE 115-b selects a value for $N_{PSFCH}$ may vary in accordance with whether the UE 115-b uses multiple length-12 sequence repetitions, one relatively longer sequence, or a coding scheme to convey multiple feedback bits via the feedback message.

Figure 6:
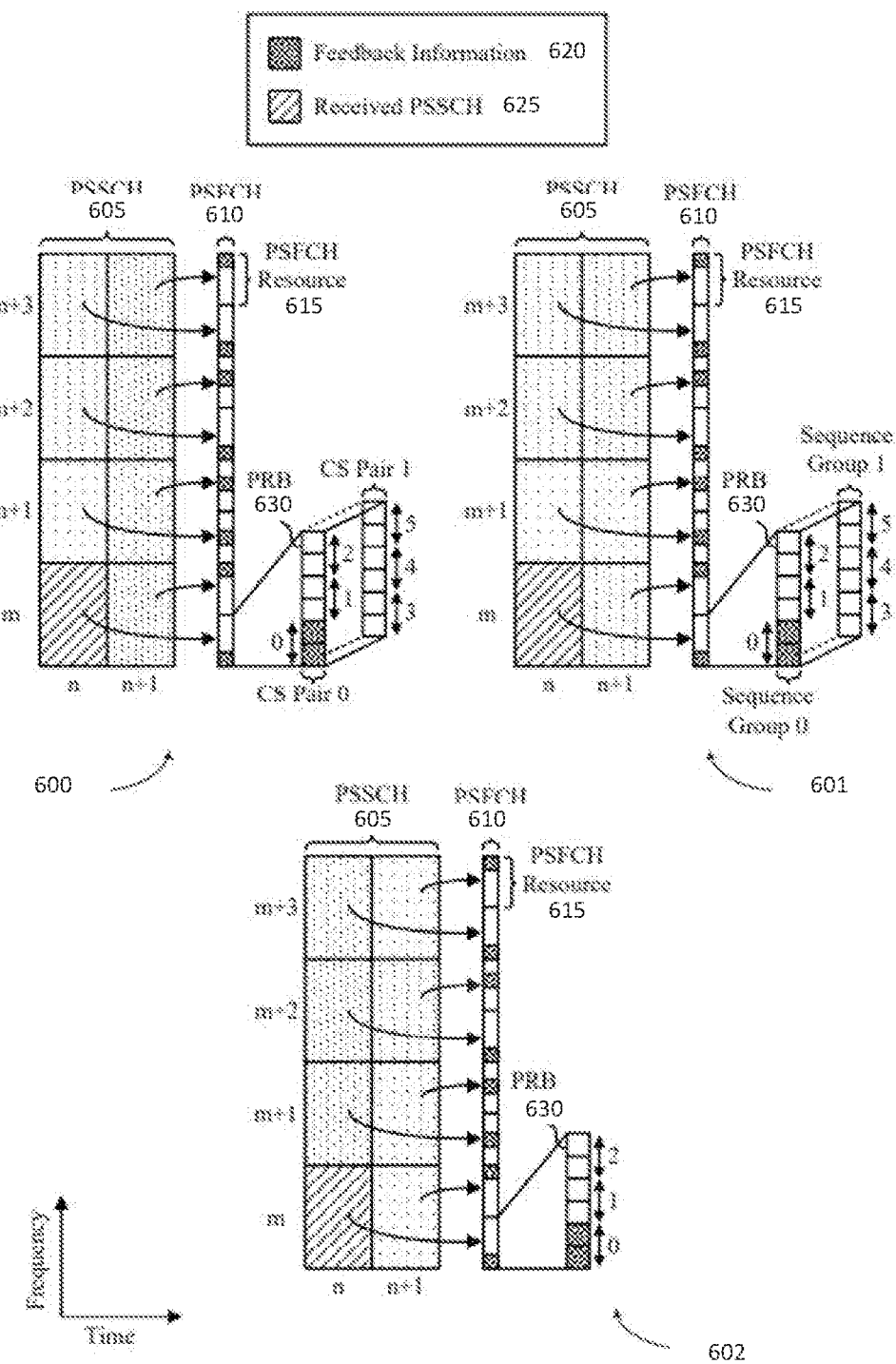
FIG. 6 depicts example physical sidelink feedback channel (PSFCH) multiplexing schemes that support multi-bit feedback via a sidelink feedback channel.

FIG. 6 shows example PSFCH multiplexing schemes 600, 601, and 602 that supports multi-bit feedback via a sidelink feedback channel. The PSFCH multiplexing schemes 600, 601, and 602 may implement or be implemented to realize aspects of wireless communications network 100 and/or signaling diagram 500. For example, a receiving UE 104-b, which may be an example of a UE 104 as illustrated by and described with reference to FIG. 1 or UE 104-b as illustrated by and described with reference to FIG. 5, may leverage PSFCH multiplexing schemes 600, 601, and 602 to identify or otherwise ascertain a value for $N_{PSFCH}$.

As shown in PSFCH multiplexing schemes 600, 601, and 602, a set of PSSCHs 605 may be present across a resource grid associated with slots n and n+1 and subchannels m, m+1, m+2, and m+3. Each of the PSSCHs 605 may correspond to a different PSFCH resource 615 within a PSFCH slot 610. For a received PSSCH 625 (corresponding to a PSSCH located in slot n and subchannel m), UE 104-b (e.g., receiving UE) may transmit multi-bit feedback information 620 over multiple PRBs 630 within a corresponding PSFCH resource 615. A quantity of dimensions in which that PSFCH resource 615 can be multiplexed, and thus a value of $N_{PSFCH}$, may vary across the PSFCH multiplexing schemes 600, 601, and 602.

As illustrated by PSFCH multiplexing scheme 600, which may be associated with aspects where UE 104-b uses multiple length-Z (e.g., length-12) sequence repetitions across multiple PRBs 630 and uses different CS pairs to differentiate between an ACK or a NACK for each sequence, a quantity of PSFCH resources 615 that can be multiplexed may depend on or be associated with a quantity of CS pairs (which may be configured per resource pool). In other words, $N_{PSFCH}$ may be set equal to a quantity of CS pairs, which may be configured per resource pool. As such, if UE 104-b supports two CS pairs, $N_{PSFCH}=2$. In such aspects, within a PSFCH resource pool, a PSFCH resource 615 may be indexed by RBG index first and by cyclic shift pair index second. Further, although shown as supporting two CS pairs, UE 104-b may support any number of cyclic shift pairs.

As illustrated by PSFCH multiplexing scheme 601, which may be associated with aspects where UE 104-b uses one length-N sequence spanning multiple PRBs 630 and uses different base sequence and cyclic shift combinations to differentiate between different sequences of ACKs, NACKs, or a combination of ACKs and NACKs, a quantity of PSFCH resources 615 that can be multiplexed may depend on or be associated with a quantity of sequence groups G (per resource pool). In other words, $N_{PSFCH}$ may be set equal to a quantity of sequence groups (which may be denoted by G) per resource pool, which may be equal to $X*N_{SC}^{RB}*M_{CS}/2^Y$. As such, if UE 104-b supports two sequence groups (such as G=2), $N_{PSFCH}=2$. In such implementations, within a PSFCH resource pool, a PSFCH resource 615 may be indexed by RBG index first and by sequence group index second. Further, although shown as supporting two sequence groups, Ue 104-b may support any number of sequence groups.

As illustrated by PSFCH multiplexing scheme 602, which may be associated with aspects where UE 104-b uses a coding scheme to convey multi-bit feedback information 620 with low or minimal cyclic redundancy check (CRC) overhead, a quantity of PSFCH resources 615 that can be multiplexed may be equal to 1. Accordingly, in the example PSFCH multiplexing scheme 602, $N_{PSFCH}=1$ ($N_{PSFCH}$ may be statically fixed to 1). Further, within a PSFCH resource pool, a PSFCH resource 615 may be indexed by RBG index.

In summary, for PSCCH/PSSCH transmission, sidelink HARQ feedback (e.g., ACK and/or NACK feedback) for a PSSCH may be transmitted on a PSFCH resource. In some cases, a receiving UE may be unable to transmit more than one bit (e.g., an ACK bit or a NACK bit) per PSFCH resource. In some other cases, a receiving UE may be able to transmit more than one bit per PSFCH resource.

For example, in cases where a receiving UE is unable to transmit more than one bit per PSFCH resource, where the receiving UE receives multiple sidelink messages from a transmitting UE, the receiving UE may transmit HARQ feedback for a first sidelink message on a first PSFCH resource, and may transmit HARQ feedback for a second sidelink message on a second PSFCH resource.

For example, as illustrated in FIG. 6, where the receiving UE needs to transmit multiple bits on multiple PSFCH resources, the receiving UE may need to send sidelink HARQ feedback that is multiplexed (e.g., frequency division multiplexed (FDMed) on the PSFCH). For example, the receiving UE may multiplex HARQ feedback for the first sidelink message on the first PSFCH resource with HARQ feedback for the second sidelink message on the second PSFCH resource. The receiving UE may transmit sidelink HARQ feedback that is multiplexed when multiple PSSCHs are received from the same transmitting UE. The receiving UE may also receive multiple PSSCHs from different transmitting UEs, and the receiving UE may transmit a PSFCH to each of the transmitting UEs. However, a receiving UE may be limited as to how many PSFCH resources the receiving UE can multiplex in the same symbol. For example, a number of PSFCH resources that a receiving UE may multiplex in a same symbol may depend on a capability of receiving UE.

Transmitting feedback for one PSSCH occasion per PSFCH resource may result in higher signaling overhead and greater power consumption at the receiving UE. Moreover, transmitting feedback for one PSSCH occasion per PSFCH resource may result in greater sidelink feedback reporting latency (e.g., if there is a delay between the first PSFCH resource and the second PSFCH resource) and lower attainable throughput.

In some other cases, such as 3GPP Release 16 Sidelink, ACK/NACK bits may not be multiplexed. Accordingly, in some cases, a receiving UE may need to transmit sidelink feedback via multiple PSFCH transmissions. Transmitting multiple ACK/NACK bits, targeting a same transmitting UE, in different PSFCH transmissions may cause each PSFCH transmission to not be optimized.

Alternatively, in cases where a receiving UE is able to transmit more than one bit per PSFCH resource, multi-bit feedback for multiple sidelink data occasions occurring over multiple time periods may be provided in a single PSFCH resource (e.g., of a single slot). To exploit the multi-bit PSFCH resource design, a receiving UE may generate one or more sidelink codebooks that include the multi-bit feedback corresponding to the multiple sidelink data occasions. The codebook may include a sequence of bits conveying ACK or NACK feedback for each of the multiple PSSCH occasions. For example, a receiving UE may generate a codebook indicating ACK/NACK bits, wherein each bit in the codebook corresponds to a PSSCH occasion of a slot of a plurality of slots (e.g., more than one slot) occurring during a time period (e.g., a HARQ timeline) configured for the receiving UE. In certain aspects, there may be multiple PSSCH occasions in a slot, such as corresponding to multiple spatial layers and/or multiple frequency carriers, and accordingly there may be multiple ACK/NACK bits for a given slot. In certain aspects, the ACK/NACK bits for PSSCH occasions on different layers within the slots of a time period are conveyed in a single PSFCH resource, such that where the number of slots of the time period is N and the number of layers used for communication on a particular frequency carrier/subchannel is L, the number of ACK/NACK bits indicated in the PSFCH resource associated with the time period and subchannel is N×L.

In certain aspects, a receiving UE may generate a type-2 HARQ codebook for providing multi-bit feedback in a single PSFCH resource. For a type-2 HARQ codebook in sidelink, a sidelink acknowledgement index (SAI) counter may be introduced in a sidelink control information (SCI) grant from a transmitting UE, where the SAI indicates to the receiving UE how many ACK/NACK bits the transmitting UE is expecting the receiving UE to transmit back to the transmitting UE in a corresponding PSFCH instance. The SAI field may be introduced to allow the receiving UE to detect missing SCI (e.g., SCI-2) such that the receiving UE can perform necessary padding on the HARQ codebook. The SAI may also be introduced to allow the transmitting UE to interpret the feedback bits and possibly determine transport blocks (TBs) for which feedback is missing or is otherwise not received or indicated by the receiving UE.

In certain aspects, a receiving UE may generate a type-3 HARQ codebook for providing multi-bit feedback in a single PSFCH resource. For type-3 HARQ codebook in sidelink, a HARQ-ACK feedback trigger may be introduced in an SCI grant from a transmitting UE, where a value for the HARQ-ACK feedback trigger may indicate to a receiving UE whether or not to transmit HARQ-ACK feedback.

In certain aspects, a receiving UE may generate a type-1 HARQ codebook for providing multi-bit feedback in a single PSFCH resource. In some cases, for a type-1 HARQ codebook, the size of the codebook may be fixed to the number of PSSCH occasions that occur during a particular time period, irrespective of a number of PSSCH occasions within the time period that the receiving UE is scheduled to receive sidelink data messages from a transmitting UE.

Figure 7:
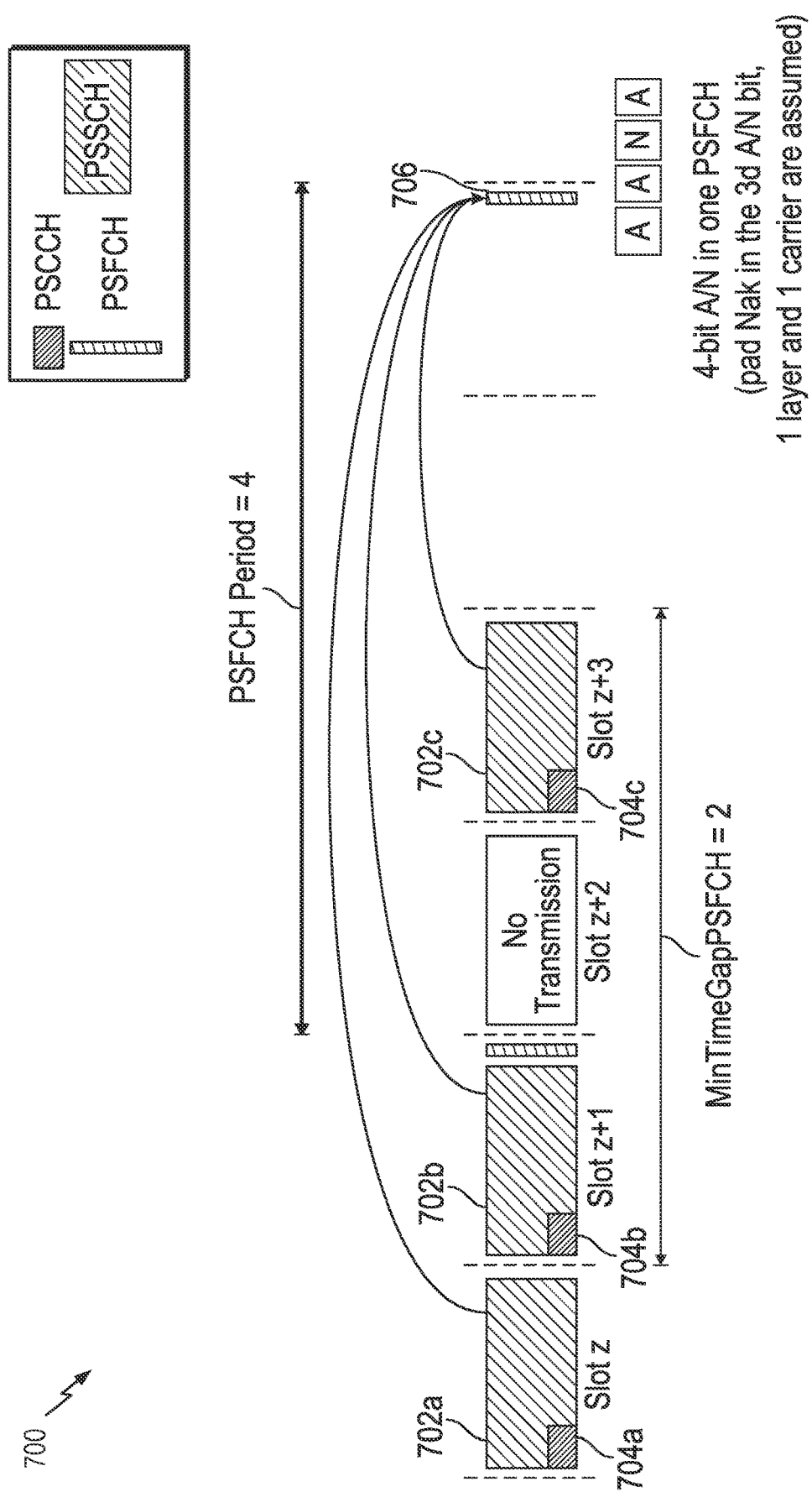
FIG. 7 depicts an example resource mapping that supports techniques for type-1 hybrid automatic repeat request (HARQ) codebook PSFCH transmission for a fixed HARQ timeline.

FIG. 7 illustrates example resource mapping 700 that supports techniques for type-1 HARQ codebook PSFCH transmission for a fixed HARQ timeline. In accordance with resource mapping 700, a wireless device, such as a receiving UE, may transmit an indication of a sidelink type-1 HARQ codebook that includes ACK and/or NACK feedback for multiple PSSCH occasions, occurring over multiple slots, in a single PSFCH resource. One or more of the bits of the codebook may correspond to one or more sidelink data messages scheduled and transmitted on the PSSCH occasions occurring over the multiple slots. Further, one or more of the bits of the codebook may not be associated with any sidelink data message on the PSSCH occasions occurring over the multiple slots.

For the fixed HARQ timeline, a PSFCH resource pool may be configured with a PSFCH period of N, where N is an integer equal to or greater than one. The configured PSFCH period, N, may indicate a number of fixed N slots (e.g., with or without PSCCH/PSSCH transmission) which may map to the same PSFCH occasion for sidelink HARQ feedback. As shown in the example of FIG. 7, the PSFCH resource pool may be configured with a PSFCH period of four, such that four slots, each with a PSSCH occasion, map to a same PSFCH occasion 706 for ACK/NACK feedback transmission. In other words, the size of a codebook transmitted at PSFCH occasion 706 may be fixed to indicate four ACK/NACK bits corresponding to each of the PSSCH occasions of the four slots.

As illustrated, a transmitting UE (e.g., such as UE 104-*a* in FIG. 5) may transmit multiple PSSCH transmissions 702 (e.g., sidelink data messages) to a receiving UE (e.g., such as UE 104-*b* in FIG. 5). The transmitting UE may transmit a PSCCH transmission 704*a* scheduling a PSSCH transmission 702*a*, a PSCCH transmission 704*b* scheduling a PSSCH transmission 702*b*, and a PSCCH transmission 704*c* scheduling a PSSCH transmission 702*c*. The transmitting UE may transmit the PSSCH transmission 702*a* to the receiving UE on a PSSCH occasion z during a slot z, may transmit the PSSCH transmission 702*b* to the receiving UE on a PSSCH occasion z+1 during a slot z+1, and may transmit the PSSCH transmission 702*c* to the receiving UE on a PSSCH occasion z+3 during a slot z+3. Each of the PSSCH transmissions 702 may be multiplexed with the corresponding PSCCH transmission 704, which may include SCI related to the PSSCH transmissions 702.

After monitoring for the PSSCH transmissions 702 from the transmitting UE, the receiving UE may generate a codebook (e.g., a type-1 HARQ-ACK codebook for sidelink messages) that indicates ACK and/or NACK bits corresponding to the fixed N slots. For example, the codebook may indicate an ACK or NACK bit corresponding to slot z, an ACK or NACK bit corresponding to slot z+1, an ACK or NACK bit corresponding to slot z+2, and an ACK or NACK bit corresponding to slot z+3.

As illustrated, the receiving UE may receive PSSCH transmission 702a during the slot z, may receive PSSCH transmission 702b during the slot z+1, and may receive PSSCH transmission 702c during the slot z+3. Further, as illustrated, the receiving UE may not receive a PSSCH transmission during slot z+2, nor may the receiving UE be scheduled to receive a PSSCH transmission during slot z+2. Accordingly, the codebook generated by the receiving UE may include an ACK bit for slot z, an ACK bit for slot z+1, a NACK bit for slot z+2 (e.g., for padding), and an ACK bit for slot z+3.

The receiving UE may transmit an indication of the generated codebook to the transmitting UE. The receiving UE may transmit an indication of the generated codebook in accordance with a sidelink feedback configuration, which may include the PSFCH period (e.g., PSFCH period=N=4) and a minimum PSFCH time gap (e.g., denoted as MinTimeGapPSFCH in FIG. 7). The minimum PSFCH time gap may refer to a minimum number of slots between when the receiving UE receives a sidelink message and when the receiving UE can transmit feedback (e.g., HARQ-ACK feedback) for the sidelink message. For example, the minimum PSFCH time gap in FIG. 7 is configured to be equal to two slots (e.g., MinTimeGapPSFCH=2). Accordingly, because the PSSCH transmission in slot z+3 is at least two slots prior to the PSFCH occasion 706, the receiving UE may be able to transmit HARQ-ACK feedback (e.g., the ACK bit) for PSSCH transmission 702c in slot z+3. In other words, the receiving UE may transmit HARQ-ACK feedback for the PSSCH transmission 702c in the first slot that includes PSFCH resources and is at least two slots after the last slot in which the receiving UE receives PSSCH transmission 702c.

In accordance with this sidelink feedback configuration, the receiving UE may transmit an indication of the generated codebook (e.g., including ACK/NACK bits for multiple PSSCH occasions over multiple slots) to the transmitting UE over a plurality of resource blocks of a single PSFCH resource of PSFCH occasion 906.

The example resource mapping 700 illustrated in FIG. 7 assumes that each PSSCH transmission 702a, 702b, and 702c is scheduled and transmitted by a same transmitting UE. Alternatively, where a PSSCH transmission is scheduled and transmitted by another transmitting UE, the receiving UE may transmit a different multi-bit feedback (e.g., in another PSFCH resource) for the other transmitting UE. For example, the receiving UE may generate another codebook (e.g., a type-1 HARQ-ACK codebook for sidelink messages) that includes ACK and/or NACK bits corresponding to the fixed N slots. The codebook may include an ACK or NACK bit for a slot where the PSSCH was scheduled by the other UE.

In some other cases, for a type-1 HARQ codebook, the size of the codebook may be dynamic (e.g., a number of bits included in a first codebook may be more or less than a number of bits included in a second codebook). In particular, a receiving UE may be configured with a dynamic HARQ timeline, where different time periods may be configured with a different number of slots. Accordingly, the size of a codebook generated by the receiving UE for conveying multi-bit feedback may be based on a number of PSSCH occasions within the particular time period, where a number of bits included in the codebook correspond to the number of PSSCH occasions occurring within the particular time period.

Figure 8:
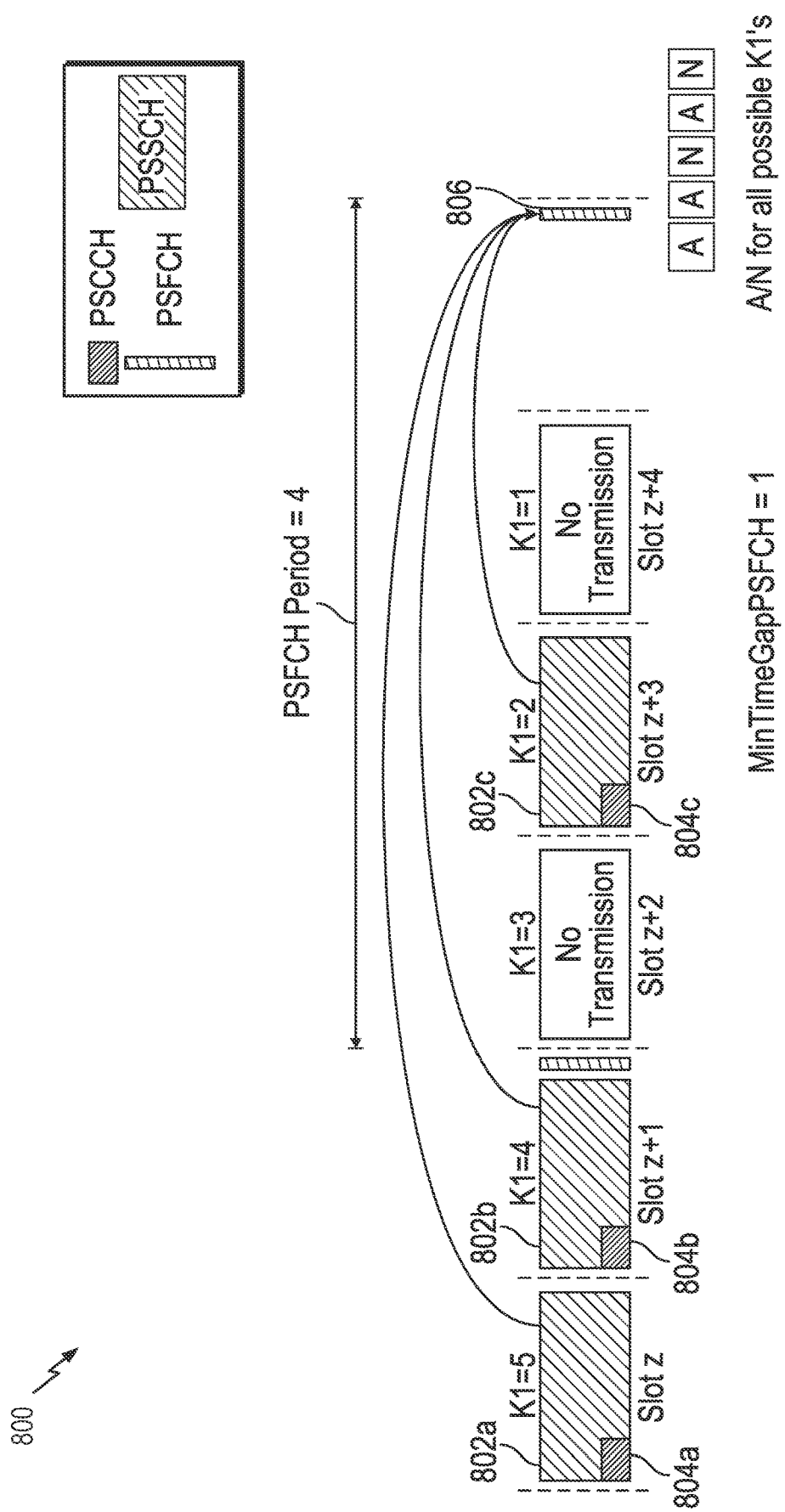
FIG. 8 depicts an example resource mapping that supports techniques for type-1 HARQ codebook PSFCH transmission for a dynamic HARQ timeline.

FIG. 8 illustrates example resource mapping 800 that supports techniques for type-1 HARQ codebook PSFCH transmission for a dynamic HARQ timeline. In accordance with resource mapping 800, a wireless device, such as a receiving UE, may transmit an indication of a sidelink type-1 HARQ codebook that includes ACK and/or NACK feedback for multiple PSSCH occasions, occurring over multiple slots, in a single PSFCH resource. One or more of the bits of the codebook may correspond to one or more sidelink data messages scheduled and transmitted on the PSSCH occasions occurring over the multiple slots. Further, in certain aspects, one or more of the bits of the codebook may not be associated with any sidelink data message on the PSSCH occasions occurring over the multiple slots.

Unlike the fixed HARQ timeline, for the dynamic HARQ timeline, a number of bits included in a codebook generated by the receiving UE may be based on an offset value, e.g., a K1 value, defining a duration between the scheduling of a sidelink data message and transmission of an indication of the generated codebook, containing a bit for the sidelink data message, to the transmitting UE.

However, the type-1 HARQ codebook size may be limited by a threshold. The threshold size of the type-1 HARQ codebook may be based on (1) a number, $N_{K1}$, of possible K1 values (e.g., a number of possible K1 values which may be satisfied) and (2) a number of spatial layers, L. Accordingly, the type-1 HARQ codebook size may include a number of ACK/NACK bits equal to $N_{K1} \times L$.

As illustrated in example resource mapping 800, a transmitting UE (e.g., such as UE 104-a in FIG. 5) may schedule a receiving UE (e.g., such as UE 104-b in FIG. 5) to receive PSSCH transmissions on PSSCH occasions occurring in multiple slots, where each slot includes a PSSCH occasion. The transmitting UE may schedule each PSSCH transmission via SCI transmitted in a control channel (e.g., PSCCH), similar to FIG. 7. For example, SCI transmitted in PSCCH 804a in slot z may schedule PSSCH transmission 802a in slot z, SCI transmitted in PSCCH 804b in slot z+1 may schedule PSSCH transmission 802b in slot z+1, and SCI transmitted in PSCCH 804c in slot z+3 may schedule PSSCH transmission 802c in slot z+3. In certain aspects, each of the PSSCH transmissions 802 may be multiplexed with a corresponding PSCCH transmission 804, which may include the SCI related to the PSSCH transmissions 802.

The SCI related to each of the PSSCH transmissions 802 may include a K1 value. For example, PSSCH transmission 802 in slot z+3 may be multiplexed with a PSCCH transmission including an SCI having a K1 value set to two. Because a subsequent (e.g., next in time) PSFCH occasion (e.g., PSFCH occasion 806) for transmitting ACK/NACK bits is two slots in time after the reception of PSSCH 802c in slot z+3, the K1 value is satisfied (e.g., K1 offset value=2, and the PSSCH occasion is offset by 2 slots); thus, an ACK/NACK bit for PSSCH 802c may be included in a feedback message transmitted at PSFCH occasion 806.

In the example illustrated in FIG. 8, the receiving UE may generate a codebook (e.g., a type-1 HARQ-ACK codebook for sidelink messages) that indicates five ACK and/or NACK bits corresponding a PSSCH occasion of five slots including slot z, slot z+1, slot z+2, slot z+3, and slot z+4. Based on the illustrated PSFCH occasion 806 located one slot in time after slot z+4, each of the K1 values for each slot illustrated in FIG. 8 may be satisfied. Thus, the codebook may indicate an ACK or NACK bit for each of these slots. Where a K1 value for a slot would not have been satisfied, then an ACK or NACK bit for the slot may not be indicated in the codebook to be transmitted in PSFCH occasion 806.

The receiving UE may transmit an indication of the generated codebook to the transmitting UE. The receiving UE may transmit an indication of the generated codebook in accordance with a sidelink feedback configuration, which may include a PSFCH period (e.g., PSFCH period=N=4) and/or a minimum PSFCH time gap (e.g., denoted as MinTimeGapPSFCH in FIG. 8). Specifically, for the dynamic HARQ timeline, a PSFCH resource pool may be configured with a PSFCH period of N, for purposes of controlling the frequency of transmission/reception switching gaps. For example, in certain aspects, in the sidelink unlicensed (SL-U) band, gaps before and after PSFCH transmissions may break the channel occupancy time (COT). Further, in certain aspects, smaller PSFCH periodicity may be less preferable. Accordingly, setting the PSFCH periodicity may help to define common time resources for all receiving devices to transmit PSFCH.

PSFCH designs (e.g., fixed or dynamic) capable of conveying multi-bit feedback in a single PSFCH resource be implemented to realize one or more of the following potential advantages. In some scenarios, for example, a system may support an extension of various protocol types (such as an enhanced mobile broadband (eMBB) protocol type) or carrier aggregation to sidelink, and a receiving UE may likely receive a continuous stream of sidelink data transmissions (such that the receiving UE may receive multiple sidelink data transmissions between PSFCH occasions) or may otherwise attempt to convey more feedback information (such as an ACK/NACK bit for each of multiple carriers) in a given PSFCH occasion. Additionally, or alternatively, in some scenarios, a receiving UE may support sidelink communication over an unlicensed band. In such scenarios, the receiving UE may be scheduled with relatively few or sparse PSFCH occasions (such as sparser than a spacing of four slots between PSFCH occasions), which also may result in the receiving UE receiving multiple sidelink data transmissions between PSFCH opportunities. In any of such scenarios, instead of using (such as using frequency division multiplexing (FDMing)) multiple PSFCH resources to convey multiple feedback bits, the receiving UE may convey multi-bit feedback on a single PSFCH resource, which may reduce a quantity of PSFCH resources used at a same time (by a same receiving UE). As such, a receiving UE may provide more complete feedback or may provide feedback with lower latency without hindering a multiplexing capability of the system. Further, and as a result of more complete or lower latency feedback and maintained or greater multiplexing capability, the receiving UE and the system may experience greater reliability and lower signaling overhead, and the receiving UE may experience reduced power consumption. As such, the receiving UE and the system may experience higher data rates, greater spectral efficiency, and greater system capacity, among other benefits.

Aspects Related to Interlace-Based Sidelink Feedback Channel Transmissions for the Sidelink Unlicensed Spectrum (SL-U)

The deployment of new radio (NR) over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth available for unlicensed band communications. Additionally, NR-U can also be deployed over 2.4 GHz unlicensed bands, which are currently shared by various radio access technologies (RATS), such as wireless local area network (WLAN) or WiFi and/or license assisted access (LAA). Sidelink can benefit from utilizing the additional bandwidth available in the unlicensed spectrum.

NR sidelink has been used for vehicle-to-everything (V2X) communications over licensed bands. Recently, 3rd generation partnership project (3GPP) has supported the sidelink for other applications (other than the V2X). So far, efforts to use the sidelink for the other applications have been limited to the licensed bands, yet not every other application can access the licensed bands. The present application describes techniques for UEs to perform sidelink communications in an unlicensed spectrum. The deployment of sidelink over an unlicensed spectrum is referred to as sidelink unlicensed (SL-U).

Unlicensed bands may have regulatory restrictions imposed on physical channels/signals operating in unlicensed spectrum. Such regulatory restrictions imposed on physical channels/signals operating in unlicensed spectrum may be related to the bandwidth occupied by these channels/signals, referred to as Occupied Channel Bandwidth (OCB). The OCB is defined as the bandwidth within which 99% of signal power is located. According to the ETSI specifications, OCB should be at least 80% of a nominal channel bandwidth (NCB). This is needed to achieve harmonious coexistence with other systems, such as Wi-Fi.

Further, certain unlicensed bands may have regulatory limits on the maximum transmit power, the total transmit power, and/or the maximum power spectral density (PSD) that a transmitter device may transmit in a frequency band given communication devices using various wireless communication protocols may coexist. PSD requirements are commonly defined in terms of a maximum transmission power within a frequency bandwidth of about 1 MHz. For example, a certain frequency band may have a PSD limit of about 10 decibel milliwatts per MHz (dBm/MHz). Thus, a transmission in any 1 MHz bandwidth within the frequency band may not exceed 10 dBm. However, a device may be capable of transmitting at a higher power.

One approach to satisfy the OCB/NCB and PSD requirements is to spread the frequency occupancy of a transmission signal over a wider bandwidth. In other words, a device may communicate in a frequency spectrum using frequency interlace-based resources. For example, a frequency band may be partitioned into multiple sets of interlaced frequency resources. A signal may be transmitted using a set of interlaced frequency resources spaced apart from each other and interlaced with another set of interlaced frequency resources. Each set of interlaced frequency resources may be referred to as a frequency interlace. The distribution of the transmission signal in a frequency domain may reduce the transmit PSD of the signal and help to meet OCB requirements.

In certain aspects, for SL-U, interlaced frequency resources may include interlaced physical sidelink feedback channel (PSFCH) resources. In particular, a PSFCH resource may have a block-interlaced waveform to meet uplink OCB requirements, which may be driven by requirements for using the unlicensed band (but may also be used in the licensed band).

Figure 9:
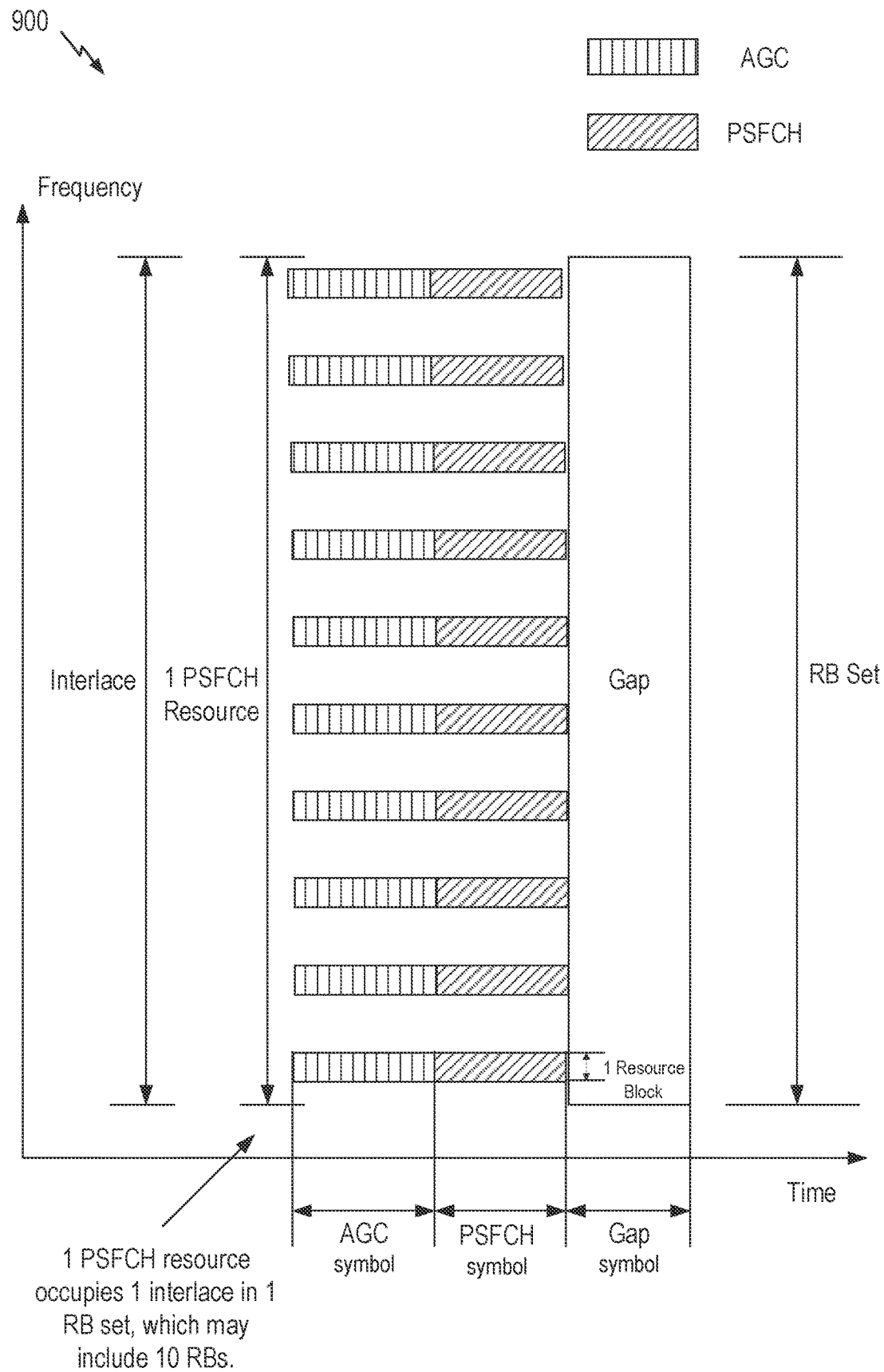
FIG. 9 depicts an interlaced PSFCH transmission.

FIG. 9 illustrates an interlaced PSFCH transmission 900. Each PSFCH resource may occupy one interlace in one resource block (RB) set. As shown in FIG. 9, the interlaced PSFCH transmission 900 uses non-consecutive physical RBs (PRBs) to meet OCB requirements. In an example, the interlaced PSFCH may be separated by ten PRBs (e.g., much larger than 3GPP Release 16 sidelink PSFCH).

In certain aspects, similar to physical uplink control channel (PUCCH) formats PF0 and PF1 introduced in 3GPP Release 16 NR-U, PSFCH formats are supported to include mapping to physical resources of one full interlace in 20 MHz. In certain aspects, various alternatives may be used for sequence type and mapping including (1) repetition of the length-12 sequence in each PRB of an interlace with a mechanism to control peak-to-average power ratio/cubic metric (PAPR/CM) considering cycling cyclic shifts across PRBs, (2) mapping of a single long sequence to the PRBs of an interlace (e.g., with index modulation), and (3) orthogonal frequency division multiplexing waveform using all resource blocks in the interlace (and to improve user multiplexing, orthogonal cover code 2 (OCC2) or OCC4 may be introduced).

In certain aspects, satisfying the OCB/NCB and PSD requirements by communicating in the frequency spectrum using frequency interlaced-based resources, may be at the cost of UE multiplexing capacity. For example, a number of RBs in a 10 MHz bandwidth channel may be equal to 50 RBs, where each RB is assigned twelve subcarriers. The 50 RBs may be partitioned into multiple sets of interlaced frequency resources, where each set of interlaced frequency resources is referred to as an interlace group. Specifically, the 50 RBs may be partitioned into five interlace groups where each interlace occupies 10 RBs (e.g., 50 RBs/10 RBs per interlace group=5 interlace groups). With five interlace groups (e.g., in subcarrier spacing (SCS) equal to 30 KHz) and where a number of configured cyclic shift (CS) pairs is equal to six, one PSFCH symbol, with the 50 RB bandwidth, may only multiplex bits for 30 UEs (e.g., 5 interlaces×6 CS pairs=30). Accordingly, the UE multiplexing capacity may be ten times less than traditional designs, for the same bandwidth, where frequency interlaced-based resources are used. In particular, traditionally one PSFCH resource occupies one RB; thus, given the PSFCH resource now occupies ten RBs, the UE multiplexing capacity may be ten times less.

Further, multiple receiving UEs (e.g., each UE scheduled to receive PSSCH) may share a same PSFCH instance, over a same symbol, and thus be expected to transmit ACK/NACK bits using resources of the same PSFCH symbol. However, one PSFCH symbol may not have enough resources for each receiving UE to transmit such feedback. For example, one PSFCH symbol may not have 30 or more resources for 30 or more receiving UEs to transmit ACK/NACK feedback associated with the one or more PSSCH occasions. This issue may often occur in groupcast cases where multiple receiving UEs are scheduled to receive sidelink data messages from a transmitting UE, and each receiving UE is expected to provide AKC/NACK feedback regarding the scheduled transmission.

Accordingly, PSFCH waveforms which satisfy at least the 2 MHz OCB constraint and/or PSD requirements, while accommodating UE multiplexing capability, may be desired.

Aspects Related to Partial Interlace-Based PSFCH Transmissions

Aspects of the present disclosure support the transmission of feedback for one or more PSSCH occasions in a single PSFCH resource having a partial interlace based structure. In particular, a receiving UE may be scheduled to receive one or more sidelink data messages from a transmitting UE in one or more PSSCH occasions. In certain aspects, the receiving UE may be requested to provide feedback (e.g., ACK or NACK feedback) for the scheduled one or more sidelink data messages. In certain aspects, the receiving UE may provide feedback for each PSSCH occasion via a PSFCH resource occupying a partial interlace group comprising X RBs, where X is an integer greater than or equal to two.

As mentioned, a frequency band may be partitioned into multiple interlace groups. Each interlace group may have a non-contiguous resource allocation which consists of a number of RBs (e.g., 10 or 11 RBs) where the RBs are separated by a number of tone(s) in the frequency domain. The interlace structure may vary based on subcarrier spacing (SCS) and bandwidth.

According to aspects described herein, each interlace may be further partitioned into multiple partial interlace groups, where each partial interlace group consists of a number, X, of RBs. X RBs per partial interlace group may be equal to or greater than two to fulfill the temporary 2 MHz OCB requirement in the sidelink unlicensed band (e.g., 2 RBs=2.16 MHz). According to certain aspects of the present disclosure, the transmission of feedback for one or more PSSCH occasions may be via a single PSFCH resource occupying a partial interlace group consisting of X RBs, as opposed to occupying all RBs of an interlace group. For example, the PSFCH resource may occupy two RBs of a ten RB interlace (e.g., a partial interlace group), instead of the full ten RBs of the ten RB interlace group. In this way, more resources may be available for providing ACK/NACK feedback. For example, five PSFCH resources may occupy the ten RB interlace group having two RB partial interlace groups (e.g., where each PSFCH resource occupies two RBs), as opposed to one PSFCH resource occupying the ten RB interlace group (e.g., where one PSFCH resource occupies the ten RBs).

The number, X, of RBs per partial interlace may be configured per resource pool, which may allow for increased UE multiplexing capacity or increased ACK/NACK multiplexing capacity. In particular, where X is configured to be a smaller value, a number of available PSFCH resources may be higher. Accordingly, a number of UEs capable of transmitting ACK/NACK bits in a same PSFCH instance may increase (e.g., UE multiplexing capacity may increase due to an increase in the number of available resources), or a number of ACK/NACK bits for which a UE may multiplex in a same PSFCH instance may increase (e.g., (e.g., ACK/NACK multiplexing capacity for a single UE may increase due to an increase in the number of available resources).

In certain aspects, there may be a plurality of PSFCH resources arranged in one or more resource pools. Further, in certain aspects, each PSFCH resource may include a plurality of frequency resources (e.g., a plurality of RBs, which are grouped into a plurality of frequency partial interlace groups). Accordingly, certain aspects herein provide techniques for mapping (e.g., hashing) feedback for one or more PSSCH occasions to a particular PSFCH resource and/or particular frequency resources in a PSFCH resource. The resource mapping described herein may allow for collision avoidance among different receiving UEs transmitting sidelink feedback. In certain aspects, such mapping may be based on at least one of an identifier associated with the transmitting UE or a groupcast identifier (e.g., of a group including the receiving UE) associated with the one or more sidelink data messages.

In certain aspects, a UE may be configured with one or more PSFCH resource sets (also referred to as PSFCH resource pools). Each PSFCH resource set may correspond to a particular interlace group index and a particular partial interlace group index. Further, in some cases, each PSFCH resource set may further correspond to a CS pair set for a particular interlace index and partial interlace index. Accordingly, in certain aspects, control information (e.g., sidelink control information (SCI)) used to schedule a receiving UE to receive a sidelink data message from a transmitting UE may include an indication of a PSFCH resource set to use (e.g., among the one or more PSFCH resource sets configured for the UE) when providing PSFCH feedback for the scheduled sidelink data message. The UE may select resources (e.g., hash to resources) within this indicated PSFCH resource set (e.g., within this indicated interlace group, partial interlace group, and/or CS pair set) based on at least one of an identifier (ID) of a transmitter UE transmitting the sidelink data message in the PSSCH occasion or a groupcast ID associated with the sidelink data message transmitted in the PSSCH occasion. This dynamic PSFCH resource set indication in the control information may help in scenarios where PSFCH resources may be limited and/or efficiently assign limited PSFCH resource sets to different receiving UEs for transmitting ACK/NACK feedback. Further, such hashing techniques within each PSFCH resource set may help to avoid collisions in feedback reporting, for example, such as avoiding different receiving UEs transmitting different feedback in the same resources.

Further, in certain aspects, a receiving UE may be scheduled to receive multiple sidelink data messages from a same transmitting UE over multiple PSSCH occasions. Accordingly, certain aspects described herein provide techniques for providing feedback for multiple PSSCH occasions, occurring over multiple slots and corresponding to one or more sidelink data messages, in a single PSFCH resource, the single PSFCH resource having a partial interlace based structure to meet OCB and/or power spectral density (PSD) requirements. Further, transmitting multiple ACK/NACK bits in a single PSFCH resource may reduce signaling overhead and power consumption at the receiving UE, and further reduce sidelink feedback reporting latency.

Figure 10:
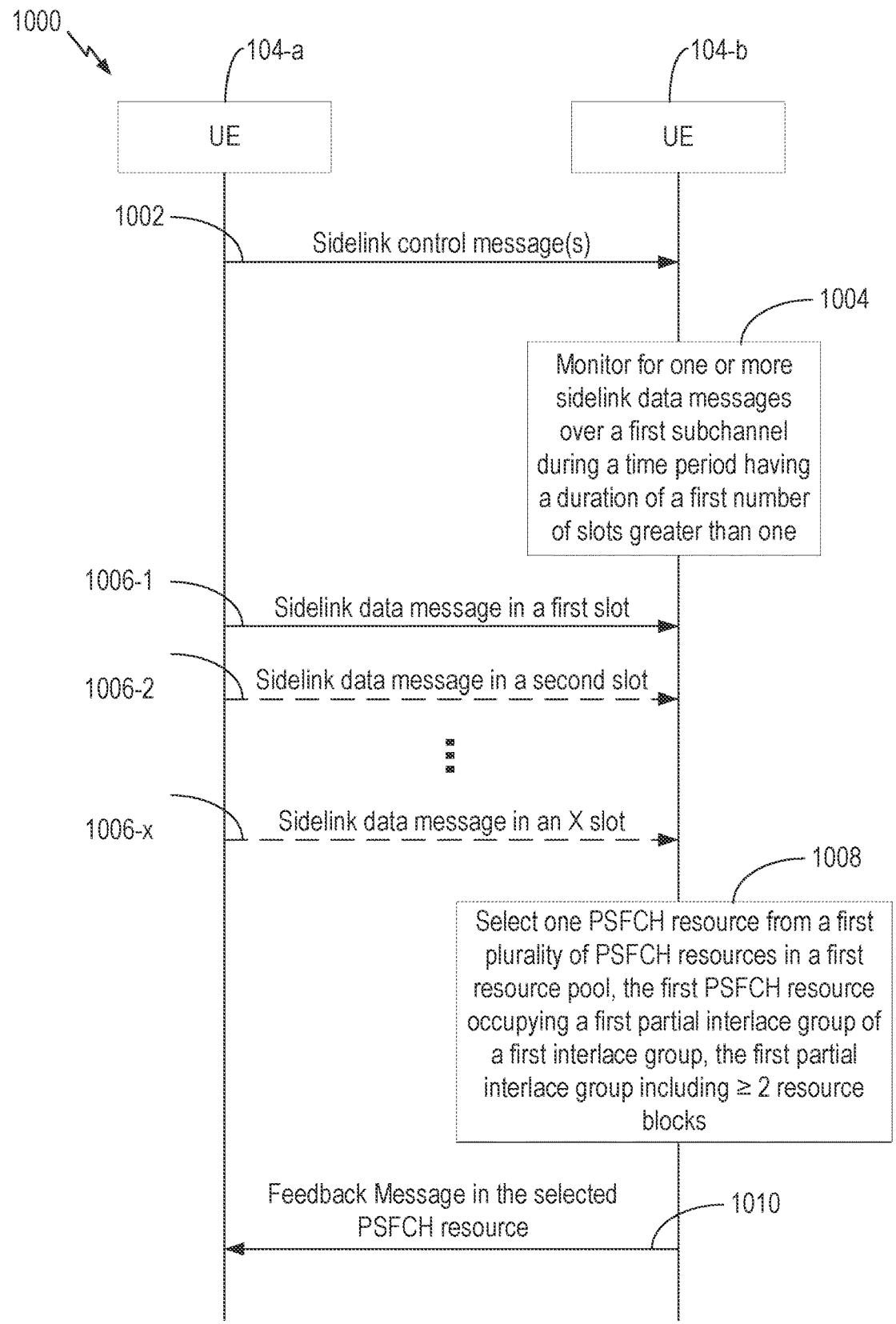
FIG. 10 is a call flow diagram depicting example sidelink signaling for providing sidelink feedback via a partial interlace-based PSFCH waveform.

FIG. 10 is a call flow diagram 1000 illustrating example sidelink signaling for providing sidelink feedback via a partial interlace-based PSFCH waveform. As shown in call flow diagram 1000, a transmitting UE 104-*a*, may be in sidelink communication with a receiving UE 104-*b*. According to aspects described herein, UE 104-*a* and UE 104-*b* may support a partial-interlace-based PSFCH design.

As shown in FIG. 10, at 1002, UE 104-*a* transmits sidelink control message(s) to UE 104-*b*. Each sidelink control message from UE 104-*a* schedules UE 104-*b* to receive a sidelink data message from UE 104-*a* on a PSSCH occasion occurring in a slot. In particular, control information (e.g., SCI) in each sidelink control message may schedule a sidelink data message.

In certain aspects, sidelink control message(s) from UE 104-*a* may include radio resource control (RRC) signaling that indicates a minimum PSFCH time gap (e.g., a minimum time duration between PSSCH transmission and PSFCH transmission), a PSFCH periodicity (e.g., a number of slots between PSFCH resources), a mapping between PSSCH resources and PSFCH resources, a PSFCH resource pool configuration, an algorithm for identifying PSFCH resources based on identifiers of the UEs, or a combination thereof. Such RRC signaling may be separate from SCI scheduling a sidelink data message, and for example, may occur less frequently and prior to communication of SCI.

At 1004, UE 104-*b* monitors for one or more sidelink data messages, during a specified time period, based on the received sidelink control message(s) transmitted at 1002. The specified time period may be over multiple slots (e.g., a duration of a number of slots greater than one). For example, where UE 104-*b* receives a first sidelink control message transmitted at 1002 scheduling a first sidelink data message on a first PSSCH occasion in a first slot, UE 104-*b* monitors for the first sidelink data message on the first PSSCH occasion in the first slot. Further, where UE 104-*b* receives a second sidelink control message at 1002 scheduling a second sidelink data message on a second PSSCH occasion in a second slot, UE 104-*b* monitors for the second sidelink data message on the second PSSCH occasion in the second slot.

At 1006, UE 104-*a* transmits one or more sidelink data messages during the specified time period. For example, as shown in the example of FIG. 10, UE 104-*a* transmits a single sidelink data message to UE 104-*b* on a first PSSCH resource in a first slot at 1006-1. Optionally, in some other cases, UE 104-*a* may transmit one or more other sidelink data messages to UE 104-*b* on one or more other PSSCH resources in other slots at 1006 (e.g., 1006-2-1006-*x*).

At 1008, UE 104-*b* selects one PSFCH resource from a first plurality of PSFCH resources in a first resource pool. The PSFCH resource selected by UE 104-*b* may occupy a first partial interlace group of a first interlace group. The first partial interlace group may include at least two RBs. Example partial interlace groups which a PSFCH resource may occupy are described in more detail below with respect to FIG. 11.

At 1010, UE 104-*b* transmits, to UE 104-*a*, a feedback message in the selected PSFCH resource. In particular, the feedback message may be transmitted over the at least two RBs (e.g., belonging to the partial interlace) of the PSFCH resource of a first feedback channel occasion of a set of periodically occurring feedback channel occasions. The feedback message may indicate a feedback bit for the sidelink data message received at 1006-1. In cases where more than one sidelink data messages are received at 1006, the feedback message may indicate a plurality of feedback bits associated with the one or more sidelink data messages. For example, the feedback message may include the plurality of feedback bits, or may include a codebook indicative of the plurality of feedback bits, meaning the codebook may include other data that maps to or represents the plurality of feedback bits. In certain aspects, the one or more feedback bits included in the feedback message include ACK or NACK bits.

Figure 11:
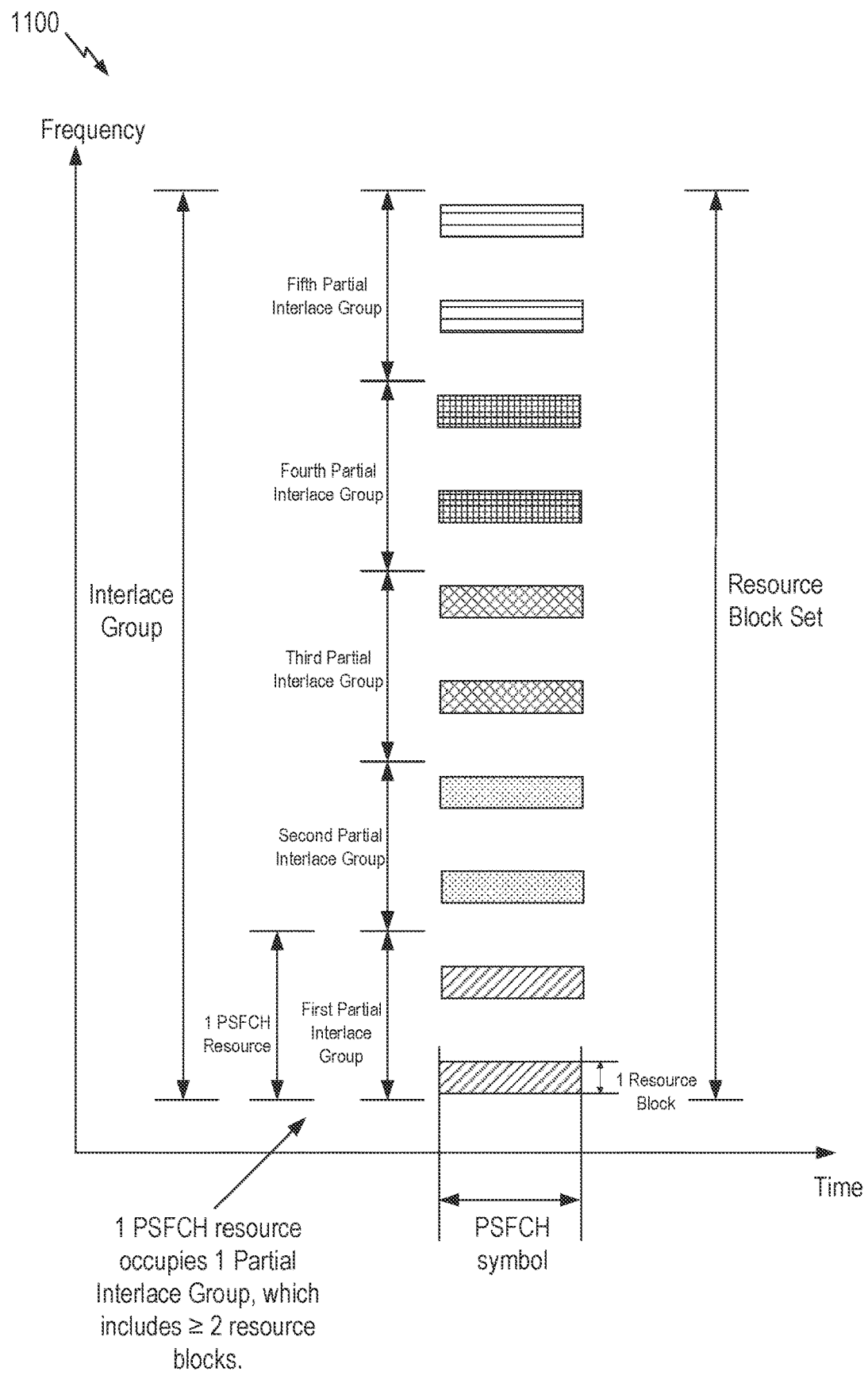
FIG. 11 depicts an interlaced PSFCH transmission with partial interlaces.

The PSFCH resource selected and used for transmitting the one or more feedback bits in call flow 1000 of FIG. 10 may be better understood with reference to FIG. 11, which illustrates an example interlaced PSFCH transmission 1100 with partial interlace groups.

As illustrated in FIG. 11, each PSFCH resource may occupy one partial interlace group of an interlace group in the frequency domain, where each partial interlace group includes at least two interlaced RBs in the frequency domain. For example, the illustrated interlace group may include ten interlaced RBs in the frequency domain, where the RBs are non-consecutive. The ten interlaced RBs may be partitioned into multiple partial interlace groups, where each partial interlace group consists of an amount, X, of RBs. X RBs per partial interlace group may be equal to or greater than two to fulfill the temporary 2 MHz OCB requirement in the sidelink unlicensed band (e.g., 2 RBs=2.16 MHz). Although the example interlaced PSFCH transmission 1100 with partial interlace groups illustrated in FIG. 11 illustrates each partial interlace group having 2 RBs (e.g., X=2), in some other cases, each partial interlace group may have a different amount, X, of RBs (e.g., each partial interlace group may have five RBs, where X=5).

In certain aspects, an amount of RBs per partial interlace group (e.g., X) of a first interlace group may be a same amount of RBs per partial interlace group (e.g., X) of a second interlace group. For example, a first interlace group of interlaced RBs may include five interlace groups where each of the five interlace groups has two RBs (e.g., X=2). Similarly, a second interlace group of interlaced RBs may also include five interlace groups where each of the five interlace groups has two RBs (e.g., X=2). In certain other aspects, an amount of RBs per partial interlace group (e.g., X) of a first interlace group may be a different amount of RBs per partial interlace group (e.g., X) of a second interlace group. For example, a first interlace group of interlaced RBs may include two partial interlace groups where each of the two partial interlace groups has five RBs (e.g., X=5). Further, a second interlace group of interlaced RBs may include five interlace groups where each of the five interlace groups has two RBs (e.g., X=2).

In certain aspects, the XRBs per partial interlace group may be contiguous. In certain other aspects, the X RBs per partial interlace group may be non-contiguous. In certain aspects, CS ramping may be applied across the X RBs per partial interlace group to reduce a peak-to-average power ratio (PAPR).

In certain aspects, the XRBs per partial interlace group may be configured via radio RRC signaling. In other words, a receiving UE (e.g., receiving one or more sidelink data message and needing to transmit ACK/NACK feedback for the one or more sidelink data messages) may receive signaling configuring an amount of RBs (e.g., configuring X) for each partial interlace group in a resource pool have interlaced RBs. The signaling may be RRC signaling. Accordingly, in certain aspects, a total number of partial interlace groups of interlaced RBs in the resource pool may be based on the amount of RBs (e.g., X) for each of the plurality of partial interlace groups and a subcarrier spacing (SCS).

Thus, according to certain aspects of the present disclosure, a resource pool may include a plurality of interlace groups, where the plurality of interlace groups comprise a plurality of partial interlace groups. Each of the plurality of partial interlace groups may include at least two RBs. In certain aspects, the PSFCH resource pool may include a plurality of PSFCH resources and each of the plurality of PSFCH resources may be mapped to a different interlace group of the plurality of interlace groups and a different partial interlace group of the plurality of partial interlace groups within each of the different interlace groups. In certain other aspects, each of the plurality of PSFCH resources of the PSFCH resource pool may be mapped to a different interlace group of the plurality of interlace groups, different partial interlace groups within each of the different interlace groups, and different CS pairs within each of the different partial interlace groups (e.g., 6 CS pairs per partial interlace group). Accordingly, the number of PSFCH resources for the PSFCH resource pool may depend on a number of interlace groups, a number of partial interlace groups, and/or a number of CS pairs.

For example, a number of RBs in a 10 MHz bandwidth channel may be equal to 50 RBs. The 50 RBs may be partitioned into multiple sets of interlaced frequency resources, where each set of interlaced frequency resources is referred to as an interlace group. Specifically, the 50 RBs may be partitioned into five interlace groups where each interlace group occupies 10 RBs (e.g., 50 RBs/10 RBs per interlace group=5 interlace groups). Each of the 10 RB interlace groups may also be partitioned into partial interlace groups. Specifically, each of the five 10 RB interlace groups may be partitioned into five partial interlace groups where each partial interlace group occupies 2 RBs (e.g., 10 RBs/2 RBs per partial interlace group=5 partial interlace groups). Further, each of the five partial interlace groups may have different CS pairs, for example, six CS pairs. With five interlace groups each having five partial interlace groups, and each partial interlace group having six CS pairs, 150 PSFCH resources may make up the PSFCH resource pool (e.g., 5 interlace groups×5 partial interlace groups×6 CS pairs=150 PSFCH resources). Accordingly, the UE multiplexing capacity may be two times less than traditional designs, for the same bandwidth, where frequency interlaced-based resources are used. In particular, traditionally one PSFCH resource occupies one RB; thus, given the PSFCH resource now occupies two RBs, the UE multiplexing capacity may be two times less (as opposed to ten times less where PSFCH resource are only grouped into interlace groups (e.g., having 10 RBs) and not partial interlace groups).

In certain aspects, a number of interlaced RBs for the PSFCH resource pool may not be evenly divisible by X (e.g., where X is configured and refers to the amount of RBs per partial interlace group).

For example, the total number of interlaced RBs for the resource pool may be partitioned into five interlace groups. At least one of the five interlace groups may include 11 RBs. Where X is configured to be two (e.g., X=2 RBs per partial interlace group), the 11 RBs of the interlace group may not be evenly divisible by 2 RBs. Specifically, where X is equal to 2 RBs, the 11 RBs may be partitioned into six partial interlace groups, where five of the six partial interlace groups have 2 RBs and one of the six partial interlace groups has only 1 RB. Given the last partial interlace group does not satisfy the OCB requirements (e.g., 1 RB does not satisfy such requirements), the last partial interlace group having the 1 RB may be dropped from the PSFCH resource pool, according to certain aspects described herein.

In another example, where X is alternatively configured to be three (e.g., X=3 RBs per partial interlace group), the 11 RBs of the interlace group may not be evenly divisible by 3 RBs. Specifically, where X is equal to 3 RBs, the 11 RBs may be partitioned into four partial interlace groups, where three of the four partial interlace groups have 3 RBs and one of the four partial interlace groups has only 2 RBs. Given the last partial interlace group does satisfy the OCB requirements (e.g., 2 RBs does satisfy such requirements), the last partial interlace group having the 2 RBs may be kept in the PSFCH resource pool, according to certain aspects described herein.

Accordingly, where the total number of interlaced RBs for the resource pool is not evenly divisible by X, one of two scenarios may occur: (1) a partial interlace group having RBs less than X, but still greater than 2 RBs (e., to satisfy the OCB requirement), may be kept in the PSFCH resource pool or (2) a partial interlace group having RBs less than X, and less than 2 RBs, may be dropped from the PSFCH resource pool.

As described herein, each of the interlace groups may include a plurality of RBs. Further, as previously illustrated in FIG. 9, this plurality of RBs may belong to an RB set. Each RB set may have a configured boundary (e.g., referred to as the RB set boundary). Each RB set boundary may define the guard band between each of the 20 MHz channels. Depending on the size of the guard band, some of the RBs of an interlace group may be punctured, or more specifically, some of the RBs of an end partial interlace group (e.g., such as the first partial interlace group or the fourth partial interlace group in FIG. 11) may be punctured. For this reason, determining a beginning RB of a beginning partial interlace group and an ending RB of an ending partial interlace group may be based on (1) the configured RB set boundary or (2) a minimum RB set boundary. In particular, the minimum RB set boundary may be used to determine the beginning and ending RBs where the configured RB set boundary punctures a partial interlace group. The minimum RB set boundary of a subband may be the intersection of the all the possible RB set configurations in RRC.

In certain aspects, beyond configuring an amount, X, of RBs per partial interlace group, a spacing between each RB in each partial interlace group may also be configured. In other words, certain aspects herein may allow for different sizes of partial interlace groups. As an illustrative example, assuming two partial interlace groups exist for a single interlace group, where each of the two partial interlace groups comprises 5 RBs, the 5 RBs of a first partial interlace group may be separated by a greater or a lesser amount of tones than the 5 RBs of at least another one of the partial interlace groups. An ability to configure the spacing between RBs of a partial interlace group may allow for RBs of different partial interlace groups to be positioned closer or further apart.

As mentioned, and as shown at 1010 in FIG. 10, a receiving UE may transmit a feedback message in a PSFCH resource. In particular, the feedback message may be transmitted over at least two RBs of a PSFCH resource.

In certain aspects, where the feedback message is used to indicate a single bit associated with a single PSSCH occasion, the UE may select the PSFCH resource, for transmitting the feedback message, according to a slot index and an interlace over which the PSCCH (e.g., for which feedback is to be provided) was scheduled/received. For example, partial interlace groups and CS pairs of a single-bit PSFCH resource pool may be partitioned based on a number of PSSCHs within one PSFCH period. In particular, in certain aspects, a single-bit PSFCH resource pool includes a plurality of interlace groups, a plurality of partial interlace groups per interlace group, and a plurality of CS pairs per partial interlace group. Given this PSFCH resource pool partition, one PSSCH interlace may be mapped to one PSFCH interlace. For example, there may be twenty interlaces of PSSCH and PSFCH in a resource pool such that a one-to-one mapping may exist between one PSSCH interlace and one PSFCH interlace group. Further, different slots in every PSFCH period may map to different PSFCH partial interlace groups within an interlace group associated with the PSSCH interlace.

As an illustrative example, a UE may be scheduled to receive a PSSCH in a first slot over a first PSSCH interlace. The UE may select a resource for transmitting ACK/NACK feedback for the scheduled PSSCH from a resource pool which maps to the first slot and the first PSSCH interlace. The first PSSCH interlace may be part of a first frequency interlace group among a plurality of frequency interlace groups in the single-bit PSFCH resource pool. Accordingly, the UE may select a PSFCH resource, for transmitting ACK/NACK bits for the PSSCH, from the first frequency interlace group. The first frequency interlace group may be further partitioned into partial interlace groups. Accordingly, the UE may further select a PSFCH resource, for transmitting ACK/NACK bits for the PSSCH, from a first partial interlace group which maps to the first slot where the PSSCH was scheduled/received. For selecting, or otherwise determining, a resource within the selected first partial interlace group of this first interlace group (e.g., within this selected PSFCH resource pool), the UE may use hashing and select a PSFCH resource in accordance with a value of $(P_{ID}+M_{ID}) \bmod R_{PRB,CS}^{PSFCH}$, where, as mentioned previously, $P_{ID}$ may be a physical source ID from SCI, such as second stage SCI (SCI-2), and $M_{ID}$ may be set to 0 or an identity of the UE. Variable, $R_{PRB,CS}^{PSFCH}$, may be defined in accordance with Equation 5:

$$R_{PRB,CS}^{PSFCH} = (\text{\# of partial interlaces per slot per interlace}) \cdot N_{CS}^{PSFCH} \cdot N_{type}^{PSFCH} \quad (5)$$

where $N_{CS}^{PSFCH}$ may be a quantity of cyclic shift pairs, configured per resource pool (where a pair is for indicating either ACK or NACK, such that one pair is capable of conveying 1 bit of information). $N_{type}^{PSFCH}$ may be set to 1 or equal to a quantity of subchannels for a corresponding PSSCH $N_{subch}^{PSSCH}$. In other words, a value of $N_{type}^{PSFCH}$ may indicate whether, for the subchannels in a PSSCH slot, a PSFCH resource pool is shared or not.

In certain aspects, an amount of slots, N, associated with a same PSFCH instance may be greater than an amount of partial interlace groups, Y, within an associated interlace group (e.g., based on a PSSCH interlace) (e.g., N slots>Y partial interlace groups within an interlace group). Accordingly, CS pairs for the partial interlace groups may need to be partitioned into CS pair sets, $N_{CS-set}^{PSFCH}$, such that the amount of slots, N, associated with the same PSFCH instance is less than or equal to the amount of partial interlace groups, Y, within the associated interlace group multiplied by the CS pair sets (e.g., $N \leq Y \cdot N_{CS-set}^{PSFCH}$). Accordingly, a slot where a PSSCH was scheduled/received may map to an associated partial interlace and CS pair set. For selecting, or otherwise determining, a resource within the mapped partial interlace group and CS pair set, the UE may use hashing and select a PSFCH resource in accordance with a value of $(P_{ID}+M_{ID}) \bmod N_{CS-set}^{PSFCH} \cdot N_{CS-set}^{PSFCH}$ may be equal to a number of CS pairs in a CS pair set.

In certain other aspects, a UE may need to indicate multiple bits associated with multiple PSSCH occasions in a single PSFCH resource. In particular, the feedback for multiple PSSCH occasions, occurring over multiple slots and corresponding to one or more sidelink data messages, may be reported as a codebook (e.g., a HARQ codebook) in a single PSFCH resource. A type-1 or type-2 HARQ codebook may be used for providing multi-bit feedback in a single PSFCH resource. The size of the codebook may be fixed to a number of PSSCH occasions that occur during a time period, irrespective of the number of PSSCH occasions within the time period that a receiving UE is scheduled to receive sidelink data messages from a transmitting UE.

For example, as previously illustrated in FIG. 7, a receiving UE may be scheduled to receive a sidelink data messages on each of slots z, z+1, and z+3. The multi-bit feedback for the time period, accordingly, may include a corresponding ACK/NACK bit for each of slots z, z+1, and z+3 indicating whether the corresponding scheduled sidelink data message was successfully received and decoded or not. The multi-bit feedback for the time period may also include a NACK bit for slot z+2 as padding, despite the receiving UE not being scheduled to receive any sidelink data message from the transmitting UE in slot z+2, in order to keep the fixed size of the codebook. The bits of the multi-bit feedback may be used to generate a codebook (e.g., according to a codebook generation algorithm or mapping), indicating the plurality of feedback bits of the multi-bit feedback. The receiving UE may transmit the codebook in the single PSFCH resource.

According to aspects described herein, the UE may select a PSFCH resource, for transmitting the codebook with multi-bit feedback, based on an indication of a PSFCH resource set to use (e.g., among the one or more PSFCH resource sets configured for the UE) indicated in control information (e.g., SCI-2) transmitted to the UE. Specifically, the UE may be configured with one or more PSFCH resource sets (also referred to as PSFCH resource pools). Each PSFCH resource set may correspond to a particular interlace group index and/or a particular partial interlace group index. Further, in some cases, each PSFCH resource set may further correspond to a CS pair set for a particular interlace group index and/or partial interlace group index. There may be up to six CS pairs within each CS pair set (e.g., $N_{CS\text{-}set}^{PSFCH}$ may be equal to a number of CS pairs in a CS pair set). Control information (e.g., SCI-2) used to schedule a receiving UE to receive sidelink data messages from a transmitting UE may include an indication of a PSFCH resource set to use (e.g., among the one or more PSFCH resource sets configured for the UE) when providing PSFCH feedback for the scheduled sidelink data message. For example, SCI-2 may carry a resource indicator field (e.g., PRI) with log 2(M) bits, where M indicates the resource set the receiving UE should use for transmitting the ACK/NACK feedback.

In certain aspects, different PSFCH resource sets may be indicated/used for different cast types. For example, for groupcast communication, a bigger PSFCH resource set may be needed to accommodate ACK/NACK bits from multiple receivers scheduled to receive the sidelink data messages via the groupcast communication.

The UE may select resources (e.g., hashing) within this indicated PSFCH resource set (e.g., within this indicated RB group, interlace, partial interlace, and/or CS pair set) in accordance with a value of $(P_{ID}+M_{ID}) \mod N_{CS\text{-}set}^{PSFCH} \cdot N_{CS\text{-}set}^{PSFCH}$ may be equal to a number of CS pairs in a CS pair set.

Aspects Related to Comb-Based PSFCH Transmissions

Aspects of the present disclosure further support the transmission of feedback for one or more PSSCH occasions in a single PSFCH resource having a comb-based structure. In particular, a receiving UE may be scheduled to receive one or more sidelink data messages from a transmitting UE in one or more PSSCH occasions. In certain aspects, the receiving UE may be requested to provide feedback (e.g., ACK or NACK feedback) for the scheduled one or more sidelink data messages. In certain aspects, the receiving UE may provide feedback for each PSSCH occasion via a PSFCH resource occupying resource elements (REs) from one or more RBs transmitted in a comb pattern in a frequency domain.

As mentioned with respect to FIGS. 4A-4D, an RB may extend twelve consecutive subcarriers over seven orthogonal frequency division multiplexed (OFDM) symbols. An RE is the smallest physical channel unit, each uniquely identifiable by its subcarrier index k and symbol index l within the PRB. Accordingly, the PRB having twelve consecutive subcarriers over seven OFDM symbols may include 84 REs (e.g., 12×7=84).

One PSFCH occupying one RB (e.g., having REs in twelve subcarriers) may be used to convey ACK/NACK feedback for one or more scheduled sidelink data messages. However, according to aspects described herein, REs within each of the twelve subcarriers of the RB may be stretched across multiple RBs, such that REs within each of the 12 subcarriers of the RB are transmitted on every nth subcarrier. In other words, REs of the single RB may be transmitted in a comb pattern in the frequency domain having a comb-n structure. The comb-n structure implies that REs of the single RB are transmitted on every nth subcarrier, where n may take the values of 2, 4, 6, and 12. For example, a comb-2 structure implies that REs of the single RB are transmitted on every second subcarrier in the frequency domain, a comb-4 structure implies that REs of the single RB are transmitted on every fourth subcarrier in the frequency domain, a comb-6 structure implies that REs of the single RB are transmitted on every sixth subcarrier in the frequency domain, and a comb-12 structure implies that REs of the single RB are transmitted on every twelfth subcarrier in the frequency domain. A comb-n structure is illustrated and describe in more detail below in FIG. 13.

Having REs from an RB transmitted in a comb pattern in the frequency domain helps to satisfy the temporary OCB constraint of 2 MHz. For example, a comb-6 structure implies that REs of an RB are transmitted on every sixth subcarrier. Accordingly, the REs of the RB may be transmitted on every sixth subcarrier over six RBs, which may have a bandwidth of 2.16 MHz. Further, use of the comb structure described herein for transmitting ACK/NACK feedback may not negatively impact a UE multiplexing capacity for transmitting such ACK/NACK bits in a same PSFCH instance. The UE multiplexing capacity may be the same as scenarios where REs of each RB are not transmitted in a comb pattern. Accordingly, a number of UEs capable of transmitting ACK/NACK bits in a same PSFCH instance may remain the same (e.g., UE multiplexing capacity may remain the same), or a number of ACK/NACK bits for which a UE may multiplex in a same PSFCH instance may remain the same, while also satisfying at least the temporary 2 MHz OCB constraint.

In certain aspects, a receiving UE may be scheduled to receive multiple sidelink data messages from a same transmitting UE over multiple PSSCH occasions. Accordingly, the UE may need to provide feedback for the multiple PSSCH occasions, occurring over multiple slots and corresponding to one or more sidelink data messages, in a single PSFCH resource. According to certain aspects described herein, the single PSFCH resource may have a partial interlace based structure (as described above with respect to FIG. 11). In particular, the single PSFCH resource may occupy a partial interlace group consisting of X RBs, as opposed to occupying all RBs of an interlace group, where X is at least two RBs. In certain aspects, REs of the X RBs of the partial interlace group may be transmitted in a comb pattern in the frequency domain. In other words, REs of the X RBs of a PSFCH resource may be stretched such that the ACK/NACK bits conveyed via the PSFCH resource are transmitted in a comb-N structure.

In certain aspects, there may be a plurality of PSFCH resources arranged in one or more resource pools. Further, in certain aspects, each PSFCH resource may include a plurality of frequency resources (e.g., a plurality of RBs, which are grouped into a plurality of frequency partial interlace groups and include REs transmitted in a comb pattern). Accordingly, certain aspects herein provide techniques for mapping (e.g., hashing) feedback for one or more PSSCH occasions to a particular PSFCH resource and/or particular frequency resources in a PSFCH resource. The resource mapping described herein may allow for collision avoidance among different receiving UEs transmitting sidelink feedback. In certain aspects, such mapping may be based on at least one of an identifier associated with the transmitting UE or a groupcast identifier (e.g., of a group including the receiving UE) associated with the one or more sidelink data messages.

In certain aspects, a UE may be configured with one or more PSFCH resource sets (also referred to as PSFCH resource pools). Each PSFCH resource set may correspond to a particular interlace index and a particular partial interlace index. Further, in some cases, each PSFCH resource set may further correspond to a CS pair set for a particular interlace group index and partial interlace group index. Accordingly, in certain aspects, control information (e.g., sidelink control information (SCI)) used to schedule a receiving UE to receive a sidelink data message from a transmitting UE may include an indication of a PSFCH resource set to use (e.g., among the one or more PSFCH resource sets configured for the UE) when providing PSFCH feedback for the scheduled sidelink data message. The UE may select resources (e.g., hashing) within this indicated PSFCH resource set (e.g., within this indicated interlace group, partial interlace group, comb, and/or CS pair set). This dynamic PSFCH resource set indication in the control information may help in scenarios where PSFCH resources may be limited and/or efficiently assign limited PSFCH resource sets to different receiving UEs for transmitting ACK/NACK feedback. Further, such hashing techniques within each PSFCH resource set may help to avoid collisions in feedback reporting, for example, such as avoiding different receiving UEs transmitting different feedback in the same resources.

Figure 12:
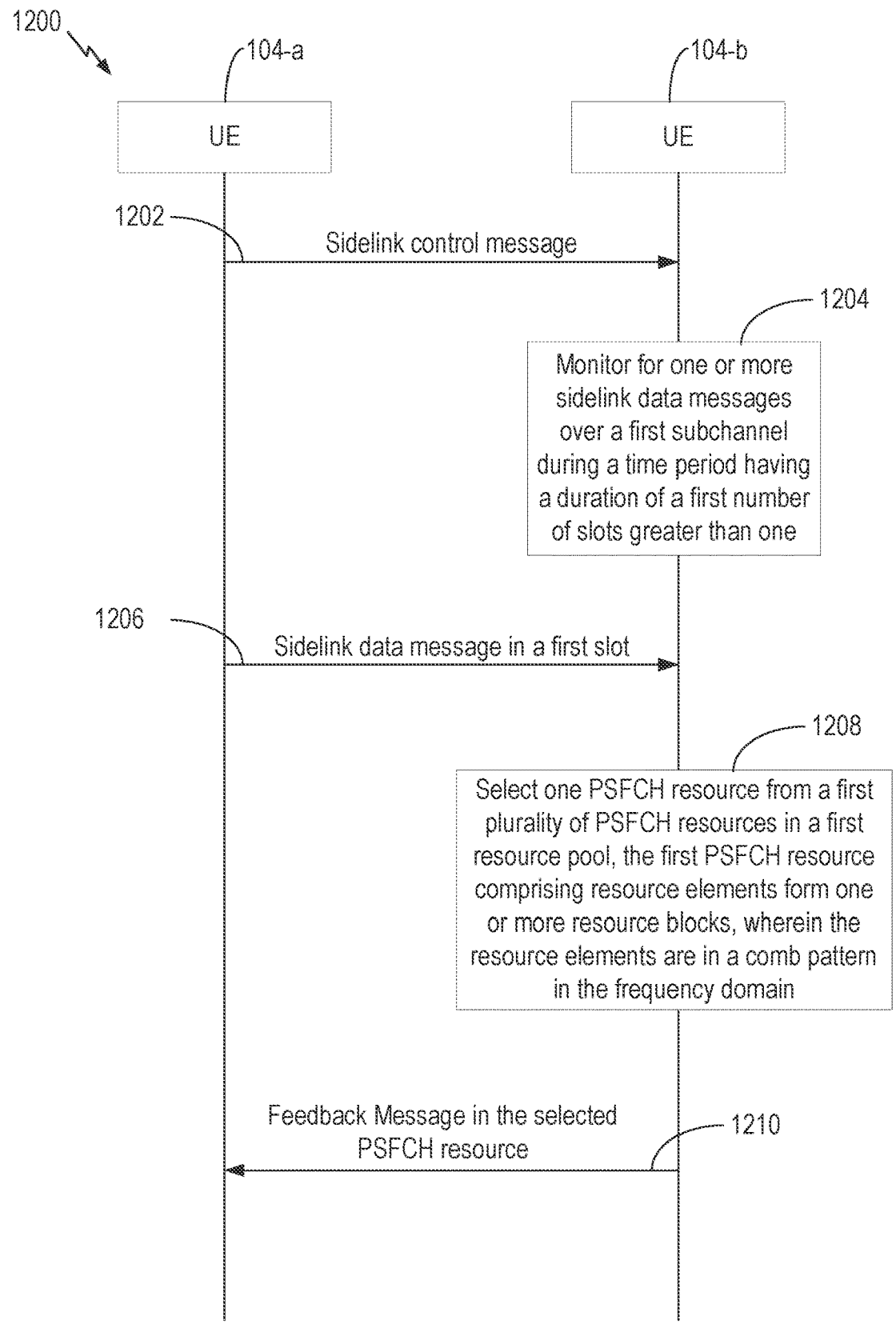
FIG. 12 is a call flow diagram depicting example sidelink signaling for providing sidelink feedback via a comb-based PSFCH waveform.

FIG. 12 is a call flow diagram 1200 illustrating example sidelink signaling for providing sidelink feedback via a comb-based PSFCH waveform. As shown in call flow diagram 1200, a transmitting UE 104-a, is in sidelink communication with a receiving UE 104-b. According to aspects described herein, UE 104-a and UE 104-b may support a comb-based PSFCH design.

Some sidelink signaling illustrated in call flow diagram 1200 of FIG. 12 may be similar to some sidelink signaling illustrated in call flow diagram 1000 of FIG. 10. For example, similar to 1002, 1004, and 1006 of FIGS. 10, at 1202, 1204, and 1206 of FIG. 11, a UE 104-a transmits sidelink control message(s) to a UE 104-b, UE 104-b monitors for one or more sidelink data messages, during a specified time period, based on the received sidelink control message(s) at 1202, and UE 104-a transmits a sidelink data message during the specified time period. For ease of explanation, only one sidelink data message may be transmitted in FIG. 12; however, in other cases, more than one sidelink data message may be transmitted to UE 104-b.

At 1208, UE 104-b selects one PSFCH resource from a first plurality of PSFCH resources in a first resource pool. In FIG. 10, the PSFCH resource selected by UE 104-b occupies a first partial interlace group of a first interlace group. However, in FIG. 11, the PSFCH resource selected by UE 104-b comprises REs from one or more RBs, wherein the REs are in a comb pattern in the frequency domain.

Because UE 104-b may only need to transmit a single ACK/NACK bit for the single scheduled sidelink data message, a comb-based PSFCH waveform may be used. In other cases, not illustrated in FIG. 12, where UE 104-b may need to transmit multiple ACK/NACK bits in a single PSFCH resource for multiple scheduled sidelink data messages, UE 104-b may select a PSFCH resource occupying at least two RBs (e.g., in a partial interlace), wherein the REs of the at least two RBs are arranged in a comb pattern.

At 1210, UE 104-b may transmit, to UE 104-a, a feedback message in the selected PSFCH resource. In particular, the feedback message may be transmitted over the REs (e.g., in a comb structure) from the one or more RBs.

Figure 13:
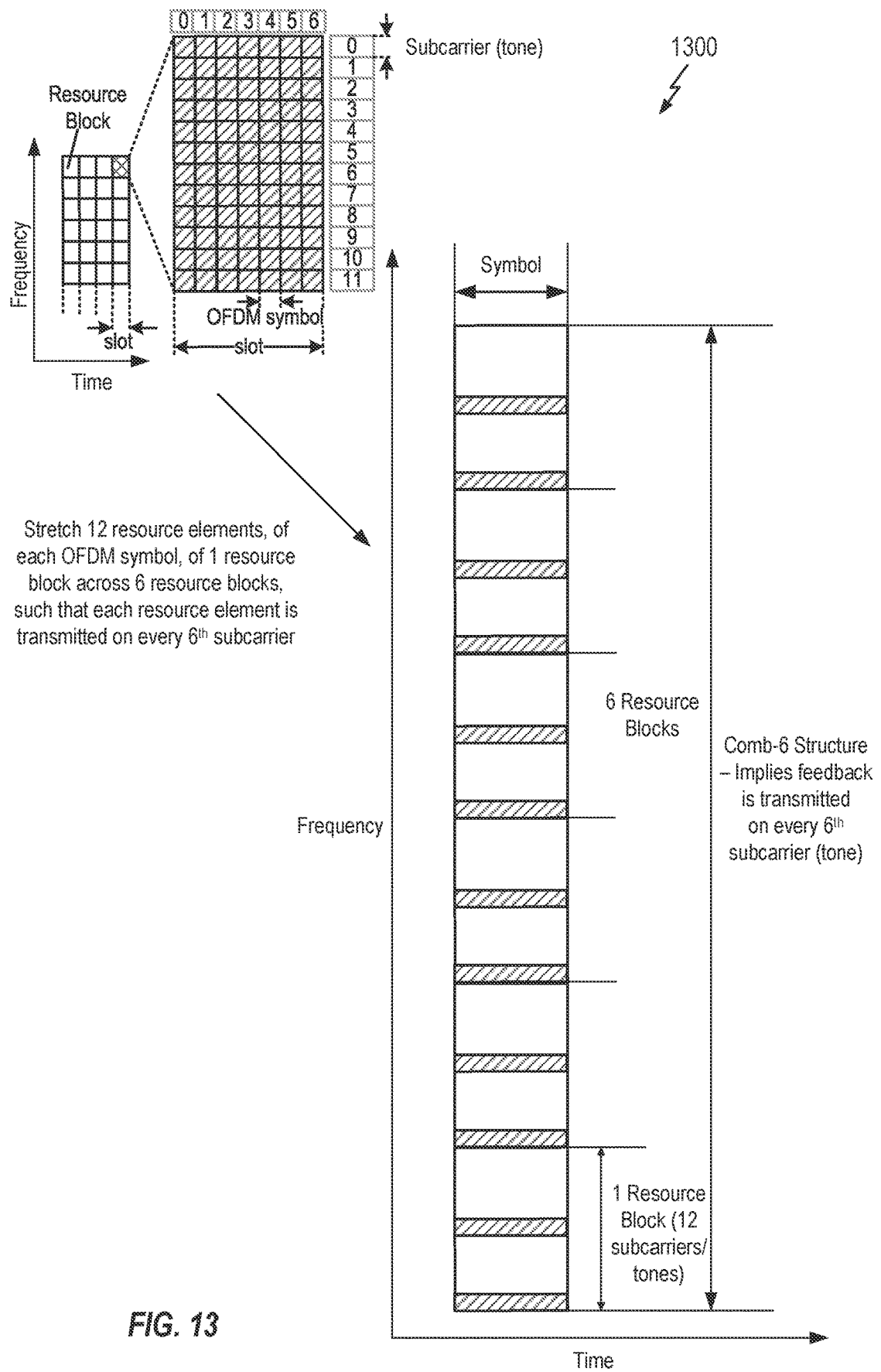
FIG. 13 depicts an example of a comb-based PSFCH transmission.

FIG. 13 illustrates a comb-based PSFCH transmission 1300. As shown in FIG. 13, an RB may include 84 REs arranged in 12 consecutive subcarriers over 7 OFDM symbols. According to aspects described herein, REs in each of these 12 subcarriers may be stretched across multiple RBs, such that REs within each of the 12 subcarriers of the RB are transmitted on every nth subcarrier. In other words, REs of the single RB may be transmitted in a comb pattern in the frequency domain having a comb-N structure.

The comb-n structure in FIG. 13 illustrates a comb-6 structure. In other words, REs of the single RB may be stretched across six RBs such that REs of the single RB are transmitted on every sixth subcarrier across six RBs. Although not illustrated, other comb structures may similarly be considered.

As mentioned herein, in some cases, a UE may need to transmit multiple ACK/NACK bits in a single PSFCH resource. For example, a system may support an extension of various protocol types (such as an enhanced mobile broadband (eMBB) protocol type) or carrier aggregation to sidelink, and a receiving UE may likely receive a continuous stream of sidelink data transmissions (such that the receiving wireless device may receive multiple sidelink data transmissions between PSFCH occasions) or may otherwise attempt to convey more feedback information (such as an ACK/NACK bit for each of multiple carriers) in a given PSFCH occasion. In such a scenario, instead of using multiple PSFCH resources to convey multiple feedback bits, the receiving UE may convey multi-bit feedback on a single PSFCH resource, which may reduce a quantity of PSFCH resources used at a same time (by a same receiving device).

Accordingly, in cases where both UE multiplexing capacity and ACK/NACK multiplexing capacity are of concern, instead of using an interlaced PSFCH resource for transmission, where the PSFCH resource occupies one interlace group, or ten RBs, a PSFCH resource occupying at least two RBs of the 10 RBs (e.g., a partial interlace group) may be used. Specifically, REs of the at least two RBs of the partial interlace group may be transmitted in a comb pattern in the frequency domain.

In particular, each PSFCH resource may occupy one partial interlace group of an interlace group in the frequency domain, where each partial interlace group includes at X RBs in the frequency domain. X RBs per partial interlace group may be equal to or greater than two to fulfill the temporary 2 MHz OCB requirement in the sidelink unlicensed band (e.g., 2 RBs=2.16 MHz). REs of the X RBs may be transmitted in the frequency domain in a comb structure. There may be a length-12 sequence per RB. Further, in certain aspects, CS ramping may or may not be applied across the X RBs per partial interlace group.

As an illustrative example, a PSFCH resource may occupy 2 RBs of a partial interlace group within a 10 RB interlace group. Each of the 2 RBs may have 12 REs in a single OFDM symbol, for a total of 24 REs. Accordingly, the 24 REs of the 2 RBs may be transmitted in a comb pattern where the 24 REs are transmitted every Nth subcarrier.

In certain aspects, the X RBs per partial interlace may be configured via radio resource control (RRC) signaling. X may be configured when the resource pool is configured. Setting a value of X may be a tradeoff between a number of multiplexing ACK/NACK bits and UE multiplexing capacity. For example, an X-RB comb PSFCH waveform may have X times less UE multiplexing capacity.

3GPP Release 16 sidelink has a one-to-one mapping from a slot/subchannel (e.g., a PSSCH occasion) to a particular PSFCH RB group. Within the RB group, a CS pair and RB may be chosen based on an identifier associated with a transmitting UE (e.g., transmitting the sidelink data message) or a groupcast identifier associated with the sidelink data message. Techniques for mapping (e.g., hashing) feedback for one or more PSSCH occasions to a particular PSFCH resource and/or particular frequency resources in a PSFCH resource may be provided herein to allow for use of the comb-based PSFCH waveform design.

In certain aspects, where a feedback message is used to indicate a single bit associated with a single PSSCH occasion, the UE may select a PSFCH resource, for transmitting the feedback message, from a comb-based PSFCH resource pool. A number of PSFCH resources in the resource pool may be based on a number of combs, CS pairs, and/or a number of PSFCH RB groups per interlace/slot. For example, a resource pool may include a plurality of interlace groups, wherein each of the plurality of interlace groups includes a plurality of partial interlace groups. Each of the plurality of partial interlace groups may include at least two RBs. Accordingly, an amount of PSFCH resources in the resource pool may be based, at least in part, the amount of interlace groups, the amount of partial interlace groups, an amount of comb patterns available in the frequency domain, and/or an amount of CS pairs per comb pattern.

A PSFCH resource pool to be used for selecting a PSFCH resource (e.g., for transmitting ACK/NACK feedback for a sidelink data message scheduled in a PSSCH occasion), may be selected according to a slot index and a subchannel or interlace over which the PSCCH (e.g., for which feedback is to be provided) was scheduled/received. In other words, a PSFCH resource for a PSSCH scheduled over a first subchannel or a first frequency interlace in a first slot may be selected from a PSFCH resource pool which maps to the first slot and the first subchannel/first frequency interlace. Accordingly, with Y PSSCH slots and N subchannels/interlaces, (N·Y) PSFCH resource pools may be needed. For selecting, or otherwise determining, a resource within the mapped resource pool, the UE may use hashing and select a PSFCH resource in accordance with a value of $(P_{ID}+M_{ID})$ mod $R_{PRB,CS}^{PSFCH}$. Hashing within a mapped resource pool may be based on at least one of an ID of a transmitter UE transmitting the sidelink data message in the PSSCH occasion or a groupcast ID associated with the sidelink data message transmitted in the PSSCH occasion.

The size of the PSFCH pool per subchannel per slot may be defined in accordance with Equation 6:

$$M_{subch}^{PSFCH} = \frac{M_{PRB,set}^{PSFCH}}{N_{subch} \cdot Y} PRBs \quad (6)$$

In certain aspects, where partial interlace based (e.g., X-RB) and comb based PSFCH waveforms are used, the number of resource in each PSFCH resource pool may be defined in accordance with Equation 7:

$$R_{PRB,CS}^{PSFCH} = \left[ \frac{M_{PRB,set}^{PSFCH}}{X} \right] \cdot N_{CS}^{PSFCH} \cdot N_{type}^{PSFCH} \cdot N_{comb} \quad (7)$$

where X-bit PSFCH occupies X RBs, and variable, $N_{comb}$, is the number of available combs. For selecting, or otherwise determining, a resource, the UE may use hashing and select a PSFCH resource in accordance with a value of $(P_{ID}+M_{ID})$ mod $R_{PRB,CS}^{PSFCH}$.

In certain aspects, a number of PSFCH resources in the PSFCH pool may not be sufficient to allow for the transmission of ACK/NACK bits without increasing PSFCH collision probability. In other words, where a number of PSFCH resources are insufficient, PSFCH collision probability across different transmission/reception pairs may be increased.

Such a case may occur where a number of ACK/NACK bits to be transmitted for multiple sidelink data messages received over different interlaces in Y slots in a single PSFCH instance, is greater than a number of RB groups and combs in the PSFCH resource pool.

For example, where a number of slots for receiving PSSCH from a transmitting UE is equal to four, and each of these slots includes five interlaces (e.g., each interlace having 10 RBs), a PSFCH resource pool may need to have at least 20 PSFCH resources such that each slot and interlace pair maps to a single PSFCH resource. However, where a number of bits per PSFCH is equal to four, the PSFCH resource pool may need to have at least 80 PSFCH resources (e.g., 4 slots×5 interlaces×4 bits=80 PSFCH resources). In some cases, an amount of PSFCH resources in the PSFCH resource pool corresponding to different RB groups, combs, and CS pairs may be less than 80 PSFCH resources (e.g., a PSFCH resource pool having PSCH resources corresponding to 2 RB groups, 6 combs, and 6 CS pairs may result in 72 PSFCH resources, which is less than the required 80 PSFCH resources). Such a case may occur where the size of a codebook used to transmit ACK/NACK bits may be fixed to a number of PSSCH occasions that occur during a time period (e.g., in a fixed HARQ timeline, as previously illustrated in FIG. 7).

Accordingly, to support a fixed HARQ timeline codebook having multiple bits, according to aspects described herein, a UE may select a PSFCH resource, for transmitting the codebook with multi-bit feedback, based on an indication of a PSFCH resource set to use (e.g., among the one or more PSFCH resource sets configured for the UE) indicated in control information (e.g., SCI-2) transmitted to the UE. Specifically, the UE may be configured with one or more PSFCH resource sets (also referred to as PSFCH resource pools). Each PSFCH resource set may correspond to a particular interlace group index and/or a particular partial interlace group index. Further, in some cases, each PSFCH resource set may further correspond to a CS pair set for a particular interlace group index and/or partial interlace group index. There may be up to six CS pairs within each CS pair set (e.g., $N_{CS-set}^{PSFCH}$ may be equal to a number of CS pairs in a CS pair set).

Control information (e.g., SCI-2) used to schedule a receiving UE to receive sidelink data messages from a transmitting UE may include an indication of a PSFCH resource set to use (e.g., among the one or more PSFCH resource sets configured for the UE) when providing PSFCH feedback for the scheduled sidelink data message. For example, SCI-2 may carry a resource indicator field (e.g., PRI) with log 2(M) bits, where M indicates the resource set the receiving UE should use for transmitting the ACK/NACK feedback.

In certain aspects, different PSFCH resource sets may be indicated/used for different cast types. For example, for groupcast communication, a bigger PSFCH resource set may be needed to accommodate ACK/NACK bits from multiple receivers scheduled to receive the sidelink data messages via the groupcast communication.

In certain aspects, where reducing PSFCH resource collision across different transmitting/receiving pairs is important, the control information (e.g., SCI-2) may indicate an RB group and a comb set index for the PSFCH resource set (e.g., all combs are partitioned into multiple sets). In certain other aspects, where reducing PSFCH resource collision across different transmitting/receiving pairs is less important, the control information (e.g., SCI-2) may indicate a comb index and a CS pair set. For example, there may be six CS pairs per CS pair set and the useable CS pair may be partitioned into multiple sets.

The UE may select resources (e.g., hash to resources) within this indicated PSFCH resource set (e.g., within this indicated RB group, interlace, partial interlace, and/or CS pair set) in accordance with a value of $(P_{ID}+M_{ID}) \bmod N_{comb/CS\text{-}set}^{PSFCH}$. Where the control information (e.g., PRI in SCI-2) indicates an RB group and comb set, $N_{comb/CS\text{-}set}^{PSFCH}$ may be equal to a number of combs in the indicated comb set multiplied by six CS pairs. Where the control information (e.g., PRI in SCI-2) indicates an RB group, comb index, and CS set, $N_{comb/CS\text{-}set}^{PSFCH}$ may be equal to a number of CS pairs in the indicated CS set.

Example Operations of User Equipment

Figure 14:
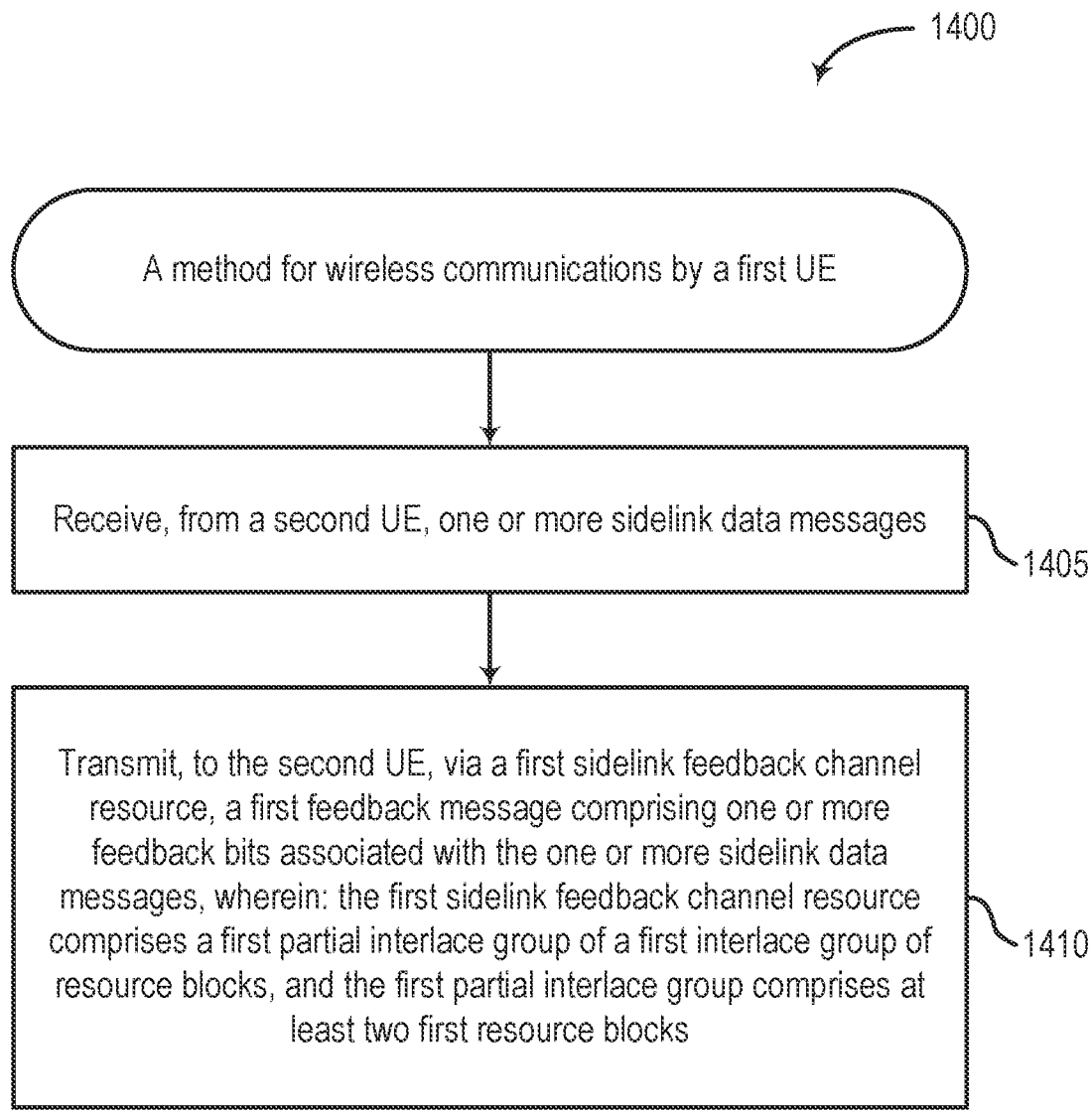
FIG. 14 depicts an example method for wireless communications.

FIG. 14 shows an example of a method 1400 for wireless communications by a UE, such as UE 104 of FIGS. 1 and 3.

Method 1400 begins at step 1405 with receiving, from a second UE, one or more sidelink data messages. In some cases, the operations of this step refer to, or may be performed by, circuitry for receiving and/or code for receiving as described with reference to FIG. 20.

Method 1400 then proceeds to step 1410 with transmitting, to the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks. In some cases, the operations of this step refer to, or may be performed by, circuitry for transmitting and/or code for transmitting as described with reference to FIG. 20.

In some aspects, the at least two first resource blocks comprise contiguous resource blocks of the first interlace group.

In some aspects, the method 1400 further includes selecting the first sidelink feedback channel resource from a first plurality of sidelink feedback channel resources in a first resource pool, wherein: the first resource pool comprises a plurality of interlace groups including, at least, the first interlace group, each of the plurality of interlace groups comprises a plurality of partial interlace groups, each of the plurality of partial interlace groups comprises at least two resource blocks, and each of the first plurality of sidelink feedback channel resources is mapped to a different interlace group of the plurality of interlace groups and a different partial interlace group of the plurality of interlace groups within each of the different interlace groups. In some cases, the operations of this step refer to, or may be performed by, circuitry for selecting and/or code for selecting as described with reference to FIG. 20.

In some aspects, the method 1400 further includes receiving radio resource control signaling configuring an amount of resource blocks for each of the plurality of partial interlace groups. In some cases, the operations of this step refer to, or may be performed by, circuitry for receiving and/or code for receiving as described with reference to FIG. 20.

In some aspects, an amount of the interlace groups is based on the amount of resource blocks for each of the plurality of partial interlace groups and a subcarrier spacing.

In some aspects, an amount of the plurality of the resource blocks in the first interlace group is not evenly divisible by the amount of resource blocks for each of the plurality of partial interlace groups, and a second partial interlace group of the first interlace group comprises an amount of resource blocks less than the amount of resource blocks for each of the plurality of partial interlace groups.

In some aspects, an amount of resource blocks for the second partial interlace group is less than two, and a second sidelink feedback channel resource comprising the second partial interlace group is dropped from the first resource pool.

In some aspects, a spacing between the amount of resource blocks for the first partial interlace group is configured to be different than a spacing between the amount of resource blocks for a second partial interlace group of the first interlace group.

In some aspects, each of the plurality of interlace groups comprises a plurality of resource blocks in a resource block set defined by a configured boundary; and a starting resource block and a last resource block of each of the plurality of interlace groups is based on: the configured boundary defined for a corresponding interlace group; or a minimum boundary.

In some aspects, the method 1400 further includes selecting a cyclic shift to convey a value of each of the one or more feedback bits, wherein the cyclic shift for each of the one or more feedback bits is selected from a set of cyclic shifts allocated to the first UE to allow for multiplexing with other UEs using a same first partial interlace group comprising the at least two first resource blocks. In some cases, the operations of this step refer to, or may be performed by, circuitry for selecting and/or code for selecting as described with reference to FIG. 20.

In some aspects, the transmitting, via the first sidelink feedback channel resource, the first feedback message comprising the one or more feedback bits comprises: transmitting a value of each of the one or more feedback bits by repeating a same sequence in each resource block of the at least two first resource blocks.

Figure 20:
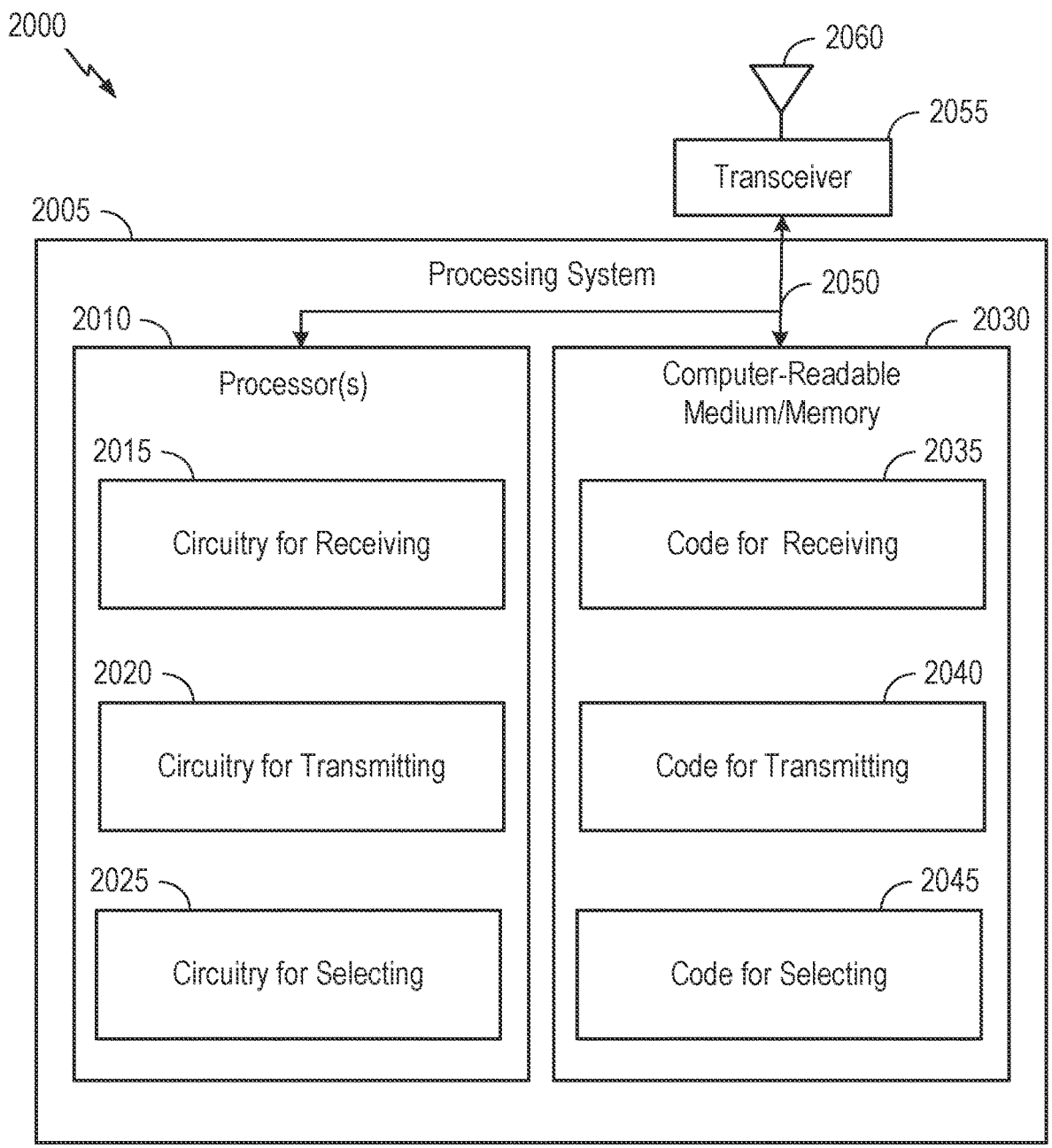
FIG. 20 depicts aspects of an example communications device.

In one aspect, method 1400, or any aspect related to it, may be performed by an apparatus, such as communications device 2000 of FIG. 20, which includes various components operable, configured, or adapted to perform the method 1400. Communications device 2000 is described below in further detail.

Note that FIG. 14 is just one example of a method, and other methods including fewer, additional, or alternative steps are possible consistent with this disclosure.

Figure 15:
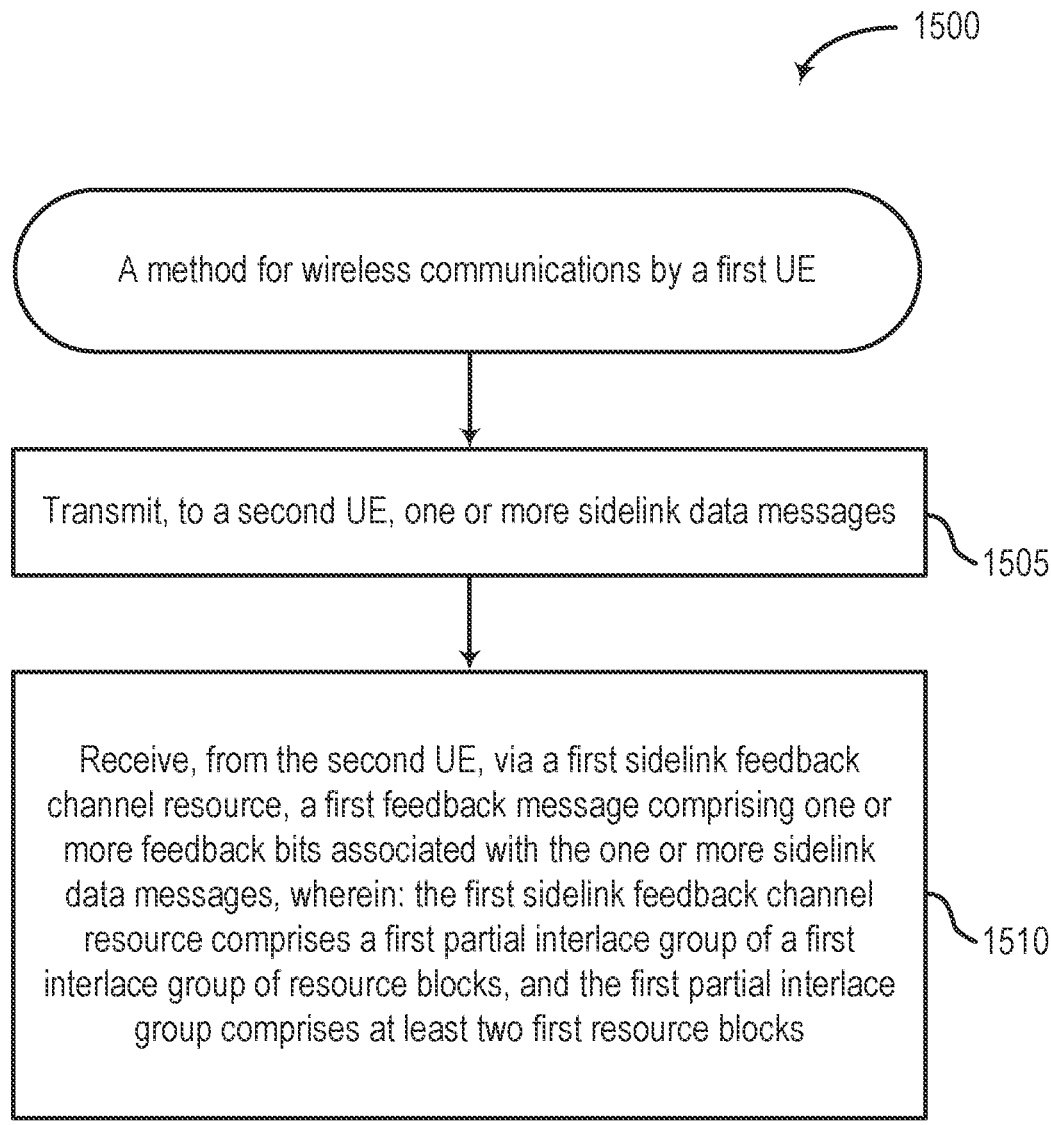
FIG. 15 depicts another example method for wireless communications.

FIG. 15 shows an example of a method 1500 for wireless communications by a UE, such as UE 104 of FIGS. 1 and 3.

Method 1500 begins at step 1505 with transmitting, to a second UE, one or more sidelink data messages. In some cases, the operations of this step refer to, or may be performed by, circuitry for transmitting and/or code for transmitting as described with reference to FIG. 20.

Method 1500 then proceeds to step 1510 with receiving, from the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks. In some cases, the operations of this step refer to, or may be performed by, circuitry for receiving and/or code for receiving as described with reference to FIG. 20.

In some aspects, the at least two first resource blocks comprise contiguous resource blocks of the first interlace group.

In some aspects, the first sidelink feedback channel resource comprises a sidelink feedback channel resource from a first plurality of sidelink feedback channel resources in a first resource pool, wherein: the first resource pool comprises a plurality of interlace groups including, at least, the first interlace group, each of the plurality of interlace groups comprises a plurality of partial interlace groups, each of the plurality of partial interlace groups comprises at least two resource blocks, and each of the first plurality of sidelink feedback channel resources is mapped to a different interlace group of the plurality of interlace groups and a different partial interlace group of the plurality of interlace groups within each of the different interlace groups.

In some aspects, an amount of resource blocks for each of the plurality of partial interlace groups is configured via radio resource control signaling.

In some aspects, an amount of the interlace groups is based on the amount of resource blocks for each of the plurality of partial interlace groups and a subcarrier spacing.

In some aspects, an amount of the plurality of the resource blocks in the first interlace group is not evenly divisible by the amount of resource blocks for each of the plurality of partial interlace groups, and a second partial interlace group of the first interlace group comprises an amount of resource blocks less than the amount of resource blocks for each of the plurality of partial interlace groups.

In some aspects, the amount of resource blocks for the second partial interlace group is less than two, and a second sidelink feedback channel resource comprising the second partial interlace group is dropped from the first resource pool.

In some aspects, a spacing between the amount of resource blocks for the first partial interlace group is configured to be different than a spacing between the amount of resource blocks for a second partial interlace group of the first interlace group.

In some aspects, each of the plurality of interlace groups comprises a plurality of resource blocks in a resource block set defined by a configured boundary; and a starting resource block and a last resource block of each of the plurality of interlace groups is based on: the configured boundary defined for a corresponding interlace group; or a minimum boundary.

In some aspects, a value of each of the one or more feedback bits is conveyed using a cyclic shift selected by the second UE, wherein the cyclic shift for each of the one or more feedback bits is selected by the second UE from a set of cyclic shifts allocated to the second UE to allow for multiplexing with other UEs using a same first partial interlace group comprising the at least two first resource blocks.

In some aspects, the receiving, via the first sidelink feedback channel resource, the first feedback message comprising the one or more feedback bits comprises: receiving a value of each of the one or more feedback bits repeated as a same sequence in each resource block of the at least two first resource blocks.

In one aspect, method 1500, or any aspect related to it, may be performed by an apparatus, such as communications device 2000 of FIG. 20, which includes various components operable, configured, or adapted to perform the method 1500. Communications device 2000 is described below in further detail.

Note that FIG. 15 is just one example of a method, and other methods including fewer, additional, or alternative steps are possible consistent with this disclosure.

Figure 16:
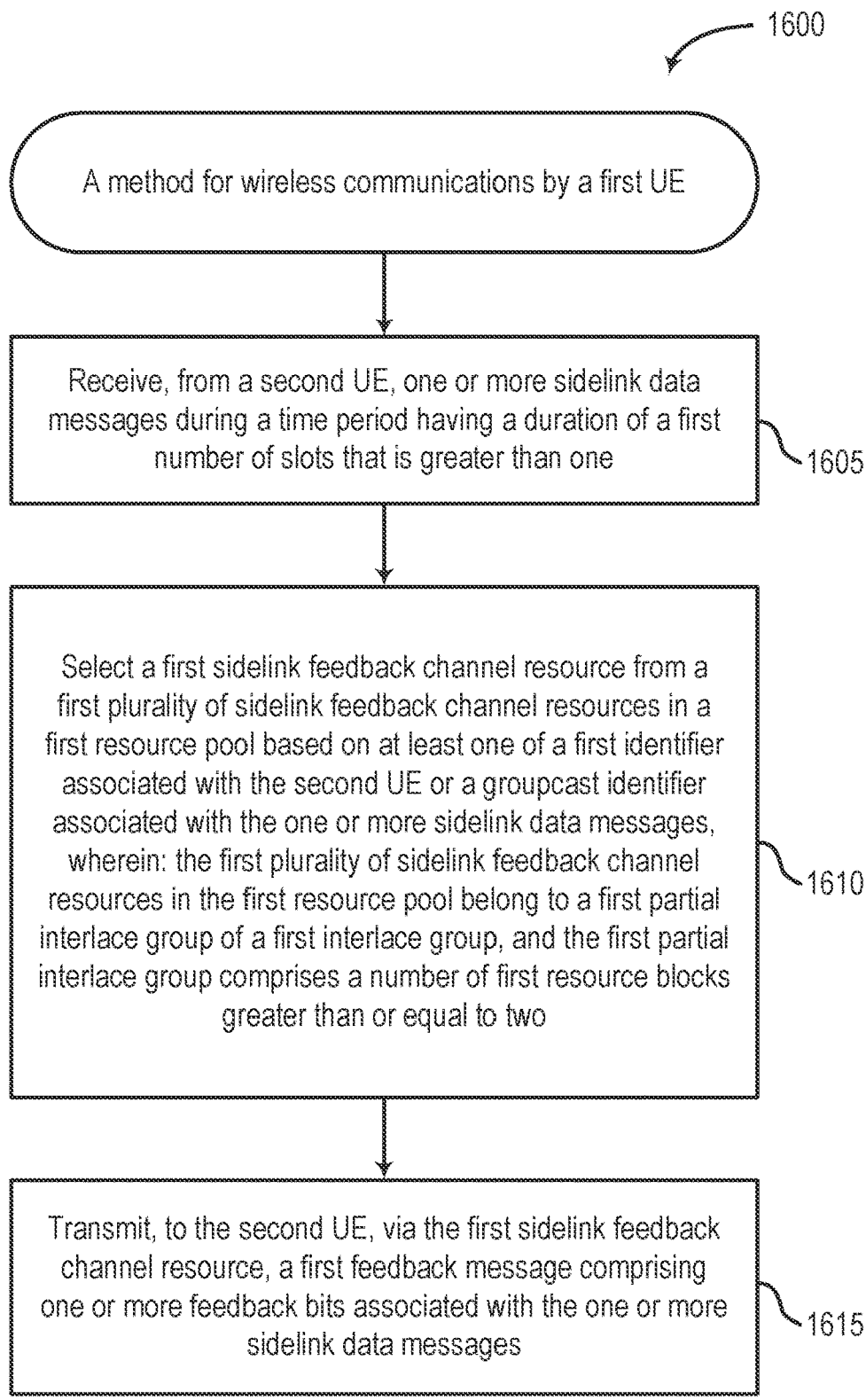
FIG. 16 depicts another example method for wireless communications.

FIG. 16 shows an example of a method 1600 for wireless communications by a UE, such as UE 104 of FIGS. 1 and 3.

Method 1600 begins at step 1605 with receiving, from a second UE, one or more sidelink data messages during a time period having a duration of a first number of slots that is greater than one. In some cases, the operations of this step refer to, or may be performed by, circuitry for receiving and/or code for receiving as described with reference to FIG. 20.

Method 1600 then proceeds to step 1610 with selecting a first sidelink feedback channel resource from a first plurality of sidelink feedback channel resources in a first resource pool based on at least one of a first identifier associated with the second UE or a groupcast identifier associated with the one or more sidelink data messages, wherein: the first plurality of sidelink feedback channel resources in the first resource pool belong to a first partial interlace group of a first interlace group, and the first partial interlace group comprises a number of first resource blocks greater than or equal to two. In some cases, the operations of this step refer to, or may be performed by, circuitry for selecting and/or code for selecting as described with reference to FIG. 20.

Method 1600 then proceeds to step 1615 with transmitting, to the second UE, via the first sidelink feedback channel resource, a first feedback message comprising one or more feedback bits associated with the one or more sidelink data messages. In some cases, the operations of this step refer to, or may be performed by, circuitry for transmitting and/or code for transmitting as described with reference to FIG. 20.

In some aspects, the one or more sidelink data messages comprise a single sidelink data message received over a first interlace in a first slot within the duration of the first number of slots, the first resource pool comprises a plurality of interlace groups, wherein: each of the plurality of interlace groups comprises a plurality of sidelink feedback channel resources, and the plurality of interlace groups comprise a first interlace group comprising the first plurality of sidelink feedback channel resources. In some aspects, the method 1600 further includes selecting the first interlace group based on the first interlace.

In some aspects, the first interlace group comprises the first interlace.

In some aspects, the first interlace group comprises a plurality of partial interlace groups, each of the plurality of partial interlace groups is mapped to a slot of the first number of slots, the plurality of partial interlace groups comprises a first partial interlace group comprising the first sidelink feedback channel resource. In some aspects, the method 1600 further includes selecting the first partial interlace group based on the first slot.

In some aspects, the first partial interlace group comprises a plurality of cyclic shift pair sets, each of the plurality of cyclic shift pair sets comprises a plurality of cyclic shift pairs, and a number of the plurality of cyclic shift pair sets in the first interlace group is greater than or equal to the first number of slots.

In some aspects, the plurality of cyclic shift pair sets comprises a first cyclic shift pair set, the first number of slots is greater than a number of the plurality of partial interlace groups in the first interlace group. In some aspects, the method 1600 further includes selecting the first cyclic shift pair set based on the first slot.

In some aspects, the one or more sidelink data messages comprise multiple sidelink data messages, the one or more feedback bits in the first feedback message comprises multiple feedback bits, and the multiple feedback bits comprises at least one feedback bit for each slot of the time period.

In some aspects, the multiple feedback bits comprise a feedback bit that is not associated with any sidelink data message.

In some aspects, the feedback bit that is not associated with any sidelink data message indicates a negative acknowledgement.

In some aspects, the first UE is configured with multiple resource pools including the first resource pool, and each of the multiple resource pools comprises: a plurality of sidelink feedback channel resources over a partial interlace of an interlace, wherein the interlace comprises a plurality of partial interlaces including the partial interlace; or a plurality of sidelink feedback channel resources of a cyclic shift pair set of the partial interlace, wherein the cyclic shift pair set comprises a plurality of cyclic shift pairs.

In some aspects, the method 1600 further includes receiving from the second UE, one or more sidelink control messages scheduling the multiple sidelink data messages during the time period, wherein the one or more sidelink control message indicate to use the first resource pool for transmitting the first feedback message. In some cases, the operations of this step refer to, or may be performed by, circuitry for receiving and/or code for receiving as described with reference to FIG. 20.

In one aspect, method 1600, or any aspect related to it, may be performed by an apparatus, such as communications device 2000 of FIG. 20, which includes various components operable, configured, or adapted to perform the method 1600. Communications device 2000 is described below in further detail.

Note that FIG. 16 is just one example of a method, and other methods including fewer, additional, or alternative steps are possible consistent with this disclosure.

Figure 17:
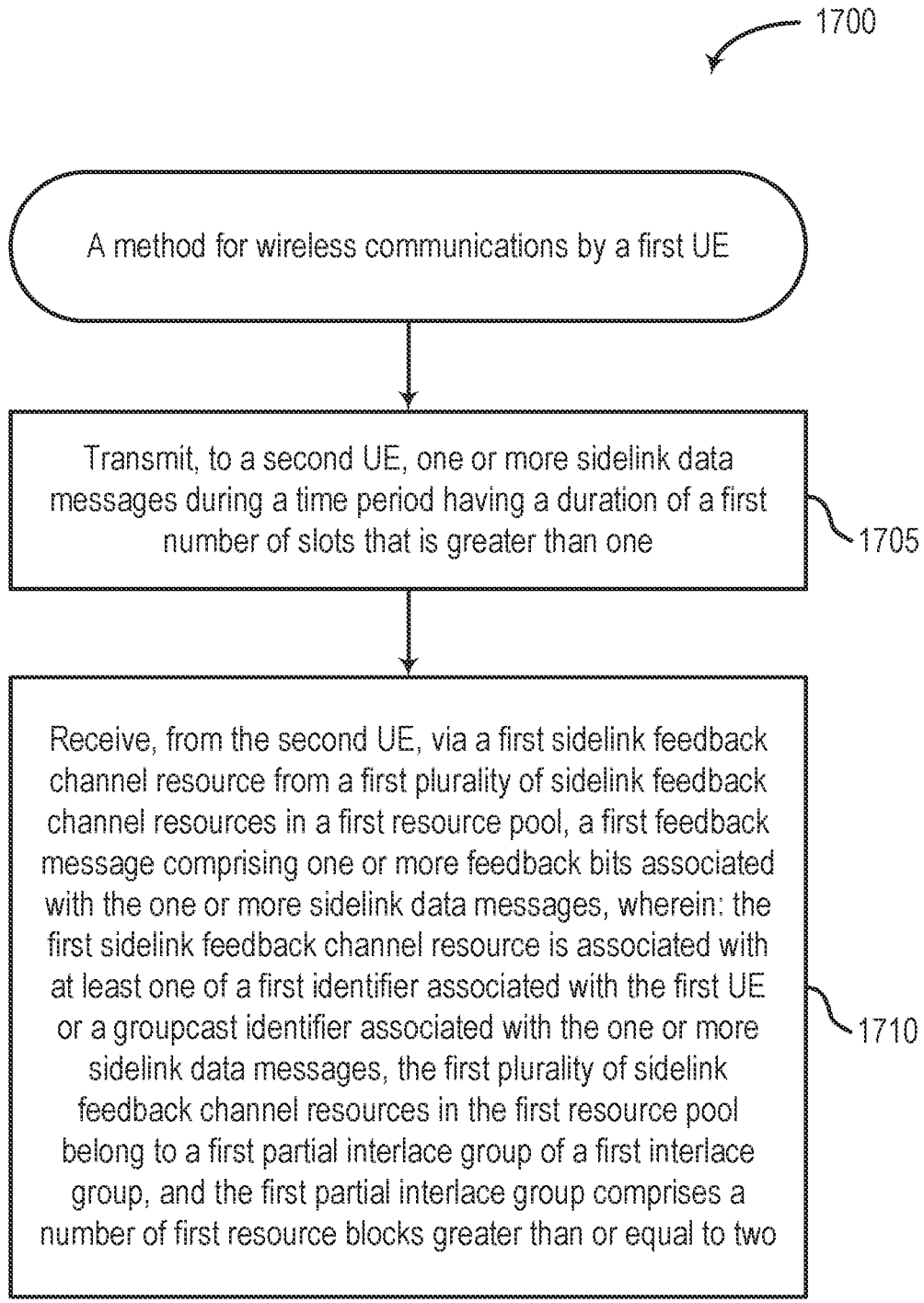
FIG. 17 depicts another example method for wireless communications.

FIG. 17 shows an example of a method 1700 for wireless communications by a UE, such as UE 104 of FIGS. 1 and 3.

Method 1700 begins at step 1705 with transmitting, to a second UE, one or more sidelink data messages during a time period having a duration of a first number of slots that is greater than one. In some cases, the operations of this step refer to, or may be performed by, circuitry for transmitting and/or code for transmitting as described with reference to FIG. 20.

Method 1700 then proceeds to step 1710 with receiving, from the second UE, via a first sidelink feedback channel resource from a first plurality of sidelink feedback channel resources in a first resource pool, a first feedback message comprising one or more feedback bits associated with the one or more sidelink data messages, wherein: the first sidelink feedback channel resource is associated with at least one of a first identifier associated with the first UE or a groupcast identifier associated with the one or more sidelink data messages, the first plurality of sidelink feedback channel resources in the first resource pool belong to a first partial interlace group of a first interlace group, and the first partial interlace group comprises a number of first resource blocks greater than or equal to two. In some cases, the operations of this step refer to, or may be performed by, circuitry for receiving and/or code for receiving as described with reference to FIG. 20.

In some aspects, the one or more sidelink data messages comprise a single sidelink data message transmitting over a first interlace in a first slot within the duration of the first number of slots, the first resource pool comprises a plurality of interlace groups, wherein: each of the plurality of interlace groups comprises a plurality of sidelink feedback channel resources, and the plurality of interlace groups comprise a first interlace group comprising the first plurality of sidelink feedback channel resources, and the first interlace group is associated with the first interlace.

In some aspects, the first interlace group comprises the first interlace.

In some aspects, the first interlace group comprises a plurality of partial interlace groups, each of the plurality of partial interlace groups is mapped to a slot of the first number of slots, the plurality of partial interlace groups comprises a first partial interlace group comprising the first sidelink feedback channel resource, and the first partial interlace group is associated with the first slot.

In some aspects, the first partial interlace group comprises a plurality of cyclic shift pair sets, each of the plurality of cyclic shift pair sets comprises a plurality of cyclic shift pairs, and a number of the plurality of cyclic shift pair sets in the first interlace group is greater than or equal to the first number of slots.

In some aspects, the plurality of cyclic shift pair sets comprises a first cyclic shift pair set, the first number of slots is greater than a number of the plurality of partial interlace groups in the first interlace group, and the first cyclic shift pair set is associated with the first slot.

In some aspects, the one or more sidelink data messages comprise multiple sidelink data messages, the one or more feedback bits in the first feedback message comprises multiple feedback bits, and the multiple feedback bits comprises at least one feedback bit for each slot of the time period.

In some aspects, the multiple feedback bits comprise a feedback bit that is not associated with any sidelink data message.

In some aspects, the feedback bit that is not associated with any sidelink data message indicates a negative acknowledgement.

In some aspects, the second UE is configured with multiple resource pools including the first resource pool, and each of the multiple resource pools comprises: a plurality of sidelink feedback channel resources over a partial interlace of an interlace, wherein the interlace comprises a plurality of partial interlaces including the partial interlace; or a plurality of sidelink feedback channel resources of a cyclic shift pair set of the partial interlace, wherein the cyclic shift pair set comprises a plurality of cyclic shift pairs.

In some aspects, the method 1700 further includes transmitting to the second UE, one or more sidelink control messages scheduling the multiple sidelink data messages during the time period, wherein the one or more sidelink control message indicate to use the first resource pool for transmitting the first feedback message to the first UE. In some cases, the operations of this step refer to, or may be performed by, circuitry for transmitting and/or code for transmitting as described with reference to FIG. 20.

In one aspect, method 1700, or any aspect related to it, may be performed by an apparatus, such as communications device 2000 of FIG. 20, which includes various components operable, configured, or adapted to perform the method 1700. Communications device 2000 is described below in further detail.

Note that FIG. 17 is just one example of a method, and other methods including fewer, additional, or alternative steps are possible consistent with this disclosure.

Figure 18:
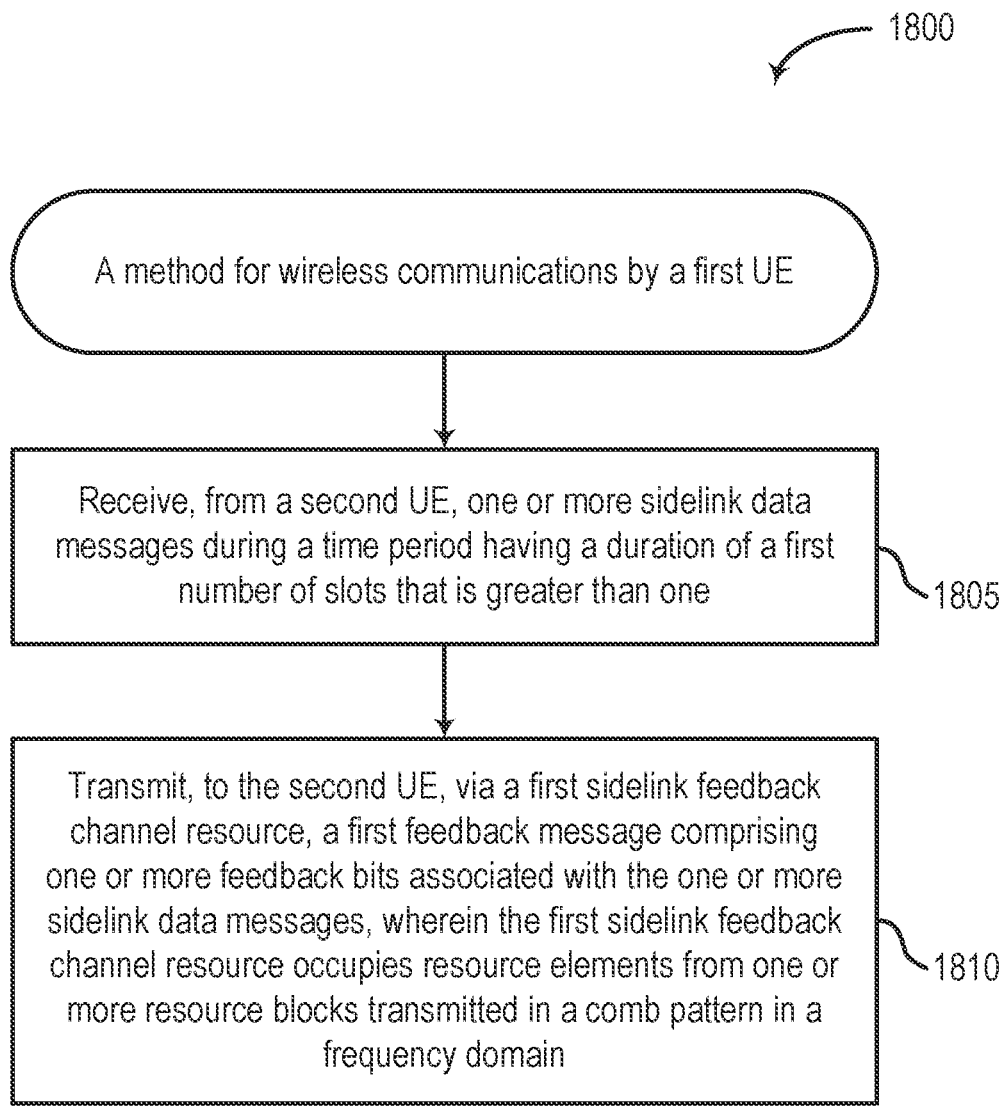
FIG. 18 depicts another example method for wireless communications.

FIG. 18 shows an example of a method 1800 for wireless communications by a UE, such as UE 104 of FIGS. 1 and 3.

Method 1800 begins at step 1805 with receiving, from a second UE, one or more sidelink data messages during a time period having a duration of a first number of slots that is greater than one. In some cases, the operations of this step refer to, or may be performed by, circuitry for receiving and/or code for receiving as described with reference to FIG. 20.

Method 1800 then proceeds to step 1810 with transmitting, to the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain. In some cases, the operations of this step refer to, or may be performed by, circuitry for transmitting and/or code for transmitting as described with reference to FIG. 20.

In some aspects, the resource elements from one or more resource blocks transmitted in the comb pattern in the frequency domain comprises one of: the resource elements transmitted every second subcarrier in the frequency domain; the resource elements transmitted every fourth subcarrier in the frequency domain; the resource elements transmitted every sixth subcarrier in the frequency domain; or the resource elements transmitted every twelfth subcarrier in the frequency domain.

In some aspects, the method 1800 further includes selecting a cyclic shift to convey a value of each of the one or more feedback bits. In some cases, the operations of this step refer to, or may be performed by, circuitry for selecting and/or code for selecting as described with reference to FIG. 20.

In some aspects, the first sidelink feedback channel resource occupies the resource elements from at least two resource blocks, and the at least two resource blocks belong to a first interlace group of resource blocks.

In some aspects, the first sidelink feedback channel resource occupies the resource elements from at least two resource blocks, and the at least two resource blocks belong to a first partial interlace group of a first interlace group of resource blocks.

In some aspects, the method 1800 further includes receiving signaling configuring: a first resource pool with a plurality of sidelink feedback channel resources, including, at least, the first sidelink feedback channel resource, wherein: the first resource pool comprises a plurality of interlace groups including, at least, the first interlace group, each of the plurality of interlace groups comprises a plurality of partial interlace groups, and each of the plurality of partial interlace groups comprises at least two resource blocks, and an amount of resource blocks for each of the plurality of partial interlace groups. In some cases, the operations of this step refer to, or may be performed by, circuitry for receiving and/or code for receiving as described with reference to FIG. 20.

In some aspects, the method 1800 further includes selecting the first sidelink feedback channel resource from a first plurality of sidelink feedback channel resources in a first resource pool based on at least one of a first identifier associated with the second UE or a groupcast identifier associated with the one or more sidelink data messages. In some cases, the operations of this step refer to, or may be performed by, circuitry for selecting and/or code for selecting as described with reference to FIG. 20.

In some aspects, the first UE, receives, from the second UE, one sidelink data message over a first sub channel or a first frequency interlace in a first slot. In some aspects, the method 1800 further includes selecting the first resource pool based on the first subchannel or the first frequency interlace over which the one sidelink data message is received in the first slot.

In some aspects, the first resource pool comprises a plurality of interlace groups, wherein: each of the plurality of interlace groups comprises a plurality of partial interlace groups, and each of the plurality of partial interlace groups comprises at least two resource blocks; and an amount of the first plurality of sidelink feedback channel resources in the first resource pool is based, at least in part, on one or more of: an amount of the plurality of partial interlace groups in the first resource pool, an amount of comb patterns available in the frequency domain, or an amount of cyclic shift pairs per comb pattern.

In some aspects, the one or more sidelink data messages comprise multiple sidelink data messages, the one or more feedback bits in the first feedback message comprises multiple feedback bits, and the multiple feedback bits comprises at least one feedback bit for each slot of the time period.

In some aspects, the multiple feedback bits comprise a feedback bit that is not associated with any sidelink data message.

In some aspects, the feedback bit that is not associated with any sidelink data message indicates a negative acknowledgement.

In some aspects, the first UE is configured with multiple resource pools including the first resource pool, and each of the multiple resource pools comprises one of: a plurality of sidelink feedback channel resources which occupy different partial interlaces; a plurality of sidelink feedback channel resources which occupy resource elements from one or more resource blocks transmitted in different comb patterns in the frequency domain; or a plurality of sidelink feedback channel resources which occupy the resource elements from the one or more resource blocks transmitted in the different comb patterns in the frequency domain and have different cyclic shift pair sets.

In some aspects, the method 1800 further includes receiving, from the second UE, one or more sidelink control messages scheduling the multiple sidelink data messages during the time period, wherein the one or more sidelink control messages indicate to use the first resource pool for transmitting the first feedback message. In some cases, the operations of this step refer to, or may be performed by, circuitry for receiving and/or code for receiving as described with reference to FIG. 20.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

Figure 19:
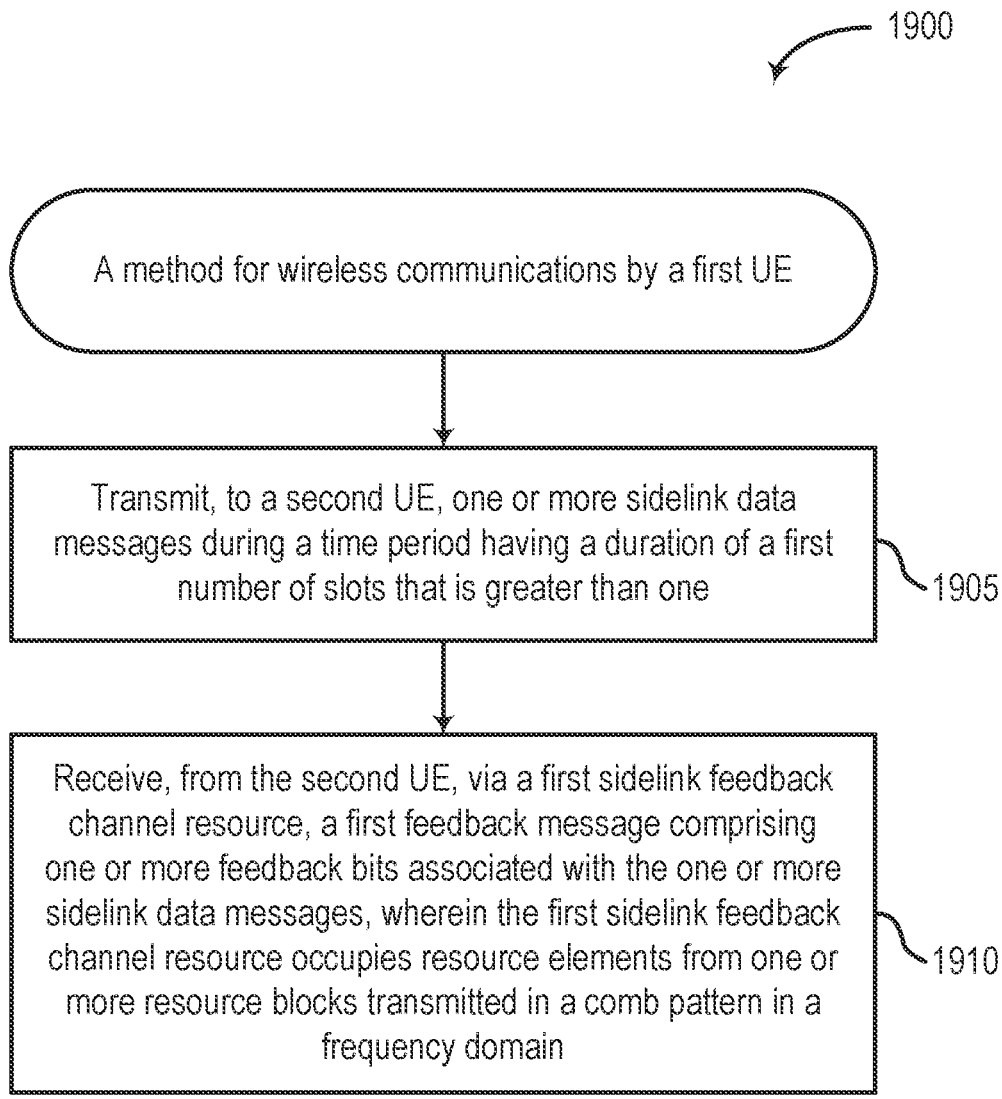
FIG. 19 depicts another example method for wireless communications.

FIG. 19 shows an example of a method 1900 for wireless communications by a UE, such as UE 104 of FIGS. 1 and 3.

Method 1900 begins at step 1905 with transmitting, to a second UE, one or more sidelink data messages during a time period having a duration of a first number of slots that is greater than one. In some cases, the operations of this step refer to, or may be performed by, circuitry for transmitting and/or code for transmitting as described with reference to FIG. 20.

Method 1900 then proceeds to step 1910 with receiving, from the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain. In some cases, the operations of this step refer to, or may be performed by, circuitry for receiving and/or code for receiving as described with reference to FIG. 20.

In some aspects, the resource elements from one or more resource blocks transmitted in the comb pattern in the frequency domain comprises one of: the resource elements transmitted every second subcarrier in the frequency domain; the resource elements transmitted every fourth subcarrier in the frequency domain; the resource elements transmitted every sixth subcarrier in the frequency domain; or the resource elements transmitted every twelfth subcarrier in the frequency domain.

In some aspects, the first sidelink feedback channel resource occupies the resource elements from at least two resource blocks, and the at least two resource blocks belong to a first interlace group of resource blocks.

In some aspects, the first sidelink feedback channel resource occupies the resource elements from at least two resource blocks, and the at least two resource blocks belong to a first partial interlace group of a first interlace group of resource blocks.

In some aspects, the method 1900 further includes receiving signaling configuring: a first resource pool with a plurality of sidelink feedback channel resources, including, at least, the first sidelink feedback channel resource, wherein: the first resource pool comprises a plurality of interlace groups including, at least, the first interlace group, each of the plurality of interlace groups comprises a plurality of partial interlace groups, and each of the plurality of partial interlace groups comprises at least two resource blocks, and an amount of resource blocks for each of the plurality of partial interlace groups. In some cases, the operations of this step refer to, or may be performed by, circuitry for receiving and/or code for receiving as described with reference to FIG. 20.

In some aspects, the first sidelink feedback channel resource comprises a sidelink feedback channel resource from a first plurality of sidelink feedback channel resources in a first resource pool, and the first sidelink feedback channel resource is associated with at least one of a first identifier associated with the first UE or a groupcast identifier associated with the one or more sidelink data messages.

In some aspects, the first UE, transmits, to the second UE, one sidelink data message over a first subchannel or a first frequency interlace in a first slot, and the first resource pool is associated with the first subchannel or the first frequency interlace over which the one sidelink data message is transmitted in the first slot.

In some aspects, the first resource pool comprises a plurality of interlace groups, wherein: each of the plurality of interlace groups comprises a plurality of partial interlace groups, and each of the plurality of partial interlace groups comprises at least two resource blocks; and an amount of the first plurality of sidelink feedback channel resources in the first resource pool is based, at least in part, on one or more of: an amount of the plurality of partial interlace groups in the first resource pool, an amount of comb patterns available in the frequency domain, or an amount of cyclic shift pairs per comb pattern.

In some aspects, the one or more sidelink data messages comprise multiple sidelink data messages, the one or more feedback bits in the first feedback message comprises multiple feedback bits, and the multiple feedback bits comprises at least one feedback bit for each slot of the time period.

In some aspects, the multiple feedback bits comprise a feedback bit that is not associated with any sidelink data message.

In some aspects, the feedback bit that is not associated with any sidelink data message indicates a negative acknowledgement.

In some aspects, the second UE is configured with multiple resource pools including the first resource pool, and each of the multiple resource pools comprises one of: a plurality of sidelink feedback channel resources which occupy different partial interlaces; a plurality of sidelink feedback channel resources which occupy resource elements from one or more resource blocks transmitted in different comb patterns in the frequency domain; or a plurality of sidelink feedback channel resources which occupy the resource elements from the one or more resource blocks transmitted in the different comb patterns in the frequency domain and have different cyclic shift pair sets.

In some aspects, the method 1900 further includes transmitting, to the second UE, one or more sidelink control messages scheduling the multiple sidelink data messages during the time period, wherein the one or more sidelink control messages indicate, to the second UE, to use the first resource pool for transmitting the first feedback message. In some cases, the operations of this step refer to, or may be performed by, circuitry for transmitting and/or code for transmitting as described with reference to FIG. 20.

In one aspect, method 1900, or any aspect related to it, may be performed by an apparatus, such as communications device 2000 of FIG. 20, which includes various components operable, configured, or adapted to perform the method 1900. Communications device 2000 is described below in further detail.

Note that FIG. 19 is just one example of a method, and other methods including fewer, additional, or alternative steps are possible consistent with this disclosure.

Example Communications Devices

FIG. 20 depicts aspects of an example communications device 2000. In some aspects, communications device 2000 is a user equipment, such as UE 104 described above with respect to FIGS. 1 and 3.

The communications device 2000 includes a processing system 2005 coupled to the transceiver 2055 (e.g., a transmitter and/or a receiver). The transceiver 2055 is configured to transmit and receive signals for the communications device 2000 via the antenna 2060, such as the various signals as described herein. The processing system 2005 may be configured to perform processing functions for the communications device 2000, including processing signals received and/or to be transmitted by the communications device 2000.

The processing system 2005 includes one or more processors 2010. In various aspects, the one or more processors 2010 may be representative of one or more of receive processor 358, transmit processor 364, TX MIMO processor 366, and/or controller/processor 380, as described with respect to FIG. 3. The one or more processors 2010 are coupled to a computer-readable medium/memory 2030 via a bus 2050. In certain aspects, the computer-readable medium/memory 2030 is configured to store instructions (e.g., computer-executable code) that when executed by the one or more processors 2010, cause the one or more processors 2010 to perform: the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; and/or the method 1900 described with respect to FIG. 19, or any aspect related to it. Note that reference to a processor performing a function of communications device 2000 may include one or more processors 2010 performing that function of communications device 2000.

In the depicted example, computer-readable medium/memory 2030 stores code (e.g., executable instructions), such as code for receiving 2035, code for transmitting 2040, and code for selecting 2045. Processing of the code for receiving 2035, code for transmitting 2040, and code for selecting 2045 may cause the communications device 2000 to perform: the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; and/or the method 1900 described with respect to FIG. 19, or any aspect related to it.

The one or more processors 2010 include circuitry configured to implement (e.g., execute) the code stored in the computer-readable medium/memory 2030, including circuitry such as circuitry for receiving 2015, circuitry for transmitting 2020, and circuitry for selecting 2025. Processing with circuitry for receiving 2015, circuitry for transmitting 2020, and circuitry for selecting 2025 may cause the communications device 2000 to perform: the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; and/or the method 1900 described with respect to FIG. 19, or any aspect related to it.

Various components of the communications device 2000 may provide means for performing: the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; and/or the method 1900 described with respect to FIG. 19, or any aspect related to it. For example, means for transmitting, sending or outputting for transmission may include transceivers 354 and/or antenna(s) 352 of the UE 104 illustrated in FIG. 3 and/or the transceiver 2055 and the antenna 2060 of the communications device 2000 in FIG. 20. Means for receiving or obtaining may include transceivers 354 and/or antenna(s) 352 of the UE 104 illustrated in FIG. 3 and/or the transceiver 2055 and the antenna 2060 of the communications device 2000 in FIG. 20.

Example Clauses

Implementation Examples are Described in the Following Numbered Clauses:

Clause 1: A method for wireless communications by a first UE, the method comprising: receiving, from a second UE, one or more sidelink data messages; and transmitting, to the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks.

Clause 2: The method of Clause 1, wherein the at least two first resource blocks comprise contiguous resource blocks of the first interlace group.

Clause 3: The method of any one of Clauses 1 and 2, further comprising: selecting the first sidelink feedback channel resource from a first plurality of sidelink feedback channel resources in a first resource pool, wherein: the first resource pool comprises a plurality of interlace groups including, at least, the first interlace group, each of the plurality of interlace groups comprises a plurality of partial interlace groups, each of the plurality of partial interlace groups comprises at least two resource blocks, and each of the first plurality of sidelink feedback channel resources is mapped to a different interlace group of the plurality of interlace groups and a different partial interlace group of the plurality of interlace groups within each of the different interlace groups.

Clause 4: The method of Clause 3, further comprising: receiving radio resource control signaling configuring an amount of resource blocks for each of the plurality of partial interlace groups.

Clause 5: The method of Clause 4, wherein an amount of the interlace groups is based on the amount of resource blocks for each of the plurality of partial interlace groups and a subcarrier spacing.

Clause 6: The method of Clause 4, wherein: an amount of the plurality of the resource blocks in the first interlace group is not evenly divisible by the amount of resource blocks for each of the plurality of partial interlace groups, and a second partial interlace group of the first interlace group comprises an amount of resource blocks less than the amount of resource blocks for each of the plurality of partial interlace groups.

Clause 7: The method of Clause 6, wherein: an amount of resource blocks for the second partial interlace group is less than two, and a second sidelink feedback channel resource comprising the second partial interlace group is dropped from the first resource pool.

Clause 8: The method of Clause 4, wherein a spacing between the amount of resource blocks for the first partial interlace group is configured to be different than a spacing between the amount of resource blocks for a second partial interlace group of the first interlace group.

Clause 9: The method of Clause 3, wherein: each of the plurality of interlace groups comprises a plurality of resource blocks in a resource block set defined by a configured boundary; and a starting resource block and a last resource block of each of the plurality of interlace groups is based on: the configured boundary defined for a corresponding interlace group; or a minimum boundary.

Clause 10: The method of any one of Clauses 1-9, further comprising: selecting a cyclic shift to convey a value of each of the one or more feedback bits, wherein the cyclic shift for each of the one or more feedback bits is selected from a set of cyclic shifts allocated to the first UE to allow for multiplexing with other UEs using a same first partial interlace group comprising the at least two first resource blocks.

Clause 11: The method of any one of Clauses 1-10, wherein the transmitting, via the first sidelink feedback channel resource, the first feedback message comprising the one or more feedback bits comprises: transmitting a value of each of the one or more feedback bits by repeating a same sequence in each resource block of the at least two first resource blocks.

Clause 12: A method for wireless communications by a first UE, the method comprising: transmitting, to a second UE, one or more sidelink data messages; and receiving, from the second UE, via a first sidelink feedback channel resource, a first feedback message comprising one or more feedback bits associated with the one or more sidelink data messages, wherein: the first sidelink feedback channel resource comprises a first partial interlace group of a first interlace group of resource blocks, and the first partial interlace group comprises at least two first resource blocks.

Clause 13: The method of Clause 12, wherein the at least two first resource blocks comprise contiguous resource blocks of the first interlace group.

Clause 14: The method of any one of Clauses 12 and 13, wherein the first sidelink feedback channel resource comprises a sidelink feedback channel resource from a first plurality of sidelink feedback channel resources in a first resource pool, wherein: the first resource pool comprises a plurality of interlace groups including, at least, the first interlace group, each of the plurality of interlace groups comprises a plurality of partial interlace groups, each of the plurality of partial interlace groups comprises at least two resource blocks, and each of the first plurality of sidelink feedback channel resources is mapped to a different interlace group of the plurality of interlace groups and a different partial interlace group of the plurality of interlace groups within each of the different interlace groups.

Clause 15: The method of Clause 14, wherein an amount of resource blocks for each of the plurality of partial interlace groups is configured via radio resource control signaling.

Clause 16: The method of Clause 15, wherein an amount of the interlace groups is based on the amount of resource blocks for each of the plurality of partial interlace groups and a subcarrier spacing.

Clause 17: The method of Clause 15, wherein: an amount of the plurality of the resource blocks in the first interlace group is not evenly divisible by the amount of resource blocks for each of the plurality of partial interlace groups, and a second partial interlace group of the first interlace group comprises an amount of resource blocks less than the amount of resource blocks for each of the plurality of partial interlace groups.

Clause 18: The method of Clause 17, wherein: the amount of resource blocks for the second partial interlace group is less than two, and a second sidelink feedback channel resource comprising the second partial interlace group is dropped from the first resource pool.

Clause 19: The method of Clause 15, wherein a spacing between the amount of resource blocks for the first partial interlace group is configured to be different than a spacing between the amount of resource blocks for a second partial interlace group of the first interlace group.

Clause 20: The method of Clause 14, wherein: each of the plurality of interlace groups comprises a plurality of resource blocks in a resource block set defined by a configured boundary; and a starting resource block and a last resource block of each of the plurality of interlace groups is based on: the configured boundary defined for a corresponding interlace group; or a minimum boundary.

Clause 21: The method of any one of Clauses 12-20, wherein a value of each of the one or more feedback bits is conveyed using a cyclic shift selected by the second UE, wherein the cyclic shift for each of the one or more feedback bits is selected by the second UE from a set of cyclic shifts allocated to the second UE to allow for multiplexing with other UEs using a same first partial interlace group comprising the at least two first resource blocks.

Clause 22: The method of any one of Clauses 12-21, wherein the receiving, via the first sidelink feedback channel resource, the first feedback message comprising the one or more feedback bits comprises: receiving a value of each of the one or more feedback bits repeated as a same sequence in each resource block of the at least two first resource blocks.

Clause 23: A method for wireless communications by a first UE, the method comprising: receiving, from a second UE, one or more sidelink data messages during a time period having a duration of a first number of slots that is greater than one; selecting a first sidelink feedback channel resource from a first plurality of sidelink feedback channel resources in a first resource pool based on at least one of a first identifier associated with the second UE or a groupcast identifier associated with the one or more sidelink data messages, wherein: the first plurality of sidelink feedback channel resources in the first resource pool belong to a first partial interlace group of a first interlace group, and the first partial interlace group comprises a number of first resource blocks greater than or equal to two; and transmitting, to the second UE, via the first sidelink feedback channel resource, a first feedback message comprising one or more feedback bits associated with the one or more sidelink data messages.

Clause 24: The method of Clause 23, wherein: the one or more sidelink data messages comprise a single sidelink data message received over a first interlace in a first slot within the duration of the first number of slots, the first resource pool comprises a plurality of interlace groups, wherein: each of the plurality of interlace groups comprises a plurality of sidelink feedback channel resources, and the plurality of interlace groups comprise a first interlace group comprising the first plurality of sidelink feedback channel resources, and the method further comprises selecting the first interlace group based on the first interlace.

Clause 25: The method of Clause 24, wherein the first interlace group comprises the first interlace.

Clause 26: The method of Clause 24, wherein: the first interlace group comprises a plurality of partial interlace groups, each of the plurality of partial interlace groups is mapped to a slot of the first number of slots, the plurality of partial interlace groups comprises a first partial interlace group comprising the first sidelink feedback channel resource, and the method further comprises selecting the first partial interlace group based on the first slot.

Clause 27: The method of Clause 26, wherein: the first partial interlace group comprises a plurality of cyclic shift pair sets, each of the plurality of cyclic shift pair sets comprises a plurality of cyclic shift pairs, and a number of the plurality of cyclic shift pair sets in the first interlace group is greater than or equal to the first number of slots.

Clause 28: The method of Clause 27, wherein: the plurality of cyclic shift pair sets comprises a first cyclic shift pair set, the first number of slots is greater than a number of the plurality of partial interlace groups in the first interlace group, and the method further comprises selecting the first cyclic shift pair set based on the first slot.

Clause 29: The method of Clause 24, wherein: the one or more sidelink data messages comprise multiple sidelink data messages, the one or more feedback bits in the first feedback message comprises multiple feedback bits, and the multiple feedback bits comprises at least one feedback bit for each slot of the time period.

Clause 30: The method of Clause 29, wherein the multiple feedback bits comprise a feedback bit that is not associated with any sidelink data message.

Clause 31: The method of Clause 30, wherein the feedback bit that is not associated with any sidelink data message indicates a negative acknowledgement.

Clause 32: The method of Clause 29, wherein: the first UE is configured with multiple resource pools including the first resource pool, and each of the multiple resource pools comprises: a plurality of sidelink feedback channel resources over a partial interlace of an interlace, wherein the interlace comprises a plurality of partial interlaces including the partial interlace; or a plurality of sidelink feedback channel resources of a cyclic shift pair set of the partial interlace, wherein the cyclic shift pair set comprises a plurality of cyclic shift pairs.

Clause 33: The method of Clause 32, further comprising: receiving from the second UE, one or more sidelink control messages scheduling the multiple sidelink data messages during the time period, wherein the one or more sidelink control message indicate to use the first resource pool for transmitting the first feedback message.

Clause 34: A method for wireless communications by a first UE, the method comprising: transmitting, to a second UE, one or more sidelink data messages during a time period having a duration of a first number of slots that is greater than one; and receiving, from the second UE, via a first sidelink feedback channel resource from a first plurality of sidelink feedback channel resources in a first resource pool, a first feedback message comprising one or more feedback bits associated with the one or more sidelink data messages, wherein: the first sidelink feedback channel resource is associated with at least one of a first identifier associated with the first UE or a groupcast identifier associated with the one or more sidelink data messages, the first plurality of sidelink feedback channel resources in the first resource pool belong to a first partial interlace group of a first interlace group, and the first partial interlace group comprises a number of first resource blocks greater than or equal to two.

Clause 35: The method of Clause 34, wherein: the one or more sidelink data messages comprise a single sidelink data message transmitting over a first interlace in a first slot within the duration of the first number of slots, the first resource pool comprises a plurality of interlace groups, wherein: each of the plurality of interlace groups comprises a plurality of sidelink feedback channel resources, and the plurality of interlace groups comprise a first interlace group comprising the first plurality of sidelink feedback channel resources, and the first interlace group is associated with the first interlace.

Clause 36: The method of Clause 35, wherein the first interlace group comprises the first interlace.

Clause 37: The method of Clause 35, wherein: the first interlace group comprises a plurality of partial interlace groups, each of the plurality of partial interlace groups is mapped to a slot of the first number of slots, the plurality of partial interlace groups comprises a first partial interlace group comprising the first sidelink feedback channel resource, and the first partial interlace group is associated with the first slot.

Clause 38: The method of Clause 37, wherein: the first partial interlace group comprises a plurality of cyclic shift pair sets, each of the plurality of cyclic shift pair sets comprises a plurality of cyclic shift pairs, and a number of the plurality of cyclic shift pair sets in the first interlace group is greater than or equal to the first number of slots.

Clause 39: The method of Clause 38, wherein: the plurality of cyclic shift pair sets comprises a first cyclic shift pair set, the first number of slots is greater than a number of the plurality of partial interlace groups in the first interlace group, and the first cyclic shift pair set is associated with the first slot.

Clause 40: The method of Clause 35, wherein: the one or more sidelink data messages comprise multiple sidelink data messages, the one or more feedback bits in the first feedback message comprises multiple feedback bits, and the multiple feedback bits comprises at least one feedback bit for each slot of the time period.

Clause 41: The method of Clause 40, wherein the multiple feedback bits comprise a feedback bit that is not associated with any sidelink data message.

Clause 42: The method of Clause 41, wherein the feedback bit that is not associated with any sidelink data message indicates a negative acknowledgement.

Clause 43: The method of Clause 40, wherein: the second UE is configured with multiple resource pools including the first resource pool, and each of the multiple resource pools comprises: a plurality of sidelink feedback channel resources over a partial interlace of an interlace, wherein the interlace comprises a plurality of partial interlaces including the partial interlace; or a plurality of sidelink feedback channel resources of a cyclic shift pair set of the partial interlace, wherein the cyclic shift pair set comprises a plurality of cyclic shift pairs.

Clause 44: The method of Clause 43, further comprising: transmitting to the second UE, one or more sidelink control messages scheduling the multiple sidelink data messages during the time period, wherein the one or more sidelink control message indicate to use the first resource pool for transmitting the first feedback message to the first UE.

Clause 45: A method for wireless communications by a first UE, the method comprising: receiving, from a second UE, one or more sidelink data messages during a time period having a duration of a first number of slots that is greater than one; and transmitting, to the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain.

Clause 46: The method of Clause 45, wherein the resource elements from one or more resource blocks transmitted in the comb pattern in the frequency domain comprises one of: the resource elements transmitted every second subcarrier in the frequency domain; the resource elements transmitted every fourth subcarrier in the frequency domain; the resource elements transmitted every sixth subcarrier in the frequency domain; or the resource elements transmitted every twelfth subcarrier in the frequency domain.

Clause 47: The method of any one of Clauses 45 and 46, further comprising: selecting a cyclic shift to convey a value of each of the one or more feedback bits.

Clause 48: The method of any one of Clauses 45-47, wherein: the first sidelink feedback channel resource occupies the resource elements from at least two resource blocks, and the at least two resource blocks belong to a first interlace group of resource blocks.

Clause 49: The method of any one of Clauses 45-48, wherein: the first sidelink feedback channel resource occupies the resource elements from at least two resource blocks, and the at least two resource blocks belong to a first partial interlace group of a first interlace group of resource blocks.

Clause 50: The method of Clause 49, further comprising: receiving signaling configuring: a first resource pool with a plurality of sidelink feedback channel resources, including, at least, the first sidelink feedback channel resource, wherein: the first resource pool comprises a plurality of interlace groups including, at least, the first interlace group, each of the plurality of interlace groups comprises a plurality of partial interlace groups, and each of the plurality of partial interlace groups comprises at least two resource blocks, and an amount of resource blocks for each of the plurality of partial interlace groups.

Clause 51: The method of any one of Clauses 45-50, further comprising: selecting the first sidelink feedback channel resource from a first plurality of sidelink feedback channel resources in a first resource pool based on at least one of a first identifier associated with the second UE or a groupcast identifier associated with the one or more sidelink data messages.

Clause 52: The method of Clause 51, wherein: the first UE, receives, from the second UE, one sidelink data message over a first subchannel or a first frequency interlace in a first slot; and the method further comprises selecting the first resource pool based on the first subchannel or the first frequency interlace over which the one sidelink data message is received in the first slot.

Clause 53: The method of Clause 51, wherein: the first resource pool comprises a plurality of interlace groups, wherein: each of the plurality of interlace groups comprises a plurality of partial interlace groups, and each of the plurality of partial interlace groups comprises at least two resource blocks; and an amount of the first plurality of sidelink feedback channel resources in the first resource pool is based, at least in part, on one or more of: an amount of the plurality of partial interlace groups in the first resource pool, an amount of comb patterns available in the frequency domain, or an amount of cyclic shift pairs per comb pattern.

Clause 54: The method of Clause 51, wherein: the one or more sidelink data messages comprise multiple sidelink data messages, the one or more feedback bits in the first feedback message comprises multiple feedback bits, and the multiple feedback bits comprises at least one feedback bit for each slot of the time period.

Clause 55: The method of Clause 54, wherein the multiple feedback bits comprise a feedback bit that is not associated with any sidelink data message.

Clause 56: The method of Clause 55, wherein the feedback bit that is not associated with any sidelink data message indicates a negative acknowledgement.

Clause 57: The method of Clause 54, wherein: the first UE is configured with multiple resource pools including the first resource pool, and each of the multiple resource pools comprises one of: a plurality of sidelink feedback channel resources which occupy different partial interlaces; a plurality of sidelink feedback channel resources which occupy resource elements from one or more resource blocks transmitted in different comb patterns in the frequency domain; or a plurality of sidelink feedback channel resources which occupy the resource elements from the one or more resource blocks transmitted in the different comb patterns in the frequency domain and have different cyclic shift pair sets.

Clause 58: The method of Clause 57, further comprising: receiving, from the second UE, one or more sidelink control messages scheduling the multiple sidelink data messages during the time period, wherein the one or more sidelink control messages indicate to use the first resource pool for transmitting the first feedback message.

Clause 59: A method for wireless communications by a first UE, the method comprising: transmitting, to a second UE, one or more sidelink data messages during a time period having a duration of a first number of slots that is greater than one; and receiving, from the second UE, via a first sidelink feedback channel resource, a first feedback message comprising one or more feedback bits associated with the one or more sidelink data messages, wherein the first sidelink feedback channel resource occupies resource elements from one or more resource blocks transmitted in a comb pattern in a frequency domain.

Clause 60: The method of Clause 59, wherein the resource elements from one or more resource blocks transmitted in the comb pattern in the frequency domain comprises one of: the resource elements transmitted every second subcarrier in the frequency domain; the resource elements transmitted every fourth subcarrier in the frequency domain; the resource elements transmitted every sixth subcarrier in the frequency domain; or the resource elements transmitted every twelfth subcarrier in the frequency domain.

Clause 61: The method of any one of Clauses 59 and 60, wherein: the first sidelink feedback channel resource occupies the resource elements from at least two resource blocks, and the at least two resource blocks belong to a first interlace group of resource blocks.

Clause 62: The method of any one of Clauses 59-61, wherein: the first sidelink feedback channel resource occupies the resource elements from at least two resource blocks, and the at least two resource blocks belong to a first partial interlace group of a first interlace group of resource blocks.

Clause 63: The method of Clause 62, further comprising: receiving signaling configuring: a first resource pool with a plurality of sidelink feedback channel resources, including, at least, the first sidelink feedback channel resource, wherein: the first resource pool comprises a plurality of interlace groups including, at least, the first interlace group, each of the plurality of interlace groups comprises a plurality of partial interlace groups, and each of the plurality of partial interlace groups comprises at least two resource blocks, and an amount of resource blocks for each of the plurality of partial interlace groups.

Clause 64: The method of any one of Clauses 59-63, wherein: the first sidelink feedback channel resource comprises a sidelink feedback channel resource from a first plurality of sidelink feedback channel resources in a first resource pool, and the first sidelink feedback channel resource is associated with at least one of a first identifier associated with the first UE or a groupcast identifier associated with the one or more sidelink data messages.

Clause 65: The method of Clause 64, wherein: the first UE, transmits, to the second UE, one sidelink data message over a first subchannel or a first frequency interlace in a first slot, and the first resource pool is associated with the first subchannel or the first frequency interlace over which the one sidelink data message is transmitted in the first slot.

Clause 66: The method of Clause 64, wherein: the first resource pool comprises a plurality of interlace groups, wherein: each of the plurality of interlace groups comprises a plurality of partial interlace groups, and each of the plurality of partial interlace groups comprises at least two resource blocks; and an amount of the first plurality of sidelink feedback channel resources in the first resource pool is based, at least in part, on one or more of: an amount of the plurality of partial interlace groups in the first resource pool, an amount of comb patterns available in the frequency domain, or an amount of cyclic shift pairs per comb pattern.

Clause 67: The method of Clause 64, wherein: the one or more sidelink data messages comprise multiple sidelink data messages, the one or more feedback bits in the first feedback message comprises multiple feedback bits, and the multiple feedback bits comprises at least one feedback bit for each slot of the time period.

Clause 68: The method of Clause 67, wherein the multiple feedback bits comprise a feedback bit that is not associated with any sidelink data message.

Clause 69: The method of Clause 68, wherein the feedback bit that is not associated with any sidelink data message indicates a negative acknowledgement.

Clause 70: The method of Clause 67, wherein: the second UE is configured with multiple resource pools including the first resource pool, and each of the multiple resource pools comprises one of: a plurality of sidelink feedback channel resources which occupy different partial interlaces; a plurality of sidelink feedback channel resources which occupy resource elements from one or more resource blocks transmitted in different comb patterns in the frequency domain; or a plurality of sidelink feedback channel resources which occupy the resource elements from the one or more resource blocks transmitted in the different comb patterns in the frequency domain and have different cyclic shift pair sets.

Clause 71: The method of Clause 70, further comprising: transmitting, to the second UE, one or more sidelink control messages scheduling the multiple sidelink data messages during the time period, wherein the one or more sidelink control messages indicate, to the second UE, to use the first resource pool for transmitting the first feedback message.

Clause 72: An apparatus, comprising: a memory comprising executable instructions; and a processor configured to execute the executable instructions and cause the apparatus to perform a method in accordance with any one of Clauses 1-71.

Clause 73: An apparatus, comprising means for performing a method in accordance with any one of Clauses 1-71.

Clause 74: A non-transitory computer-readable medium comprising executable instructions that, when executed by a processor of an apparatus, cause the apparatus to perform a method in accordance with any one of Clauses 1-71.

Clause 75: A computer program product embodied on a computer-readable storage medium comprising code for performing a method in accordance with any one of Clauses 1-71.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
one or more memories comprising processor-executable instructions; and
one or more processors configured to execute the processor-executable instructions and cause the apparatus to:
receive signaling that includes a configuration of:
a first resource pool with a plurality of sidelink feedback channel resources, wherein:
the first resource pool comprises a plurality of interlace groups,
each of the plurality of interlace groups comprises a plurality of partial interlace groups, and
each of the plurality of partial interlace groups comprises at least two resource blocks, and
an amount of resource blocks for each of the plurality of partial interlace groups;
receive, from a user equipment (UE), one or more sidelink data messages during a time period having a duration of a first number of slots that is greater than one; and
transmit, to the UE, via a first sidelink feedback channel resource included in the first resource pool, a first feedback message comprising one or more feedback bits associated with the one or more sidelink data messages, wherein:
the first sidelink feedback channel resource occupies resource elements from at least two resource blocks transmitted in a comb pattern in a frequency domain, and
the at least two resource blocks belong to a first interlace group of the plurality of interlace groups.

2. The apparatus of claim 1, wherein the resource elements from one or more resource blocks transmitted in the comb pattern in the frequency domain comprise the resource elements transmitted:
only every second subcarrier in the frequency domain;
only every fourth subcarrier in the frequency domain;
only every sixth subcarrier in the frequency domain; or
only every twelfth subcarrier in the frequency domain.

3. The apparatus of claim 1, wherein the one or more processors are configured to execute the processor-executable instructions and cause the apparatus to select a cyclic shift to convey a value of each of the one or more feedback bits.

4. The apparatus of any claim 1, wherein:
the first sidelink feedback channel resource occupies the resource elements from at least two resource blocks, and
the at least two resource blocks belong to a first interlace group of resource blocks.

5. An apparatus configured for wireless communications, comprising:
one or more memories comprising processor-executable instructions; and
one or more processors configured to execute the processor-executable instructions and cause the apparatus to:
receive, from a user equipment (UE), a sidelink data message during a time period having a duration of a first number of slots that is greater than one, wherein the sidelink data message is received over a first subchannel or a first frequency interlace in a first slot;
select a first sidelink feedback channel resource from a first plurality of sidelink feedback channel resources in a first resource pool based on:
at least one of a first identifier associated with the UE or a groupcast identifier associated with the sidelink data message; and
the first subchannel or the first frequency interlace over which the sidelink data message is received in the first slot, wherein:
the first sidelink feedback channel resource occupies resource elements from one or more resource blocks transmitted in a comb pattern in a frequency domain; and
transmit, to the UE, via the first sidelink feedback channel resource, a first feedback message comprising a feedback bit associated with the sidelink data message.

6. The apparatus of claim 5, wherein the resource elements from one or more resource blocks transmitted in the comb pattern in the frequency domain comprise the resource elements transmitted:
only every second subcarrier in the frequency domain;
only every fourth subcarrier in the frequency domain;
only every sixth subcarrier in the frequency domain; or
only every twelfth subcarrier in the frequency domain.

7. The apparatus of claim 6, wherein the one or more processors are configured to execute the processor-executable instructions and cause the apparatus to select a cyclic shift to convey a value of the feedback bit.

8. The apparatus of any claim 6, wherein:
the first sidelink feedback channel resource occupies the resource elements from at least two resource blocks, and
the at least two resource blocks belong to a first interlace group of resource blocks.

9. An apparatus configured for wireless communications, comprising:
one or more memories comprising processor-executable instructions; and
one or more processors configured to execute the processor-executable instructions and cause the apparatus to:
receive, from a user equipment (UE), one or more sidelink data messages during a time period having a duration of a first number of slots that is greater than one;
select a first sidelink feedback channel resource from a first plurality of sidelink feedback channel resources in a first resource pool based on at least one of a first identifier associated with the UE or a groupcast identifier associated with the one or more sidelink data messages, wherein:
the first resource pool comprises a plurality of interlace groups, each of the plurality of interlace groups comprises a plurality of partial interlace groups, each of the plurality of partial interlace groups comprises at least two resource blocks;

an amount of the first plurality of sidelink feedback channel resources in the first resource pool is based, at least in part, on one or more of an amount of the plurality of partial interlace groups in the first resource pool, an amount of comb patterns available in a frequency domain, or an amount of cyclic shift pairs per comb pattern; and the first sidelink feedback channel resource occupies resource elements from one or more resource blocks transmitted in a comb pattern in the frequency domain; and transmit, to the UE, via the first sidelink feedback channel resource, a first feedback message comprising one or more feedback bits associated with the one or more sidelink data messages.

10. The apparatus of claim 9, wherein the resource elements from one or more resource blocks transmitted in the comb pattern in the frequency domain comprise the resource elements transmitted:
only every second subcarrier in the frequency domain;
only every fourth subcarrier in the frequency domain;
only every sixth subcarrier in the frequency domain; or
only every twelfth subcarrier in the frequency domain.

11. The apparatus of claim 9, wherein the one or more processors are configured to execute the processor-executable instructions and cause the apparatus to select a cyclic shift to convey a value of each of the one or more feedback bits.

12. The apparatus of any claim 9, wherein:
the first sidelink feedback channel resource occupies the resource elements from at least two first resource blocks, and
the at least two first resource blocks belong to a first interlace group of resource blocks of the plurality of interlace groups.

13. An apparatus configured for wireless communications, comprising:
one or more memories comprising processor-executable instructions; and
one or more processors configured to execute the processor-executable instructions and cause the apparatus to:
receive, from a user equipment (UE), multiple sidelink data messages during a time period having a duration of a first number of slots that is greater than one;
select a first sidelink feedback channel resource from a first plurality of sidelink feedback channel resources in a first resource pool based on at least one of a first identifier associated with the UE or a groupcast identifier associated with the multiple sidelink data messages, wherein:
the first sidelink feedback channel resource occupies resource elements from one or more resource blocks transmitted in a comb pattern in a frequency domain; and transmit, to the UE, via the first sidelink feedback channel resource, a first feedback message comprising multiple feedback bits associated with the multiple sidelink data messages, wherein the multiple feedback bits comprise at least one feedback bit for each slot of the time period.

14. The apparatus of claim 13, wherein the multiple feedback bits comprise a feedback bit that is not associated with any sidelink data message.

15. The apparatus of claim 14, wherein the feedback bit that is not associated with any sidelink data message indicates a negative acknowledgement.

16. The apparatus of claim 13, wherein:
the apparatus is configured with multiple resource pools including the first resource pool, and
each of the multiple resource pools comprises one of:
a plurality of sidelink feedback channel resources which occupy different partial interlaces;
a plurality of sidelink feedback channel resources which occupy resource elements from one or more resource blocks transmitted in different comb patterns in the frequency domain; or
a plurality of sidelink feedback channel resources which occupy the resource elements from the one or more resource blocks transmitted in the different comb patterns in the frequency domain and have different cyclic shift pair sets.

17. The apparatus of claim 13, wherein:
the one or more processors are configured to execute the processor-executable instructions and cause the apparatus to receive, from the UE, one or more sidelink control messages that schedule the multiple sidelink data messages during the time period, and
the one or more sidelink control messages indicate to use the first resource pool to transmit the first feedback message.

18. The apparatus of claim 13, wherein the resource elements from one or more resource blocks transmitted in the comb pattern in the frequency domain comprise the resource elements transmitted:
only every second subcarrier in the frequency domain;
only every fourth subcarrier in the frequency domain;
only every sixth subcarrier in the frequency domain; or
only every twelfth subcarrier in the frequency domain.

19. The apparatus of claim 13, wherein the one or more processors are configured to execute the processor-executable instructions and cause the apparatus to select a cyclic shift to convey a value of each of the multiple feedback bits.

20. The apparatus of any claim 13, wherein:
the first sidelink feedback channel resource occupies the resource elements from at least two resource blocks, and
the at least two resource blocks belong to a first interlace group of resource blocks.

* * * * *